United States Patent
Fujita et al.

(10) Patent No.: US 10,703,911 B2
(45) Date of Patent: Jul. 7, 2020

(54) ORGANIC COLORANT, COLORING COMPOSITION, AND INKJET INK

(71) Applicants: Takuya Fujita, Aichi (JP); Yoshimasa Miyazawa, Kanagawa (JP); Tatsuya Tomura, Tokyo (JP); Masahiro Yanagisawa, Kanagawa (JP); Kiyofumi Nagai, Tokyo (JP); Yukishige Kondo, Tokyo (JP); Juki Migii, Tokyo (JP)

(72) Inventors: Takuya Fujita, Aichi (JP); Yoshimasa Miyazawa, Kanagawa (JP); Tatsuya Tomura, Tokyo (JP); Masahiro Yanagisawa, Kanagawa (JP); Kiyofumi Nagai, Tokyo (JP); Yukishige Kondo, Tokyo (JP); Juki Migii, Tokyo (JP)

(73) Assignees: Ricoh Company, Ltd., Tokyo (JP); Tokyo University of Science Foundation, Tokyo (JP)

( * ) Notice: Subject to any disclaimer, the term of this patent is extended or adjusted under 35 U.S.C. 154(b) by 0 days.

(21) Appl. No.: 16/027,547

(22) Filed: Jul. 5, 2018

(65) Prior Publication Data

US 2019/0010331 A1 Jan. 10, 2019

(30) Foreign Application Priority Data

Jul. 10, 2017 (JP) .................. 2017-134791
Apr. 19, 2018 (JP) .................. 2018-080416

(51) Int. Cl.
C09B 57/00 (2006.01)
C09D 11/322 (2014.01)

(52) U.S. Cl.
CPC ............ C09B 57/00 (2013.01); C09D 11/322 (2013.01)

(58) Field of Classification Search
CPC ..................................................... C09B 57/00
See application file for complete search history.

(56) References Cited

U.S. PATENT DOCUMENTS

| | | |
|---|---|---|
| 2012/0174824 A1 | 7/2012 | Takenaka et al. |
| 2016/0075917 A1 | 3/2016 | Hoshino et al. |
| 2018/0056692 A1 | 3/2018 | Tomura et al. |
| 2018/0094155 A1 | 4/2018 | Fujita et al. |
| 2018/0118966 A1 | 5/2018 | Tomura et al. |

FOREIGN PATENT DOCUMENTS

| | | | |
|---|---|---|---|
| CN | 102659628 A | * | 9/2012 |
| JP | 09-207446 | | 8/1997 |
| JP | H09207446 | * | 8/1997 |
| JP | 2005-036079 | | 2/2005 |
| JP | 2009-132641 | | 6/2009 |
| JP | 2011-052041 | | 3/2011 |
| JP | 2013-203785 | | 10/2013 |
| JP | 2014-074127 | | 4/2014 |
| JP | 2017-165834 | | 9/2017 |
| WO | WO2014/021405 A2 | | 2/2014 |

OTHER PUBLICATIONS

English Translation of JPH09207446, pp. 1-13, Aug. 1997.*
CAS Registry, CAS No. 900710-64-7, Aug. 11, 2006, p. 1.*
Mori et al. Chemistry Letters (1997), (6), 509-510.*

* cited by examiner

Primary Examiner — Ana Z Muresan
(74) Attorney, Agent, or Firm — Oblon, McClelland, Maier & Neustadt, L.L.P.

(57) ABSTRACT

Organic colorant represented by General Formula (1) below:

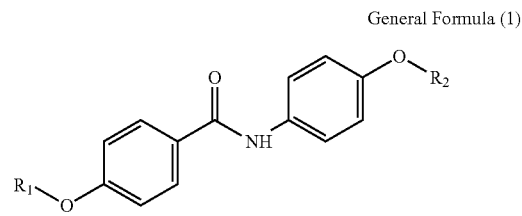

General Formula (1)

where in the General Formula (1), $R_1$ and $R_2$ each independently represent C1-C20 alkyl group, C1-C20 alkenyl group, phenyl group, naphthyl group, or group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—$OCOCH_3$; $R_3$ represents hydrogen atom or C1-C2 alkyl group; $R_4$ represents hydroxy group, C1-C2 alkoxy group, C2-C5 alkenyloxy group, $SO_3Na$ group, $OSO_3Na$ group, phenyl group, phenylalkyl group, naphthyl group, or naphthylalkyl group; $R_5$ represents C1-C20 alkyl group, C1-C20 alkenyl group, or C1-C12 hydroxyalkyl group; $R_6$ represents hydrogen atom or methyl group; $R_7$ represents C1-C4 alkyl group; $R_8$ represents C1-C5 alkyl group; and n is integer of from 1 to 12.

11 Claims, No Drawings

ORGANIC COLORANT, COLORING COMPOSITION, AND INKJET INK

CROSS-REFERENCE TO RELATED APPLICATIONS

The present application claims priority under 35 U.S.C. § 119 to Japanese Patent Application No. 2017-134791, filed Jul. 10, 2017 and Japanese Patent Application No. 2018-080416, filed Apr. 19, 2018. The contents of which are incorporated herein by reference in their entirety.

BACKGROUND OF THE INVENTION

Field of the Invention

The present disclosure relates to an organic colorant, a coloring composition, and an inkjet ink.

Description of the Related Art

There are many opportunities to see articles having metallic gloss in many situations of daily life because these articles give gorgeous impressions to people. A metal itself may be used to give design characteristics. In many cases, however, design characteristics are given by coating a coloring composition having metallic gloss on a substrate.

As the method of the coating, there have been used a method of the printing through various printing methods by using a printing ink including a pigment having luster property and a method for performing the transfer foil by an adhesive or through heat seal.

Among colors having metallic gloss, gold is particularly a symbol of wealth, and has been popular among people from time immemorial. Therefore, gold is an indispensable color for auspicious events such as the New Year. In addition, silver is also popular because of calm tone and is often seen in many situations. Moreover, silver is different from gold because it can develop various metallic gloss colors including the gold color by mixing a silver-colored coloring composition with another colored coloring composition. Therefore, silver is versatilely used compared to gold and is valuable in terms of industrial applications.

Conventionally, pigments used for the coloring composition having metallic gloss of silver are, for example, aluminum fine particles and silver powders and the aluminum powders have widely been used in terms of cost. However, the aluminum fine particles have a high specific gravity and are difficult to stably exist in the coloring composition, causing precipitation over time. In some cases, the aluminum fine particles may be adhered to each other to cause hard caking, which is problematic.

In order to reduce environmental loading, coloring compositions such as printing inks have been replaced with aqueous coloring compositions that hardly include an organic solvent one after another. However, there is a problem that aluminum fine particles react with water to generate a hydrogen gas and aluminum is changed to alumina, losing metallic glossiness.

In addition, development of inkjet printing technology has increased a desire to obtain a print matter having metallic glossiness even in the inkjet printing. For example, incorporation of a commercially available squamous aluminum pigment or a titanium oxide-coated mica pigment as a luster pigment into the inkjet ink has been proposed (see, for example, Japanese Unexamined Patent Application Publication No. 2005-036079). Moreover, it has been proposed that the squamous aluminum pigment is subjected to a treatment that does not easily cause precipitation in the ink (see, for example, Japanese Unexamined Patent Application Publication No. 2011-52041). Furthermore, it is proposed that when a water-resistant aluminum pigment is used, generation of a hydrogen gas will be prevented because of reaction between aluminum particles and water (see, for example, Japanese Unexamined Patent Application Publication No. 2014-074127).

In recent years, development of organic dye materials having metallic glossiness has widely been performed (see, for example, Japanese Unexamined Patent Application Publication No. 2013-203785, Japanese Unexamined Patent Application Publication No. 2009-132641, and International Publication No. WO 2014/021405). The organic dye materials are considerably light in specific weight compared to metals. Therefore, if the organic dye materials can appropriately be dispersed, it is possible to drastically decrease a risk of precipitation in the coloring compositions. In addition, an appropriate design of structures of the organic dye materials makes it possible to stably exist even in the aqueous coloring compositions.

SUMMARY OF THE INVENTION

According to one aspect of the present disclosure, an organic colorant is represented by General Formula (1) below.

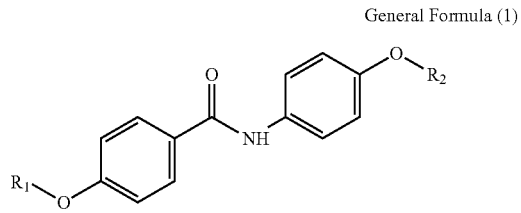

General Formula (1)

In the General Formula (1), $R_1$ and $R_2$ each independently represent an alkyl group including from 1 to 20 carbon atoms, an alkenyl group including from 1 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—OCOCH$_3$; $R_3$ represents a hydrogen atom or an alkyl group including from 1 to 2 carbon atoms; $R_4$ represents a hydroxy group, an alkoxy group including from 1 to 2 carbon atoms, an alkenyloxy group including from 2 to 5 carbon atoms, a $SO_3Na$ group, an $OSO_3Na$ group, a phenyl group, a phenylalkyl group where an alkyl portion of the phenylalkyl group includes from 1 to 3 carbon atoms, a naphthyl group, or a naphthylalkyl group where an alkyl portion of the naphthylalkyl group includes from 1 to 3 carbon atoms; $R_5$ represents an alkyl group including from 1 to 20 carbon atoms, an alkenyl group including from 1 to 20 carbon atoms, or a hydroxyalkyl group including from 1 to 12 carbon atoms; $R_6$ represents a hydrogen atom or a methyl group; $R_7$ represents an alkyl group including from 1 to 4 carbon atoms; $R_8$ represents an alkyl group including from 1 to 5 carbon atoms; and n is an integer of from 1 to 12.

DESCRIPTION OF THE EMBODIMENT (Organic Colorant)

An organic colorant of the present disclosure is represented by General Formula (1) below.

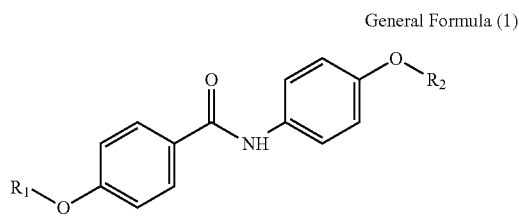

General Formula (1)

In the General Formula (1), $R_1$ and $R_2$ each independently represent an alkyl group including from 1 to 20 carbon atoms, an alkenyl group including from 1 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$," —$CR_6R_7$—COO—$R_8$, or —$(CH_2)_n$—$OCOCH_3$; $R_3$ represents a hydrogen atom or an alkyl group including from 1 to 2 carbon atoms; $R_4$ represents a hydroxy group, an alkoxy group including from 1 to 2 carbon atoms, an alkenyloxy group including from 2 to 5 carbon atoms, a $SO_3Na$ group, an $OSO_3Na$ group, a phenyl group, a phenylalkyl group where an alkyl portion of the phenylalkyl group includes from 1 to 3 carbon atoms, a naphthyl group, or a naphthylalkyl group where an alkyl portion of the naphthylalkyl group includes from 1 to 3 carbon atoms; $R_5$ represents an alkyl group including from 1 to 20 carbon atoms, an alkenyl group including from 1 to 20 carbon atoms, or a hydroxyalkyl group including from 1 to 12 carbon atoms; $R_6$ represents a hydrogen atom or a methyl group; $R_7$ represents an alkyl group including from 1 to 4 carbon atoms; $R_8$ represents an alkyl group including from 1 to 5 carbon atoms; and n is an integer of from 1 to 12.

The organic colorant of the present disclosure is based on the finding that conventional inks including, for example, conventional metal particles have a problem that nozzle clogging and precipitation of luster pigments occur because the particulate pigments in the ink are large. In addition, the organic colorant of the present disclosure is based on the following finding. Specifically, there are problems that an organic dye material having silvery gloss that is most highly versatilely used has not been proposed and an ink excellent in silvery gloss has not been developed yet, in conventional organic dye materials.

In general, the metallic gloss means appearance of luster or gloss specific to metals and also includes metallic gloss having low luster property through matting. Specifically, presence or absence of metallic gloss is judged by measuring the specular reflectance. The specular reflectance of 10% or more is judged "presence of the metallic gloss". When the specular reflectance is less than 10%, matt color tone strongly appears, which may be difficult to be considered as "presence of the metallic gloss".

Meanwhile, the silvery gloss of the present disclosure is defined as follows. That is, the specular reflectance is 10% or more, and a* value and b* value in the color values (a* value, b* value) are each −3.5 or more but 3.5 or less. When these ranges are not satisfied, yellowish gloss or blueish gloss may appear, which is difficult to be considered as silver. Note that, the silvery origami has specular reflectance of 38%, a* value of −1.2, and b* value of −3.2.

An object of the present invention is to provide an organic colorant capable of forming an image having silvery gloss.

According to the present disclosure, it is possible to provide an organic colorant capable of forming an image having silvery gloss.

<Compound>

In order that the compound represented by the General Formula (1) develops silvery gloss, the basic skeleton except for $R_1$ and $R_2$ is more important. Meanwhile, $R_1$ and $R_2$ can be selected from various ones so long as $R_1$ and $R_2$ do not adversely affect the properties of the basic skeleton.

In order to develop silvery gloss, it is important for the compound to be a trans structure. A pure cis structure of the compound does not develop silvery gloss. Therefore, the trans structure of the compound is presented in the General Formula (1). However, even when a small amount of the cis structure thereof is included, this does not largely impart an adverse effect to silvery gloss. Therefore, the cis structure thereof may be included so long as silvery gloss is not adversely affected.

$R_1$ and $R_2$ in the General Formula (1) each independently represent an alkyl group including from 1 to 20 carbon atoms, an alkenyl group including from 1 to 20 carbon atoms, a phenyl group, a naphthyl group, or any of the other groups.

The alkyl group including from 1 to 20 carbon atoms in $R_1$ and $R_2$ in the General Formula (1) is not particularly limited and may be appropriately selected depending on the intended purpose. Examples thereof include a methyl group, an ethyl group, a propyl group, an isopropyl group, a butyl group, a hexyl group, a heptyl group, an octyl group, a 2-ethylhexyl group, a tert-octyl group, and a cyclohexyl group. The number of carbon atoms in the alkyl group is from 1 to 20, preferably from 2 to 20, more preferably from 3 to 20, still more preferably from 3 to 11, particularly preferably 4 (butyl group). The lower limit of the number of carbon atoms in the alkyl group is preferably 2 or more, more preferably 3 or more, more preferably 4 or more, particularly preferably 11 or more.

When the number of carbon atoms is from 1 to 20, crystallinity of the compound can be improved and silvery gloss can easily be developed. Moreover, a straight-chain alkyl group is preferable in terms of glossiness. These may be used alone or in combination.

The alkenyl group including from 1 to 20 carbon atoms in $R_1$ and $R_2$ in the General Formula (1) is not particularly limited and may be appropriately selected depending on the intended purpose. The aforementioned alkenyl group may include one or more carbon-carbon double bonds in its structure. Examples thereof include a vinyl group, a 1-propenyl group, an allyl group, a 2-butenyl group, a 3-butenyl group, an isopropenyl group, an isobutenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a cyclopentenyl group, a cyclohexenyl group, a 1,3-butadienyl group, a cyclohexadienyl group, and a cyclopentadienyl group. When the number of carbon atoms is from 1 to 20, crystallinity of the compound can be improved and silvery gloss can easily be developed. These may be used alone or in combination.

The phenyl group in $R_1$ and $R_2$ in the General Formula (1) may include a substituent so long as it does not adversely affect development of silvery gloss. Examples of the substituent include an alkyl group, an alkenyl group, a hydroxyalkyl group, a hydroxy group, an alkoxy group, an alkenyloxy group, a cyano group, a cyanoalkyl group, a carboxy group, an alkoxycarbonyl group, and an amino group. The number of carbon atoms of an alkyl portion of the substituent is preferably from 1 to 6. These may be used alone or in combination.

The naphthyl group in $R_1$ and $R_2$ in the General Formula (1) may include a substituent so long as it does not adversely affect development of silvery gloss. Examples of the substituent include an alkyl group, an alkenyl group, a hydroxyalkyl group, a hydroxy group, an alkoxy group, an alkenyloxy group, a cyano group, a cyanoalkyl group, a carboxy group, an alkoxycarbonyl group, and an amino group. The number of carbon atoms of an alkyl portion of the substituent is preferably from 1 to 6. These may be used alone or in combination.

Examples of the other groups in $R_1$ and $R_2$ in the General Formula (1) include a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—OCOCH$_3$.

The $R_3$ represents a hydrogen atom or an alkyl group including from 1 to 2 carbon atoms.

The $R_4$ represents a hydroxy group, an alkoxy group including from 1 to 2 carbon atoms, an alkenyloxy group including from 2 to 5 carbon atoms, a $SO_3Na$ group, an $OSO_3Na$ group, a phenyl group, a phenylalkyl group where an alkyl portion of the phenylalkyl group includes from 1 to 3 carbon atoms, a naphthyl group, or a naphthylalkyl group where an alkyl portion of the naphthylalkyl group includes from 1 to 3 carbon atoms.

The $R_5$ represents an alkyl group including from 1 to 20 carbon atoms, an alkenyl group including from 1 to 20 carbon atoms, or a hydroxyalkyl group including from 1 to 12 carbon atoms.

The $R_6$ represents a hydrogen atom or a methyl group.

The $R_7$ represents an alkyl group including from 1 to 4 carbon atoms.

The $R_8$ represents an alkyl group including from 1 to 5 carbon atoms. These may be used alone or in combination.

The alkyl group including from 1 to 2 carbon atoms in $R_3$ in the General Formula (1) is not particularly limited and may be appropriately selected depending on the intended purpose. Examples thereof include a methyl group and an ethyl group.

The alkoxy group including from 1 to 2 carbon atoms in $R_4$ in the General Formula (1) is not particularly limited and may be appropriately selected depending on the intended purpose. Examples thereof include a methoxy group and an ethoxy group.

The alkenyloxy group including from 2 to 5 carbon atoms in $R_4$ in the General Formula (1) is not particularly limited and may be appropriately selected depending on the intended purpose. Examples thereof include a vinyl group, a methyl vinyl ether group, and an ethyl vinyl ether group.

The phenyl group and the phenylalkyl group, where an alkyl portion of the phenylalkyl group includes from 1 to 3 carbon atoms, in $R_4$ in the General Formula (1) are not particularly limited and may be appropriately selected depending on the intended purpose. Any portion of the phenyl group portion may include a substituent so long as it does not adversely affect development of silvery gloss. Examples of the substituent include an alkyl group, an alkenyl group, a hydroxyalkyl group, a hydroxy group, an alkoxy group, an alkenyloxy group, a cyano group, a cyanoalkyl group, a carboxy group, an alkoxycarbonyl group, and an amino group. The number of carbon atoms in an alkyl group portion of the substituent is preferably from 1 to 6. These may be used alone or in combination.

The naphthyl group and the naphthylalkyl group, where an alkyl portion of the naphthylalkyl group includes from 1 to 3 carbon atoms, in $R_4$ in the General Formula (1) are not particularly limited and may be appropriately selected depending on the intended purpose. Any portion of the naphthyl group portion may include a substituent so long as it does not adversely affect development of silvery gloss. Examples of the substituent include an alkyl group, an alkenyl group, a hydroxyalkyl group, a hydroxy group, an alkoxy group, an alkenyloxy group, a cyano group, a cyanoalkyl group, a carboxy group, an alkoxycarbonyl group, and an amino group. The number of carbon atoms of the alkyl group portion of the substituent is preferably from 1 to 6. These may be used alone or in combination.

The alkyl group including from 1 to 20 carbon atoms in $R_5$ in the General Formula (1) is not particularly limited and may be appropriately selected depending on the intended purpose. Examples thereof include a methyl group, an ethyl group, a propyl group, a butyl group, a pentyl group, a hexyl group, a heptyl group, an octyl group, a nonyl group, a decyl group, a dodecyl group, an octadecyl group, a trifluoromethyl group, an isopropyl group, an isobutyl group, an isopentyl group, a 2-ethylhexyl group, a sec-butyl group, a tert-butyl group, a sec-pentyl group, a tert-pentyl group, a tert-octyl group, a neopentyl group, a cyclopropyl group, a cyclobutyl group, a cyclopentyl group, and a cyclohexyl group. When the number of carbon atoms is from 1 to 20, the compound can be improved in crystallinity. As a result, it is easy to develop silvery gloss.

The alkenyl group including from 1 to 20 carbon atoms in $R_5$ in the General Formula (1) is not particularly limited and may be appropriately selected depending on the intended purpose. The aforementioned alkenyl group may include one or more carbon-carbon double bonds in its structure. Examples of the alkenyl group include a vinyl group, a 1-propenyl group, an allyl group, a 2-butenyl group, a 3-butenyl group, an isopropenyl group, an isobutenyl group, a 1-pentenyl group, a 2-pentenyl group, a 3-pentenyl group, a 4-pentenyl group, a 1-hexenyl group, a 2-hexenyl group, a 3-hexenyl group, a 4-hexenyl group, a 5-hexenyl group, a cyclopentenyl group, a cyclohexenyl group, a 1,3-butadienyl group, a cyclohexadienyl group, and a cyclopentadienyl group. When the number of carbon atoms is from 1 to 20, the compound can be improved in crystallinity. As a result, it is easy to develop silvery gloss.

The hydroxyalkyl group including from 1 to 12 carbon atoms in $R_5$ in the General Formula (1) is not particularly limited and may be appropriately selected depending on the intended purpose. Examples thereof include —$(CH_2)_2$—OH and —$(CH_2)_{12}$—OH.

$R_6$ in the General Formula (1) is, for example, a hydrogen atom and a methyl group.

The alkyl group including from 1 to 4 carbon atoms in $R_7$ in the General Formula (1) is not particularly limited and may be appropriately selected depending on the intended purpose. Examples thereof include a methyl group, an ethyl group, a propyl group, a butyl group, an isopropyl group, and an isobutyl group.

The alkyl group including from 1 to 5 carbon atoms in $R_8$ in the General Formula (1) is not particularly limited and may be appropriately selected depending on the intended purpose. Examples thereof include a methyl group, an ethyl group, a propyl group, a butyl group, an isopropyl group, an isobutyl group, a sec-butyl group, a tert-butyl group, an isopentyl group, a neo-pentyl group, and a tert-pentyl group.

In $R_1$ and $R_2$ in the General Formula (1), n is an integer of from 1 to 12. When the n is from 1 to 12, the compound is improved in crystallinity. As a result, it is easy to develop silvery gloss.
Specific examples of the compound of the present disclosure include, but are not limited to, the following compounds. All of the following compounds exhibit silvery gloss.
<<Compound Group a>>
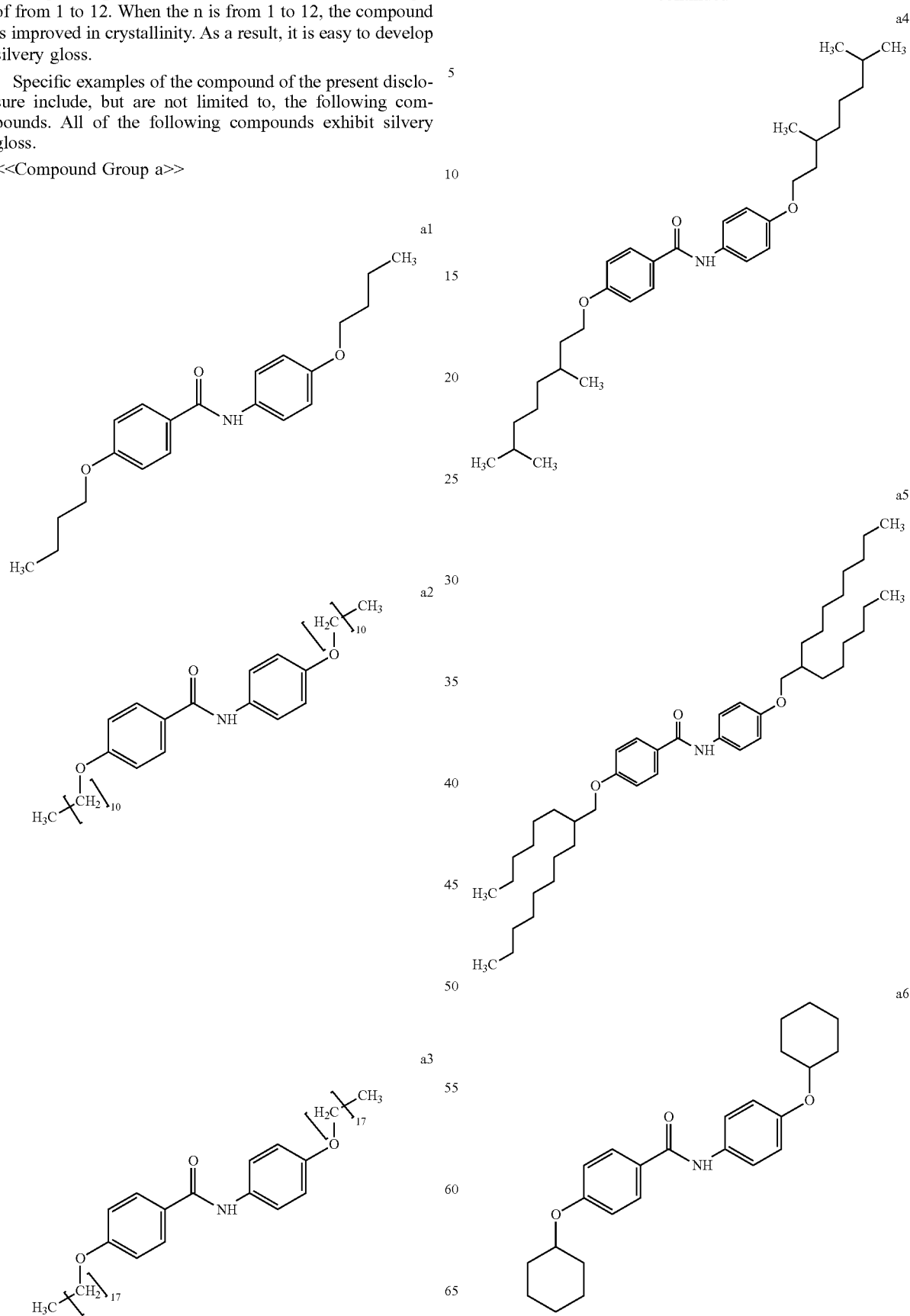

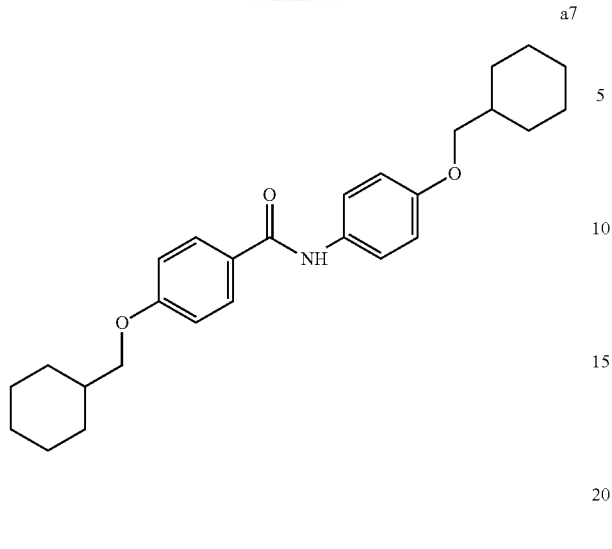
a7
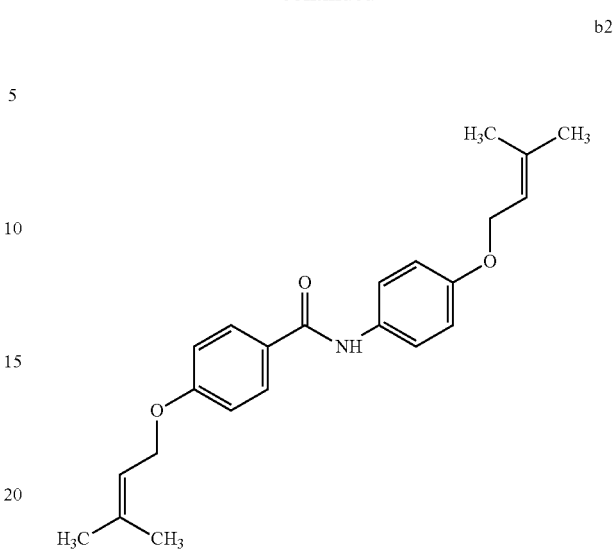
b2
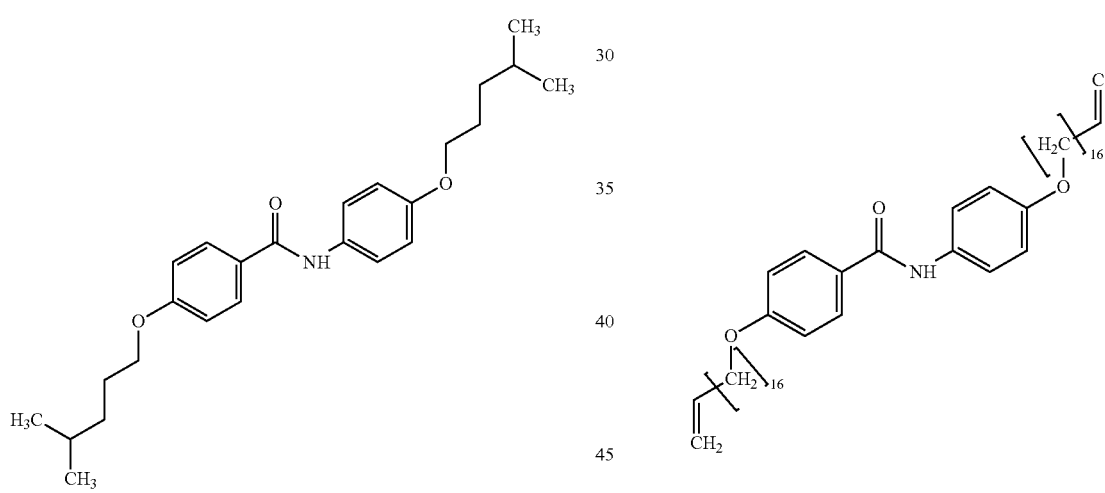
a8
<<Compound Group b>>
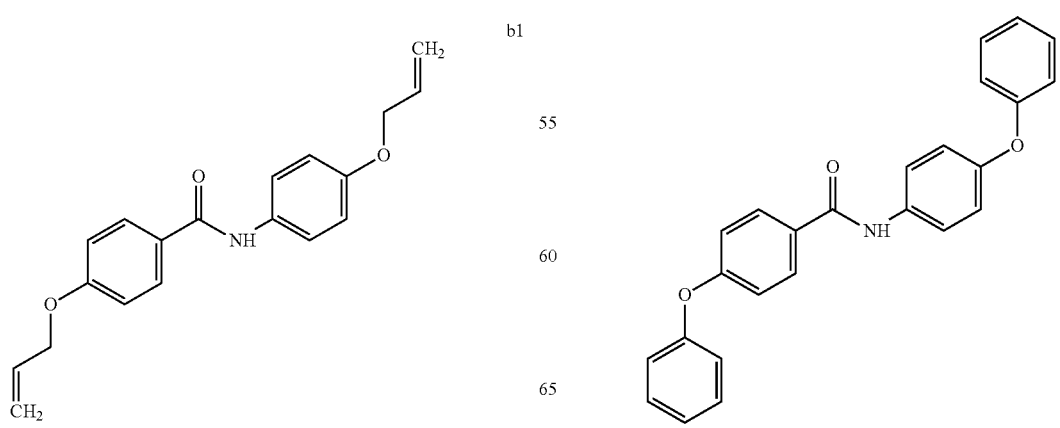
b1
<<Compound Group c>>
b3
c1

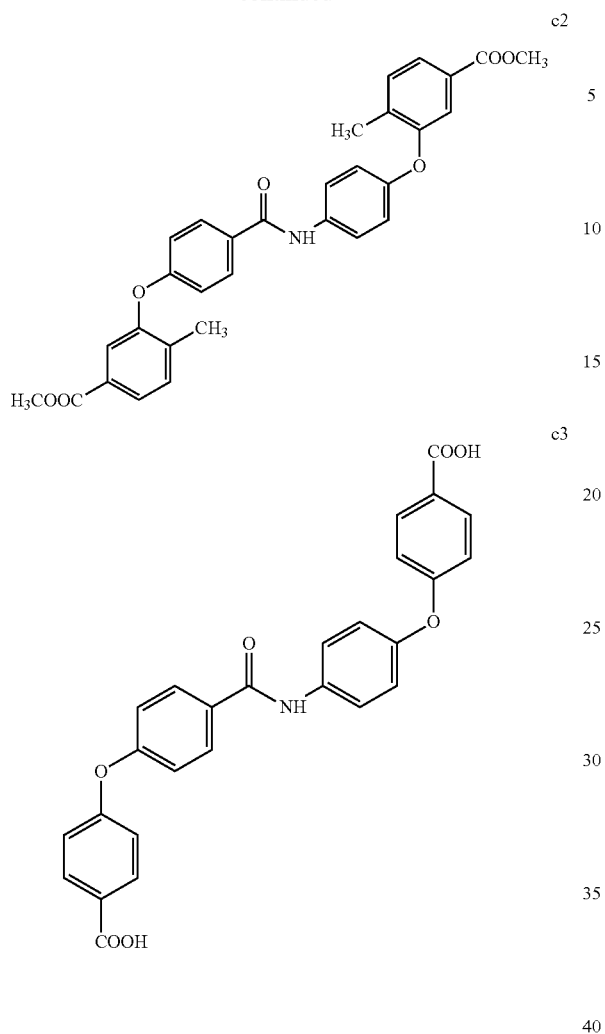
c2
c3
c4
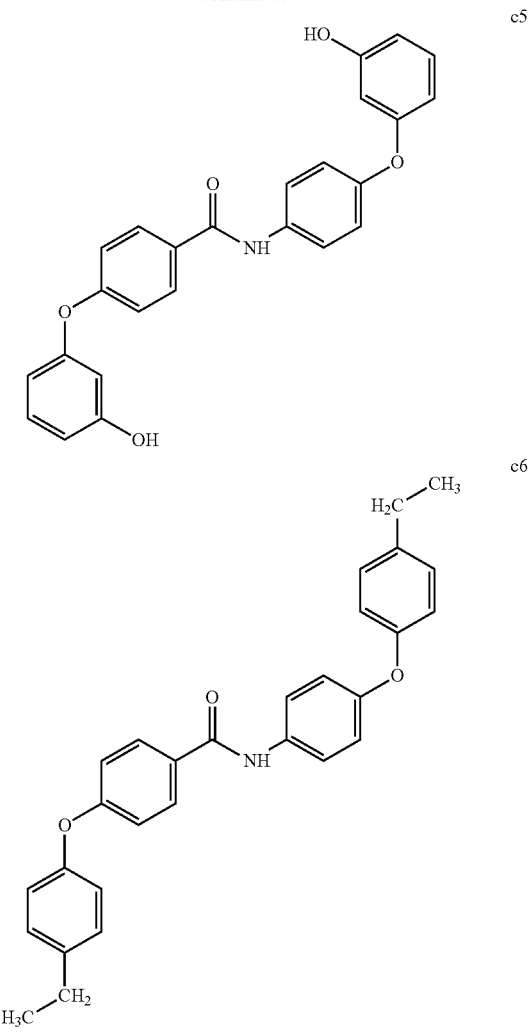
c5
c6
c7

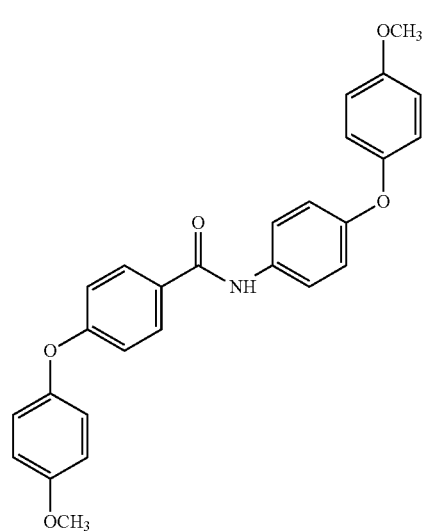
c8
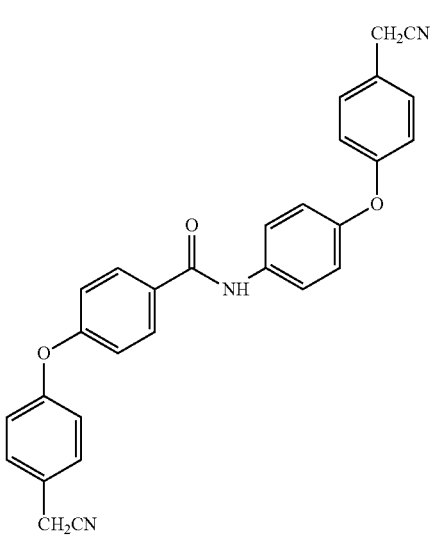
c9
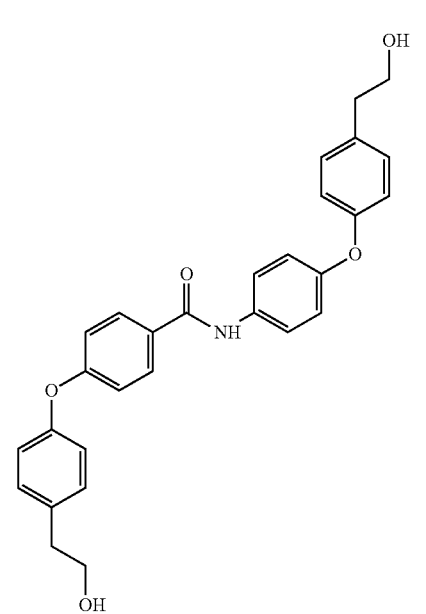
c10
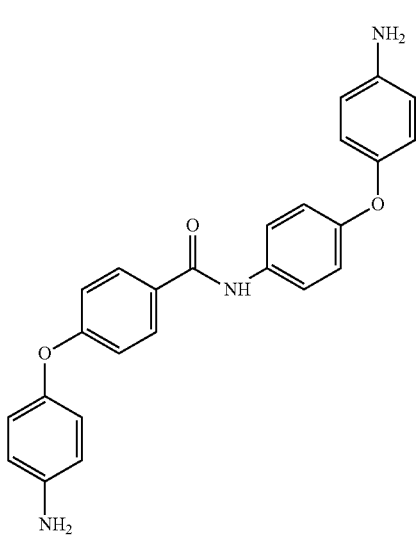
c11
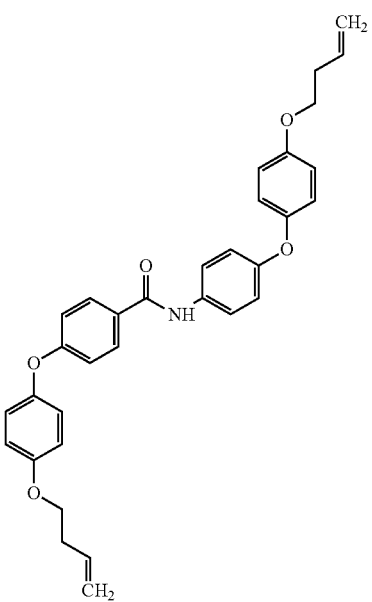
c12

<<Compound Group d>>
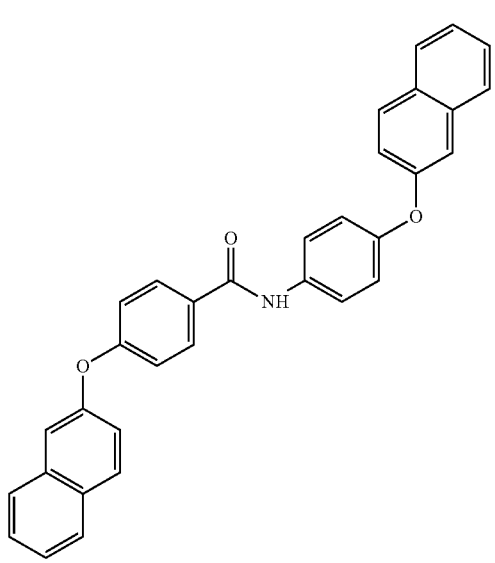
d1
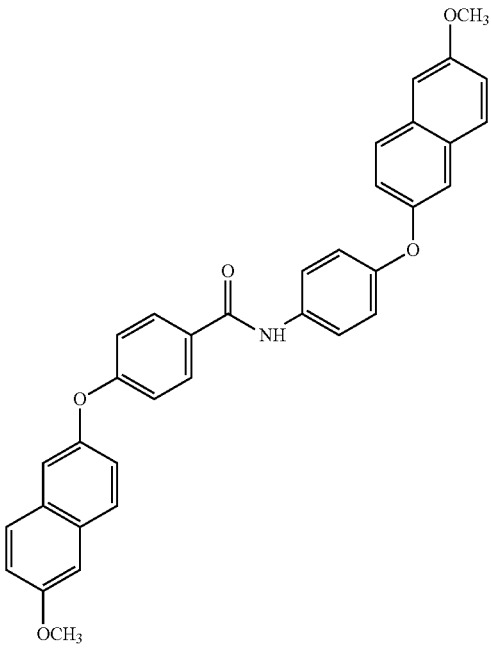
d3
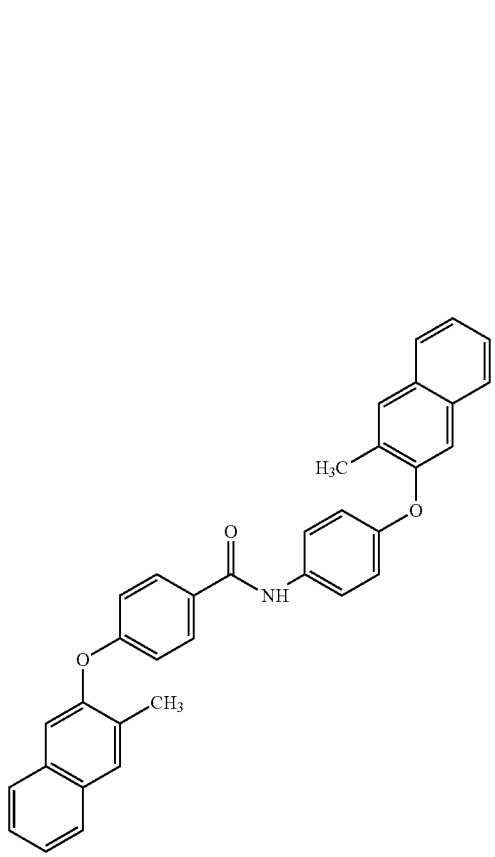
d2
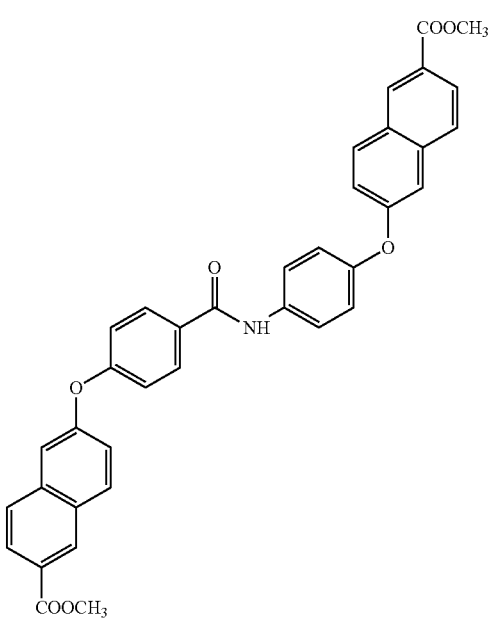
d4

-continued
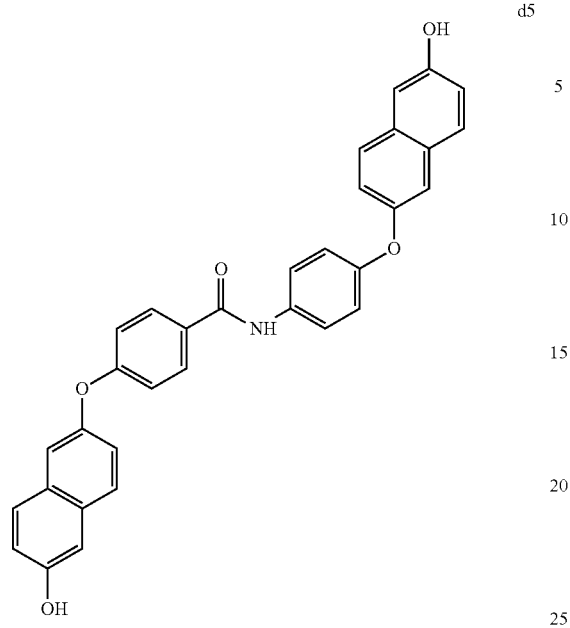
d5
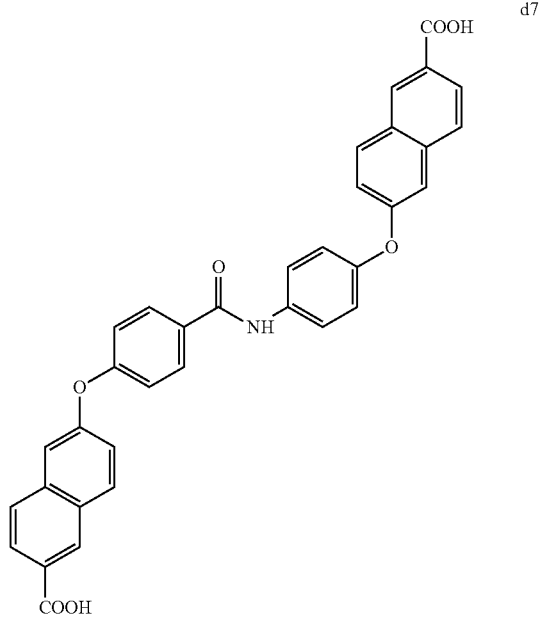
d7
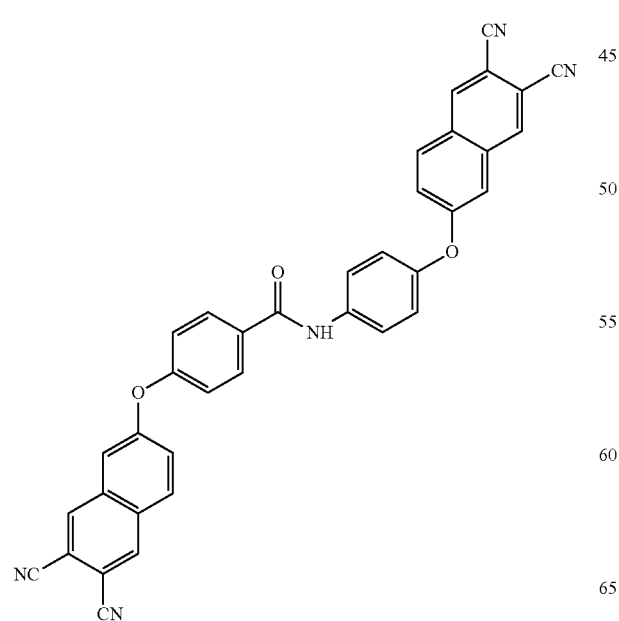
d6
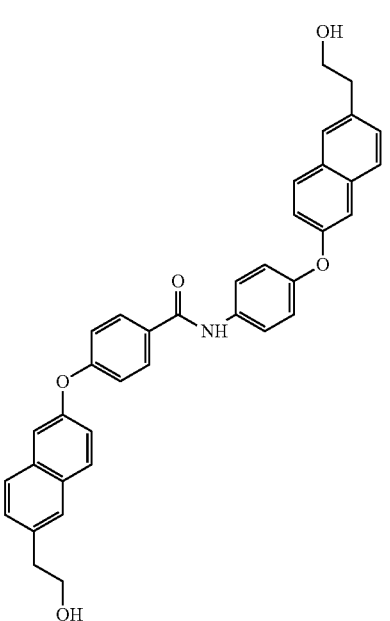
d8

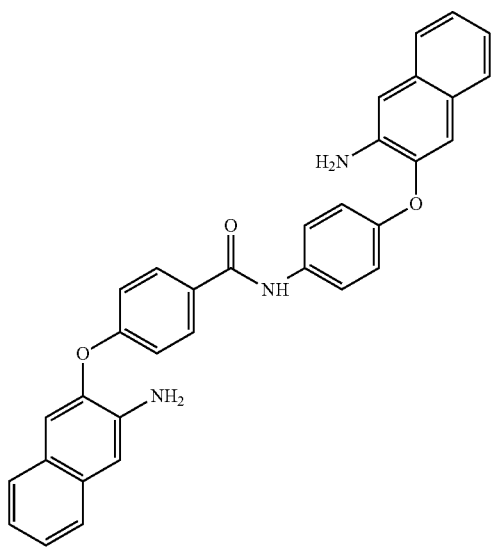
<<Compound Group e>>
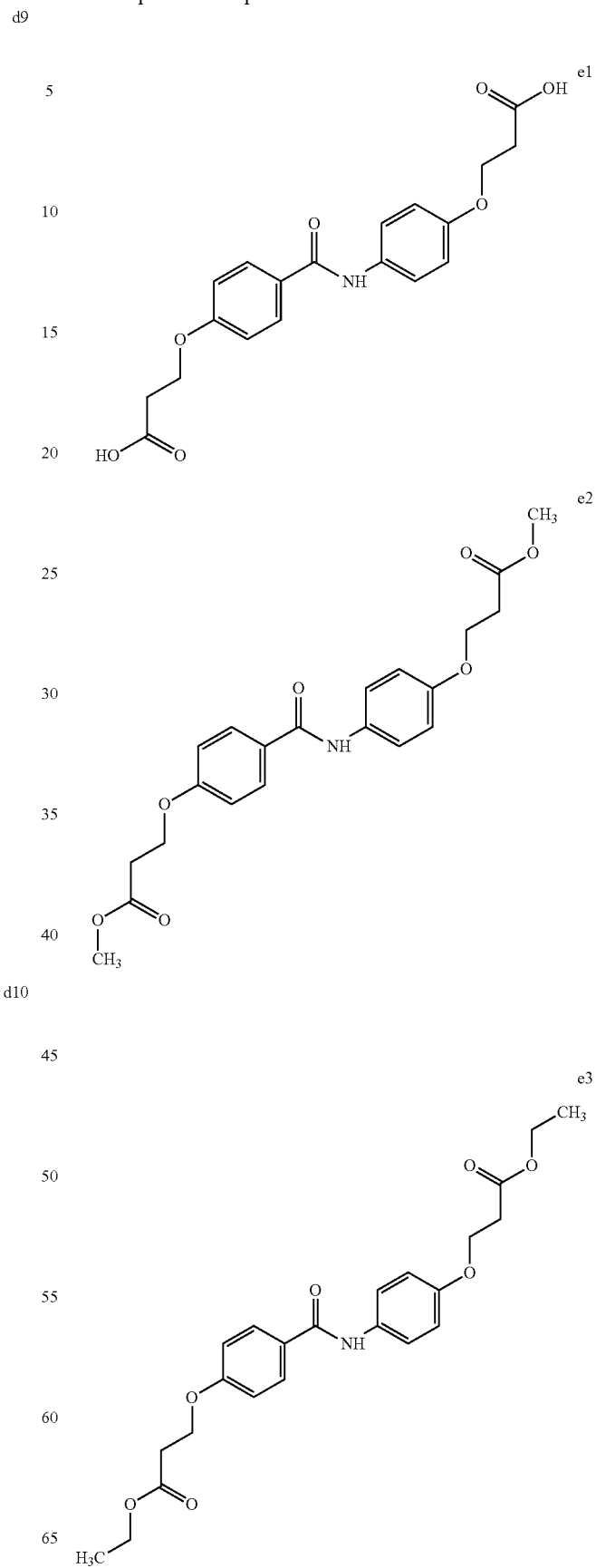

e4
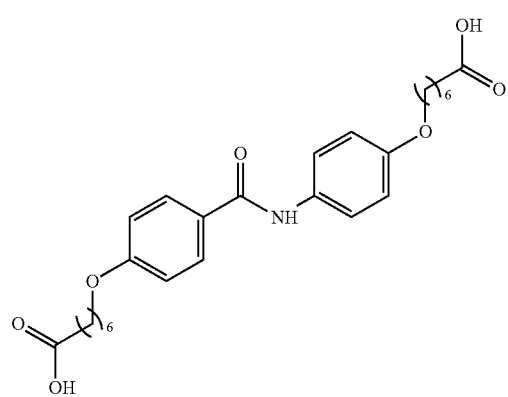
e5
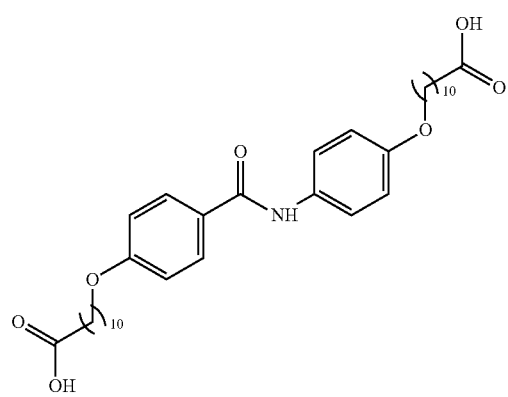
<<Compound Group f>>
f1
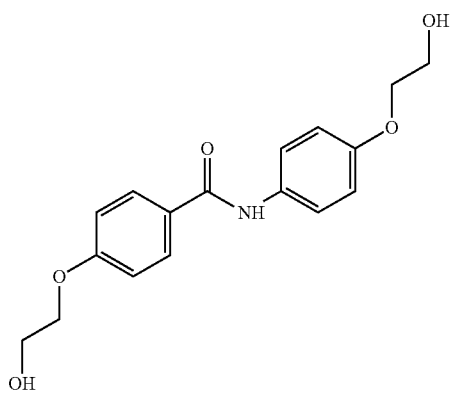
f2
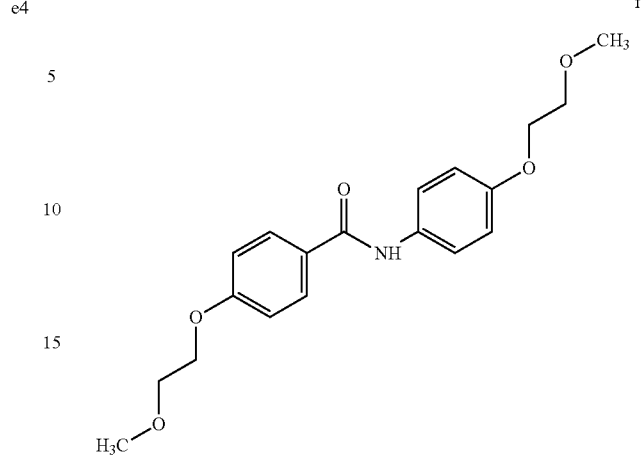
f3
f4
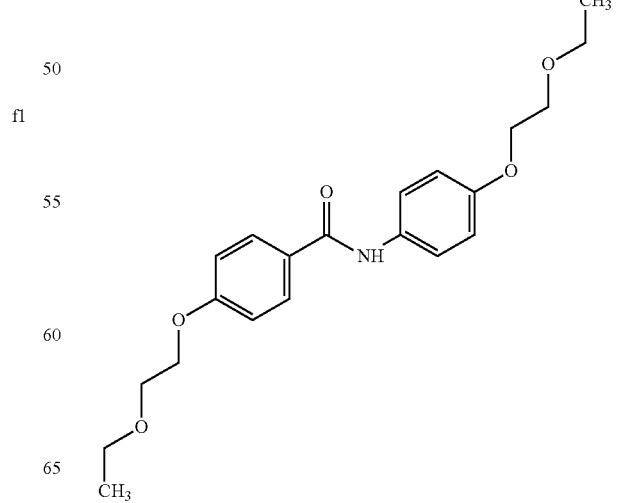

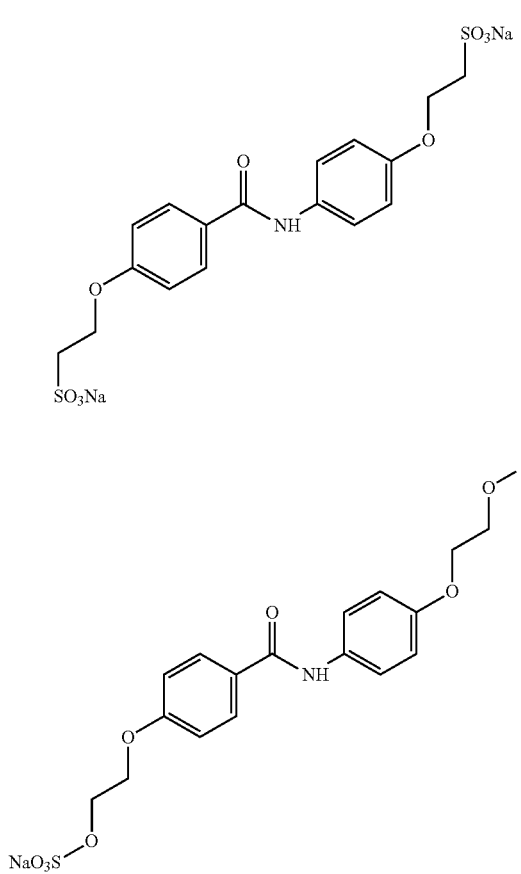
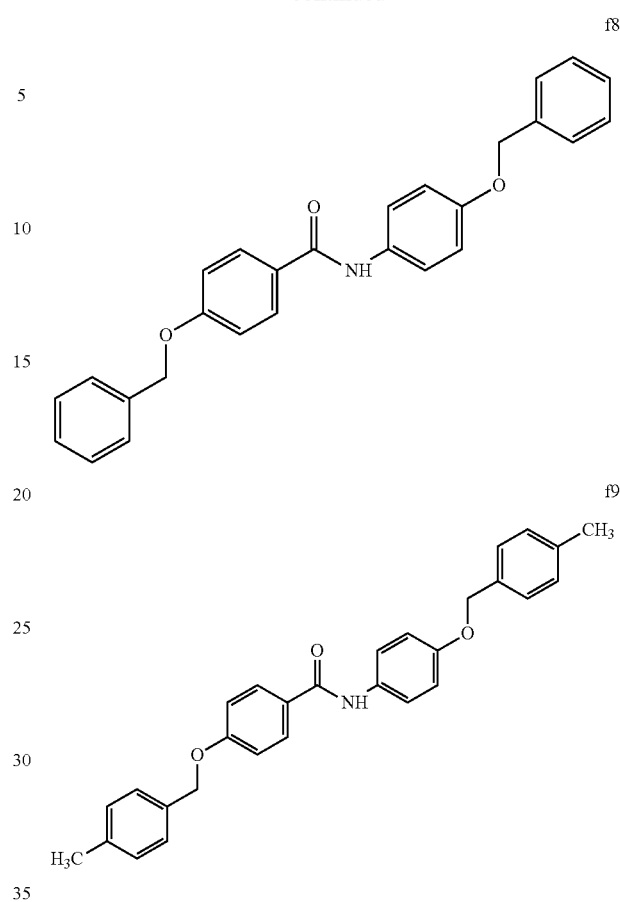
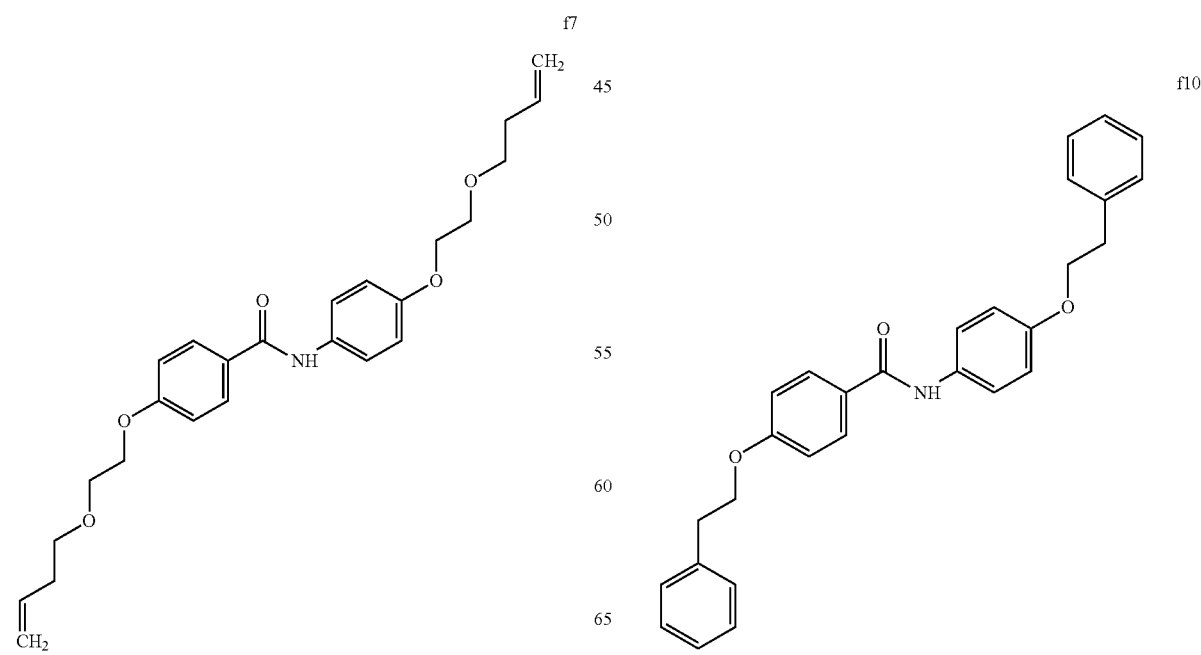

f11
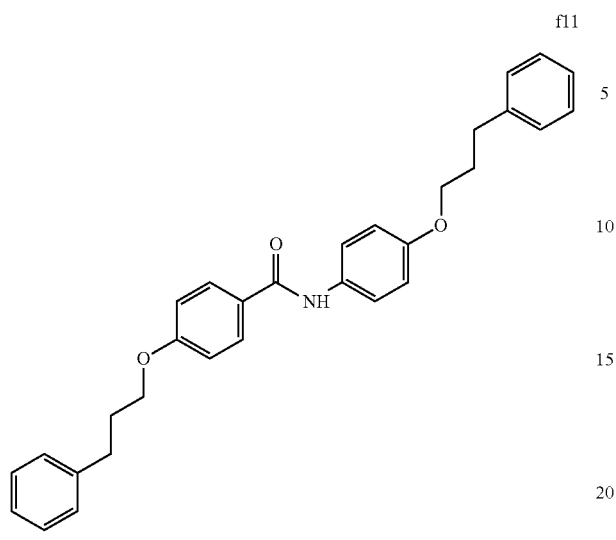
f12
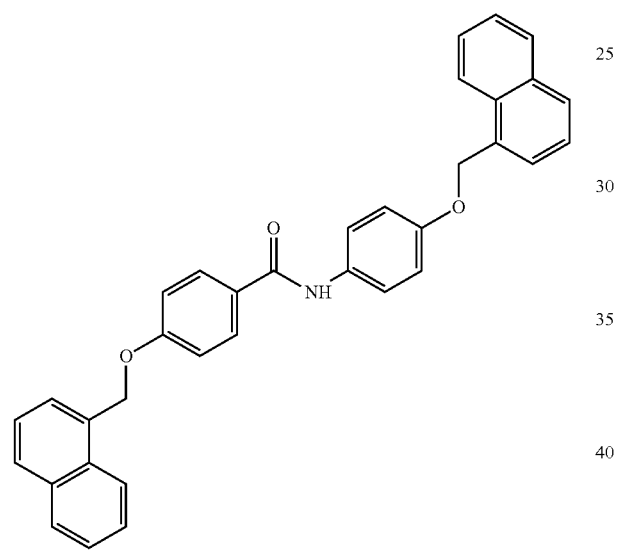
f13
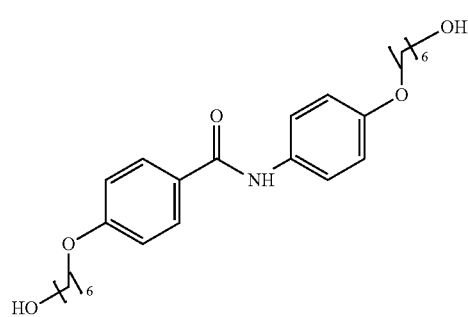
f14
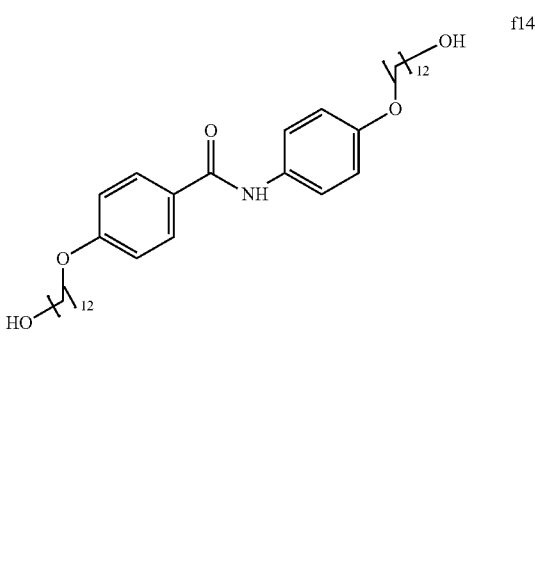
f15
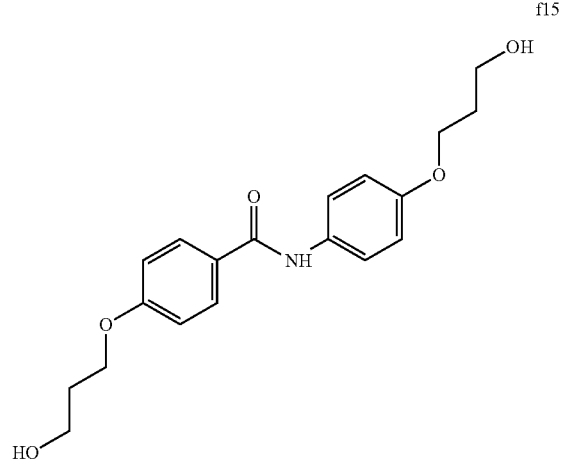
<<Compound Group g>>
g1
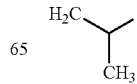

27
-continued
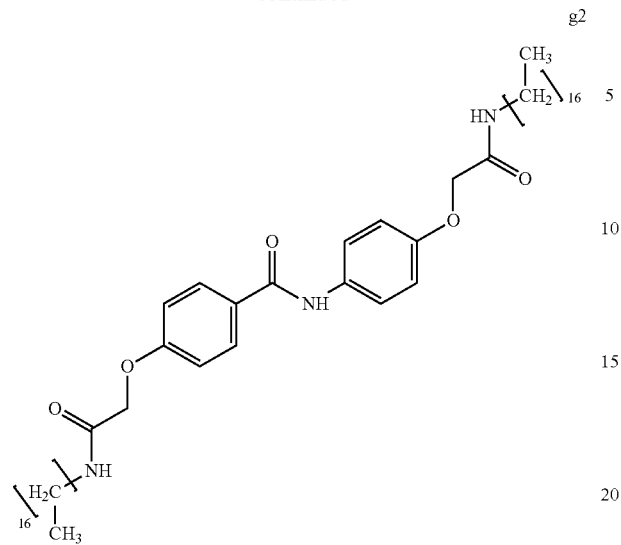
g2
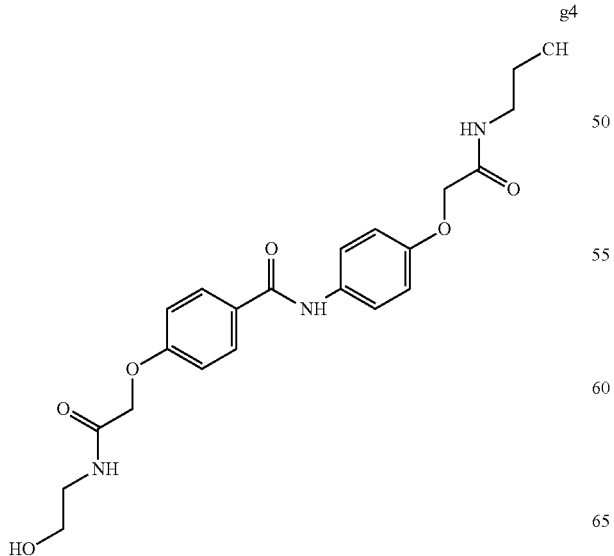
g3
g4
28
-continued
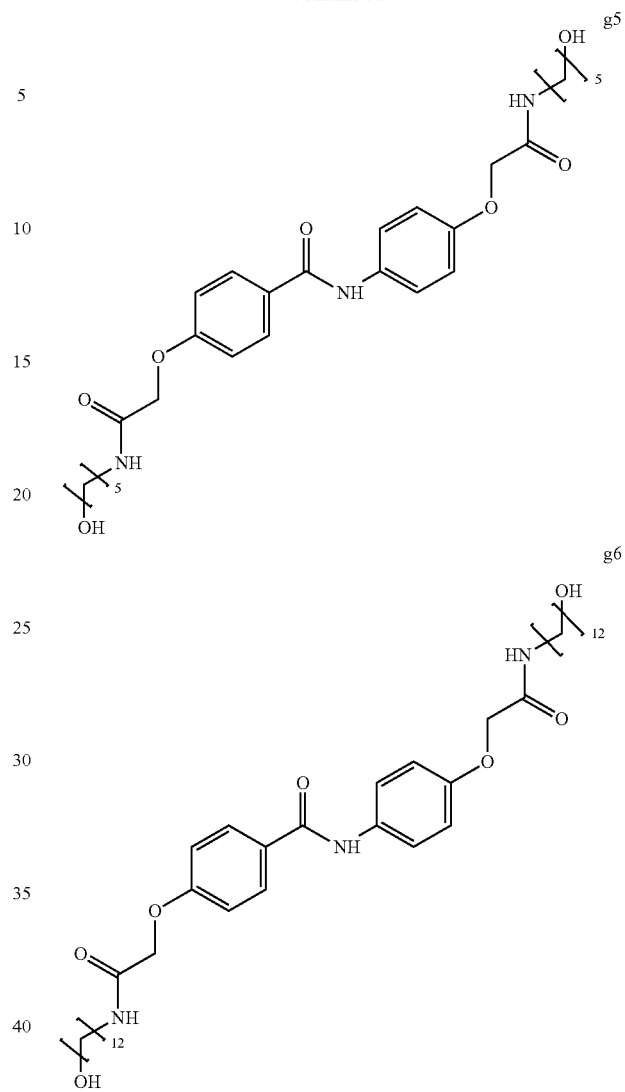
g5
g6
g7

<<Compound Group h>>
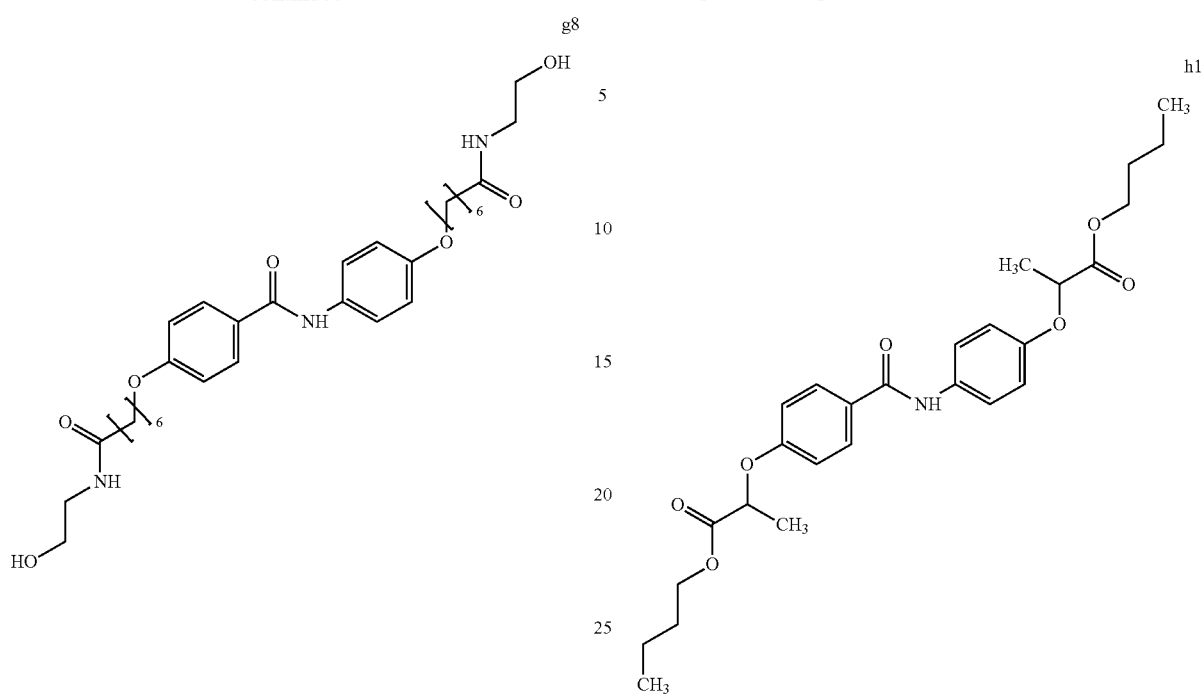
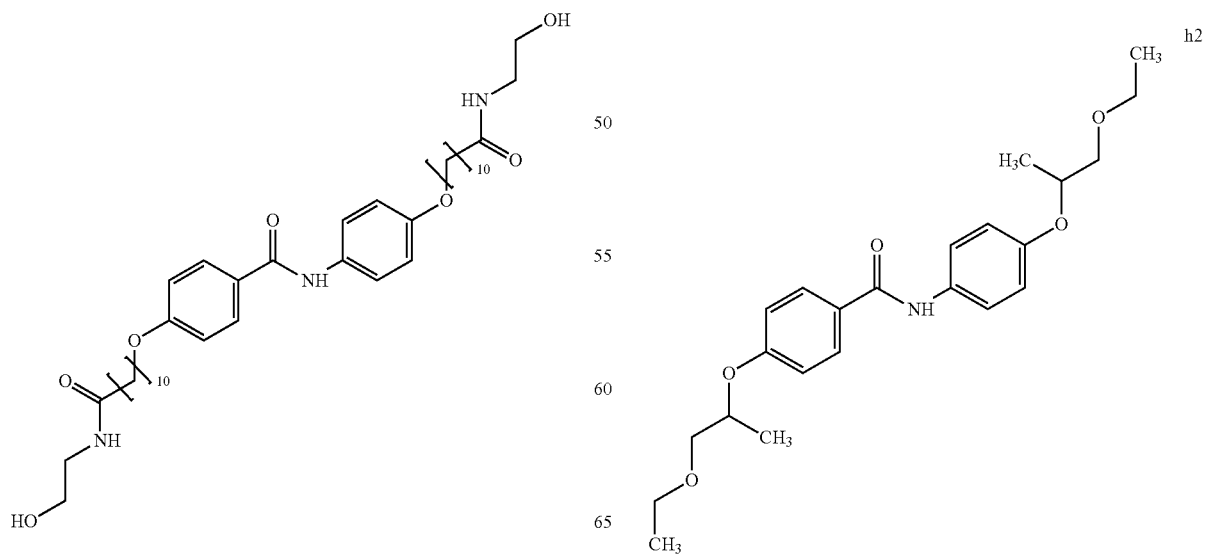

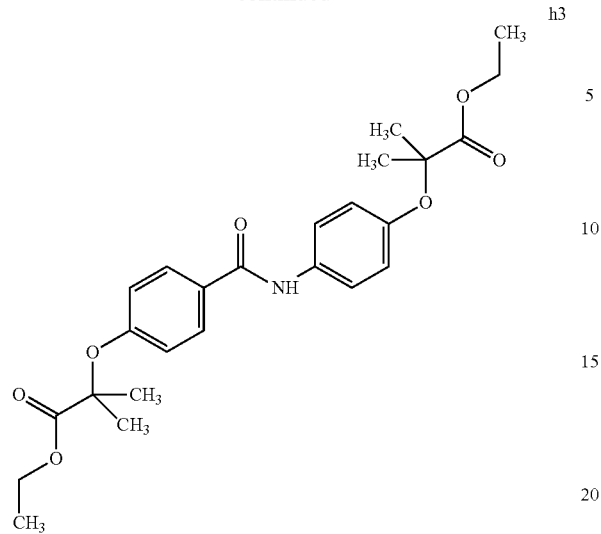
h3
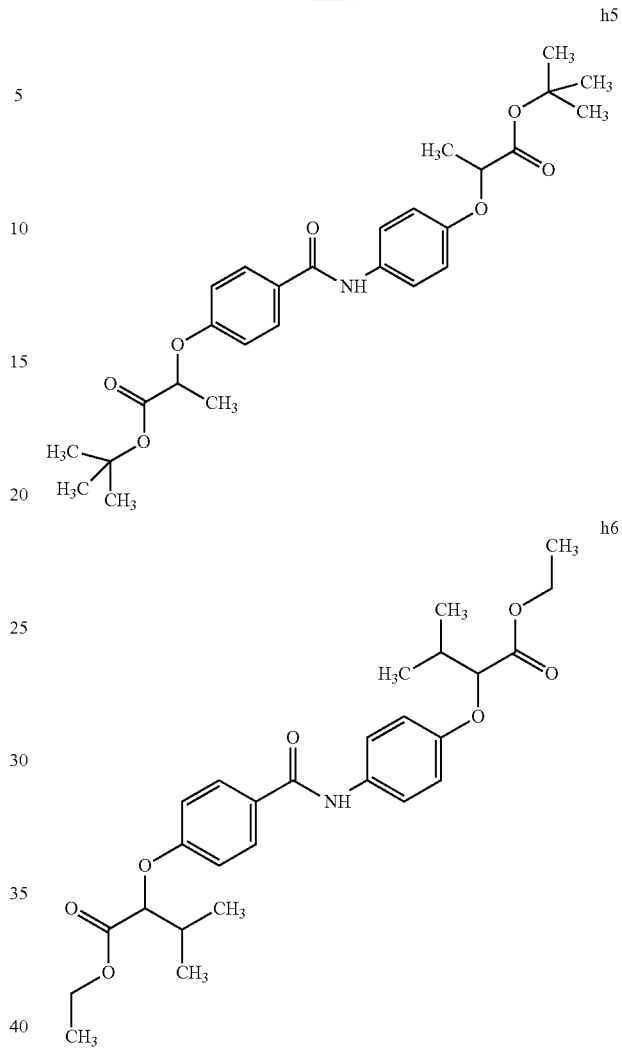
h5
h6
<<Compound Group i>>
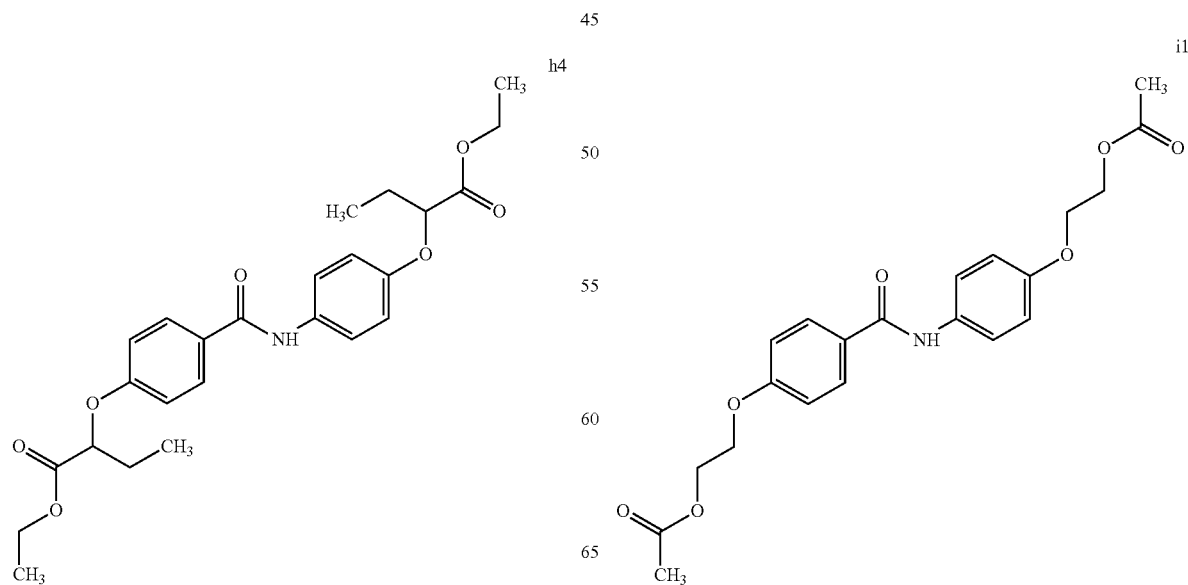
h4
i1

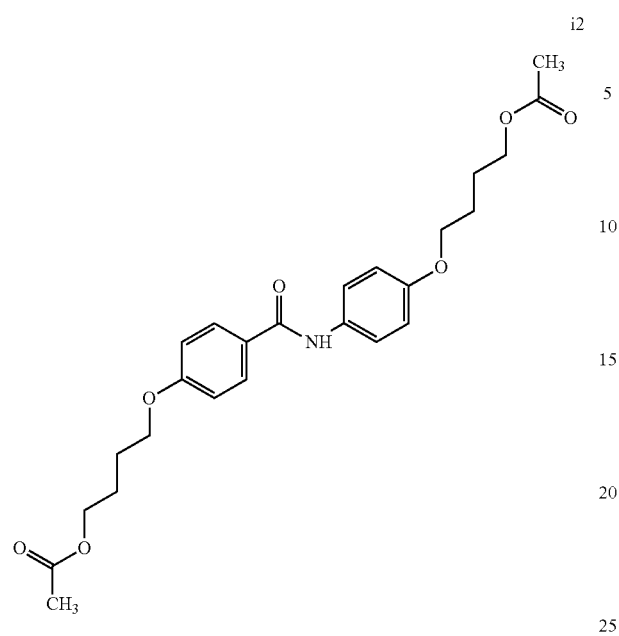
i2
<<Compound Group j>>
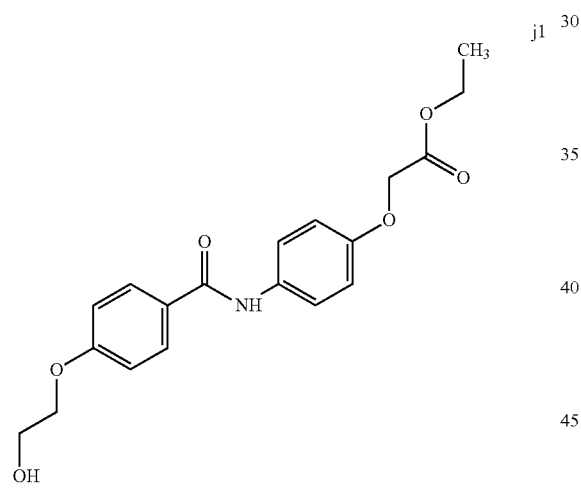
j1
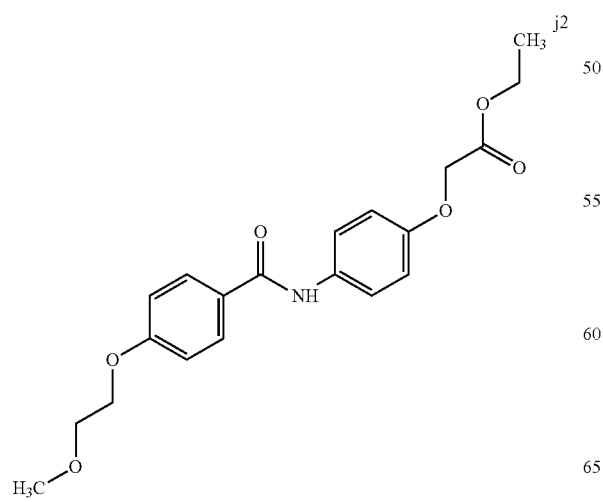
j2
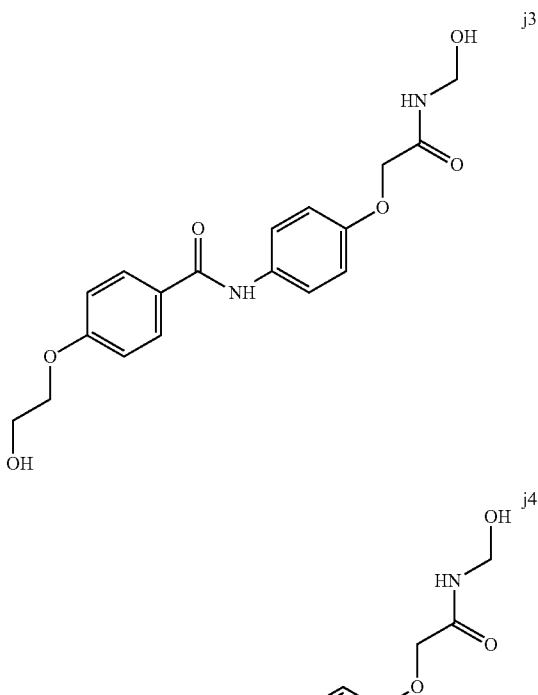
j3
j4
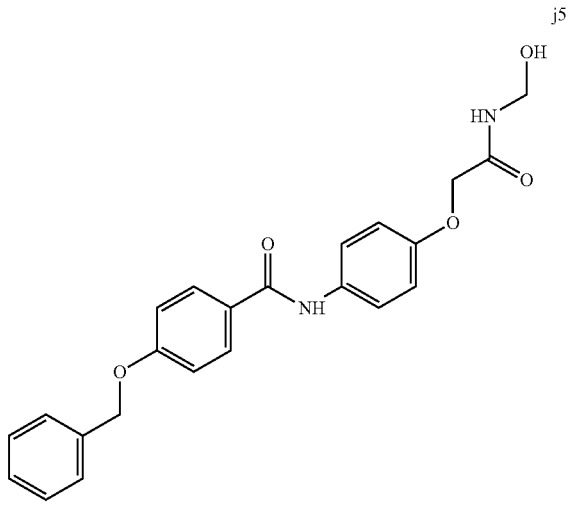
j5

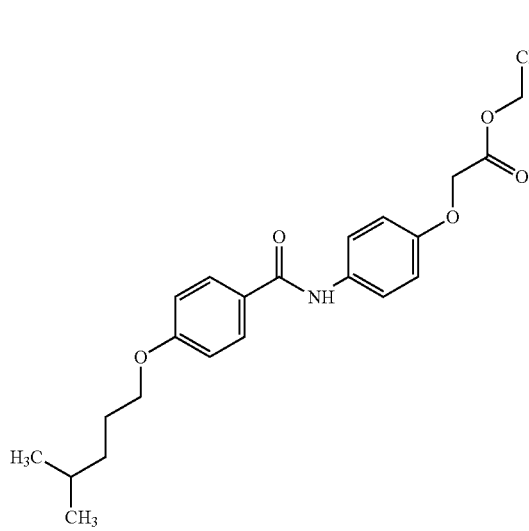

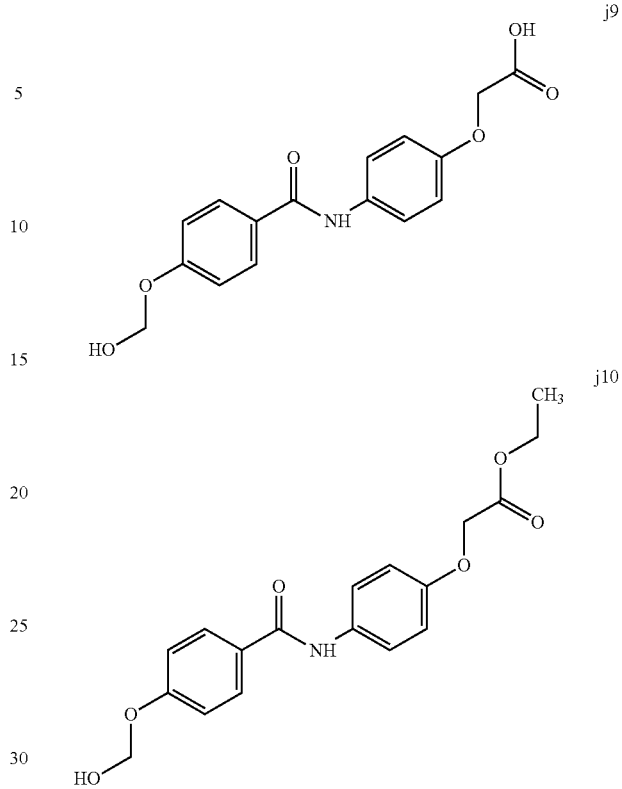

(Coloring Composition)

A coloring composition of the present disclosure includes the organic colorant of the present disclosure, and further includes an organic solvent, water, a resin, a surfactant, and other components, if necessary.

<Organic Solvent>

As the aforementioned organic solvent, an organic solvent used in the typical ink can be used.

Examples of the organic solvent include:

alcohols (e.g., methyl alcohol, ethyl alcohol, n-propyl alcohol, isopropyl alcohol, n-butyl alcohol, tridecyl alcohol, cyclohexyl alcohol, and 2-methylcyclohexyl alcohol);

glycols (e.g., ethylene glycol, diethylene glycol, triethylene glycol, polyethylene glycol, propylene glycol, and dipropylene glycol);

glycol ethers (e.g., ethylene glycol monomethyl ether, ethylene glycol monoethyl ether, ethylene glycol monobutyl ether, ethylene glycol diethyl ether, ethylene glycol dimethyl ether, diethylene glycol monomethyl ether, diethylene glycol monoethyl ether, diethylene glycol monobutyl ether, diethylene glycol ethyl methyl ether, diethylene glycol dimethyl ether, diethylene glycol diethyl ether, diethylene glycol dibutyl ether, propylene glycol monomethyl ether, propylene glycol monoethyl ether, propylene glycol monobutyl ether, dipropylene glycol monomethyl ether, dipropylene glycol monoethyl ether, propylene glycol dimethyl ether, dipropylene glycol dimethyl ether, propylene glycol diethyl ether, dipropylene glycol diethyl ether, ethylene glycol monomethyl acetate, ethylene glycol monoethyl acetate, ethylene glycol monobutyl acetate, diethylene glycol monomethyl acetate, ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monoethyl acetate, diethylene glycol monobutyl acetate, and triethylene glycol monobutyl ether);

esters (e.g., ethyl acetate, isopropylene acetate, n-butyl acetate, methyl lactate, ethyl lactate, and butyl lactate);

ketones (e.g., acetone, methyl ethyl ketone, methyl isobutyl ketone, cyclohexanone, isophorone, and diacetone alcohol); and tetrahydrofuran (THF); and other organic solvents (e.g., hexane, toluene, xylene, acetonitrile, γ-butyrolactone, and γ-valerolactone). In terms of compatibility with properties of head nozzles during printing, safety, and drying ability, various solvents are selected, and mixture of one or more solvents can be used if necessary.

These may be used alone or in combination.

As the organic solvent, an aqueous organic solvent used in typical inks can be used.

Examples of the aqueous organic solvent include polyhydric alcohols, ethers such as polyhydric alcohol aryl ethers, nitrogen-containing heterocyclic compounds, amides, amines, and sulfur-containing compounds.

Specific examples of the aqueous organic solvent include: polyhydric alcohols (e.g., 1,2-propanediol, 1,3-propanediol, 1,2-butanediol, 1,3-butanediol, 1,4-butanediol, 2,3-butanediol, 3-methyl-1,3-butanediol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol); polyhydric alcohol aryl ethers (e.g., ethylene glycol monophenyl ether, and ethylene glycol monobenzyl ether); nitrogen-containing heterocyclic compounds (e.g., 2-pyrrolidone, N-methyl-2-pyrrolidone, N-hydroxyethyl-2-pyrrolidone, 1,3-dimethyl-2-imidazolidinone, and ε-caprolactam); amides (e.g., formamide, N-methylformamide, N,N-dimethylformamide, 3-methoxy-N,N-dimethylpropionamide, and 3-butoxy-N,N-dimethylpropionamide); amines (e.g., monoethanolamine, diethanolamine, and triethylamine); sulfur-containing compounds (e.g., dimethyl sulfoxide, sulfolane, and thiodiethanol); propylene carbonate; and ethylene carbonate.

These may be used alone or in combination.

An amount of the organic solvent is preferably 1% by mass or more but 95% by mass or less, more preferably 30% by mass or more but 90% by mass or less, relative to the total amount of the coloring composition in terms of moisture retaining property of the coloring composition, solubility of the organic colorant, improvement of dispersibility, and effective permeation of the coloring composition into a print medium.

Note that, all the other components except for the colorant and the additives (surfactant and dispersing agent) in the coloring composition may be organic solvents, and the coloring composition may be used without addition of water. Even in this case, contained water that cannot be removed may be included.

<Water>

The water is not particularly limited and may be appropriately selected depending on the intended purpose. Examples thereof include pure waters (e.g., ion exchanged water, ultrafiltrated water, reverse osmotic water, and distilled water) and ultrapure water. These may be used alone or in combination.

When the organic colorant, which is a colorant having silvery gloss, is dissolved or dispersed in a medium, all of the resultant products can be used as the coloring composition. The medium to be used is preferably water, a mixture solvent of water and an aqueous organic solvent, or an organic solvent. The organic solvent to be used is particularly preferably a solvent that has an effect on preventing the coloring composition from drying. The water to be used is preferably ion exchanged water, rather than typical water including various ions.

An amount of water is not particularly limited and may be appropriately selected depending on the intended purpose. The amount of water is preferably 1% by mass or more but 70% by mass or less, more preferably 3% by mass or more but 50% by mass or less, relative to the total amount of the coloring composition, in terms of solubility of the organic colorant in the coloring composition, discharge stability of the coloring composition, and prevention of clogging at a nozzle tip.

<Resin>

The resin is not particularly limited and may be appropriately selected depending on the intended purpose. Examples thereof include, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

In the state of a resin emulsion in which resin particles are dispersed in water as a dispersion medium, the coloring composition can be obtained by mixing such resin particles with materials (e.g., coloring agent and organic solvent). As the resin particles, an appropriately synthesized product may be used or a commercially available product may be used. These may be used alone or in combination.

As the resin emulsion, a commercially available product can be used. Examples thereof include ACRIT WEM-321U (acrylic urethane aqueous emulsion, available from Taisei Kako Co., Ltd.).

<Dispersing Agent>

In order to disperse the organic colorant of the present disclosure in an aqueous medium, a dispersing agent may be used. As the dispersing agent, a chemically synthesized surfactant (e.g., ionic surfactants and nonionic surfactants) can be used. In addition, a surfactant originated from natural products or this surfactant modified with, for example, an enzyme can be used.

As the dispersing agent, a commercially available product can be used. Examples of the commercially available product include DISPERBYK-190 (available from BYK-Chemie).

An amount of the dispersing agent is preferably 0.5% by mass or more but 20% by mass or less relative to the total amount of the coloring composition in order to favorably retain dispersion stability of the organic colorant.

<Surfactant>

Examples of the surfactant include silicone-based surfactants, fluorosurfactants, amphoteric surfactants, nonionic surfactants, and anionic surfactants.

Examples of the fluorosurfactants include PolyFox PF-156A (available from Omnova).

<Other Components>

In addition to the aforementioned components, the coloring composition of the present disclosure may include a pH regulator, a preservative, a fungicide, and various additives if necessary, in order to obtain an ink having desired values of physical properties within such a range that does not inhibit the effects of the present disclosure.

<pH regulator>

The pH regulator has no particular limit. It is preferable to adjust the pH to 7 or higher. Specific examples thereof include, but are not limited to, amines such as diethanol amine and triethanol amine.

<Preservatives and Fungicides>

The preservatives and fungicides are not particularly limited. A specific example is 1,2-benzisothiazolin-3-on.

Examples of application of the coloring composition include paints, print inks, colorants for plastics, and color toners. Examples of the print inks include inks for offset printing, inks for gravure printing, inks for flexography printing, and inkjet inks.

The coloring composition can be produced by dispersing materials together with, for example, a dispersion medium using a known disperser. The dispersion medium as used herein means water or an organic solvent during a dispersion treatment using a disperser. That is, the same water or solvent as the water or solvent during the mixing is also referred to as "dispersion medium" during the dispersion treatment for the sake of convenience.

If necessary, various stabilizers and auxiliaries such as dispersing and wetting agents, antiskinning agents, ultraviolet absorbers, and antioxidants may be used.

The varnish used in the inks for offset printing is formed of: a resin (e.g., rosin-modified phenol resin, petroleum resin, alkyd resin, and drying oil-modified resin thereof) as a polymer resin component; a vegetable oil (e.g., linseed oil, tung oil, and soybean oil); and a solvent (e.g., n-paraffin, isoparaffin, aromatic, naphthene, and α-olefin) according to necessity. Amounts of the resin, the vegetable oil, and the solvent are preferably resin:vegetable oil:solvent=20 to 50:0 to 30:10 to 60 in terms of a mass ratio. In addition, the varnish may include acrylic ester as the resin. In addition to the organic colorant and the varnish, the ink for offset printing may further include a known additive such as the organic solvent, a dryer, a leveling improving agent, or a thickener, if necessary.

The vehicle used in the inks for gravure printing and the inks for flexography printing means an article including a plurality of additives such as resins, solvents, and plasticizers.

Examples of the resin include acrylic-based resins, nitrocellulose-based resins, polyamide-based resins, urethane-based resins, vinyl acetate-based resins, and rosin-based resins. These may be used alone or in combination.

Examples of the solvent include aromatic hydrocarbons, esters, ketones, and alcohols. Specific examples thereof include toluene, xylene, ethyl acetate, butyl acetate, methyl butyl ketone, methyl ethyl ketone, isopropyl alcohol, methanol, and ethanol. These may be used alone or in combination.

The vehicle used in the paint means an article including a plurality of materials such as solvents, resins, and additives.

Irrespective of presence or absence of curing ability and one-pack type/two-pack type, examples of the resin include alkyd resins, modified-alkyd resins, acrylic resins, alkyd-melamine resins, acryl-melamine resins, phenol resins, polyamide resins, epoxy resins, urethane resins, and vinyl acetate resins.

Examples of the solvent include aromatic hydrocarbons, esters, ketones, and alcohols. Specific examples thereof include water, toluene, xylene, ethyl acetate, butyl acetate, methyl butyl ketone, methyl ethyl ketone, isobutyl alcohol, normal butanol, and cyclohexanone. These may be used alone or in combination.

The resin used in the colorants for plastics is not particularly limited and may be appropriately selected depending on the intended purpose. Examples thereof include poly(meth)acrylate, polystyrene, ABS resins, AS resins, polyolefins (e.g., polyethylene and polypropylene), polyamide, polyacetal, polycarbonate, polyesters (e.g., PET and PBT), and thermoplastic resins (e.g., modified-polyphenylene ether).

Examples of the resin used in the color toners include styrene and derivatives thereof (e.g., styrene, vinyltoluene, α-methylstyrene, and aminostyrene); methacrylic acid esters (e.g., methacrylic acid, methyl methacrylate, ethyl methacrylate, and butyl methacrylate); acrylic esters (e.g., acrylic acid, methyl acrylate, ethyl acrylate, butyl acrylate, and 2-ethylhexyl acrylate); dienes (e.g., butadiene and isoprene); acrylonitriles; maleic acid, maleic anhydride, maleic acid esters; vinyl compounds (e.g., vinyl ether and vinyl acetate); homopolymers and copolymers of olefins (e.g., ethylene and propylene), polyesters, polyamides, and polyurethanes. These may be used alone or in combination. If necessary, known materials such as charge controlling agents (e.g., metal salts of salicylic acids, metal-containing azo compounds, nigrosine, and quaternary ammonium salts) or offset prevention agents (e.g., low-molecular-weight polypropylene, low-molecular-weight polyethylene, and waxes) may be added.

An amount of the organic colorant is preferably 70.0% by mass or less, more preferably 0.01% by mass or more but 50.0% by mass or less, still more preferably 0.5% by mass or more but 15% by mass or less, relative to the total amount of the coloring composition. Note that, the balance is preferably the dispersion medium.

Since the dispersion conditions differ depending on the dispersion medium and the disperser, a dispersion temperature and a dispersion time cannot be specified. The dispersion temperature is preferably room temperature to 240° C., more preferably room temperature to 150° C. The dispersion time is preferably within 120 hours, more preferably within 5 hours.

The coloring composition is mixed with, for example, other additives, a pigment, or a dye according to necessity, and can be finally used as, for example, paints, print inks, colorants for plastics, color toners, and inkjet ink.

The disperser that disperses a pigment when the pigment dispersion is produced is not particularly limited and a known disperser may be appropriately selected depending on the intended purpose. Examples thereof include dispers, homomixers, bead mills, ball mills, twin rolls, triple rolls, pressure kneaders, and ultrasonic dispersers.

(Inkjet Ink)

An inkjet ink of the present disclosure includes the organic colorant of the present disclosure, and further includes an organic solvent, water, a resin, a surfactant, and other components, if necessary.

An amount of the organic colorant is preferably 1.0% by mass or more but 30.0% by mass or less, more preferably 5.0% by mass or more but 25.0% by mass or less, relative to the total amount of the inkjet ink. When the amount is 1.0% by mass or more but 30.0% by mass or less, an image excellent in silvery gloss can be obtained.

The organic solvent, the water, the resin, the surfactant, and the other components in the inkjet ink are appropriately applicable to the items described in the coloring composition.

EXAMPLES

The present disclosure will be described in detail with reference to the following Examples. However, it is noted that the present disclosure is not limited to these Examples.

Example 1 (Synthesis of Compound a1)

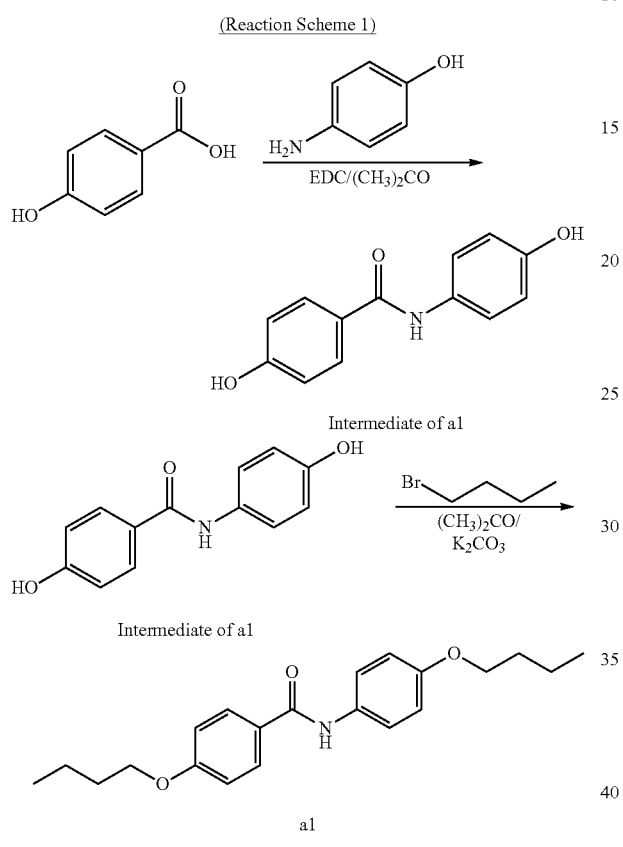

Under a nitrogen atmosphere, a two-necked, recovery flask was charged with p-aminophenol (2.19 g, 20.1 mmol), 4-hydroxybenzoic acid (2.77 g, 20.1 mmol), and 1-ethyl-3-(3-dimethylaminopropyl)carbodiimide hydrochloride (EDC) (3.75 g, 24.2 mmol). Then, acetone (dehydrated) (50 mL) was added thereto and was heated to reflux for 12 hours. Then, the solvent was removed under reduced pressure. The residue was washed once with ethyl acetate (40 mL) and was washed once with dilute hydrochloric acid (40 mL). The resultant was subjected to vacuum filtration to obtain an intermediate of compound a1. The yield was 72%.

Results of NMR measurements of the intermediate of compound a1 are as follows.

$^1$H NMR (400 MHz; CH$_3$OD): δ
7.79 (doublet (d), 4H), 7.40 (d, 4H), 6.85 (d, 4H), 6.77 (d, 4H)

Next, a two-necked, a recovery flask was charged with the synthesized intermediate of compound a1 (3.30 g, 14.4 mmol), 1-bromobutane (19.74 g, 144.1 mmol), and potassium carbonate (13.9 g, 100.9 mmol). Then, acetone (300 mL) was added thereto and was heated to reflux for 72 hours. Then, the solvent was removed under reduced pressure. Then, the residue was washed twice with hexane (100 mL) (100 mL×2 times). Furthermore, the residue after the washing with hexane was recrystallized with acetone to obtain compound a1 as a target product. The yield was 55%.

NMR measurements of the compound a1 are as follows.
$^1$H NMR (400 MHz; CDCl3): δ
7.82 (d, 4H), 7.60 (singlet(s), 1H), 7.97 (d, 4H), 7.91 (d, 4H), 4.03 (triplet (t), 2H), 3.97 (t, 2H), 1.80 (multilet (m), 4H), 1.50 (m, 4H), 0.99 (m, 6H)

Next, the compound a1 (2.0 g) and methanol (1,200 mL) were added to a 30 mL-sample bottle. The mixture liquid was heated to 80° C. to completely dissolve the solid. Then, the solution was left to stand for 24 hours under room temperature. The precipitated crystal was stacked on a round filter paper (diameter of 21 mm) through vacuum filtration to obtain a crystalline thin film body having silvery gloss of the compound a1.

Example 2 (Synthesis of Compound a2)

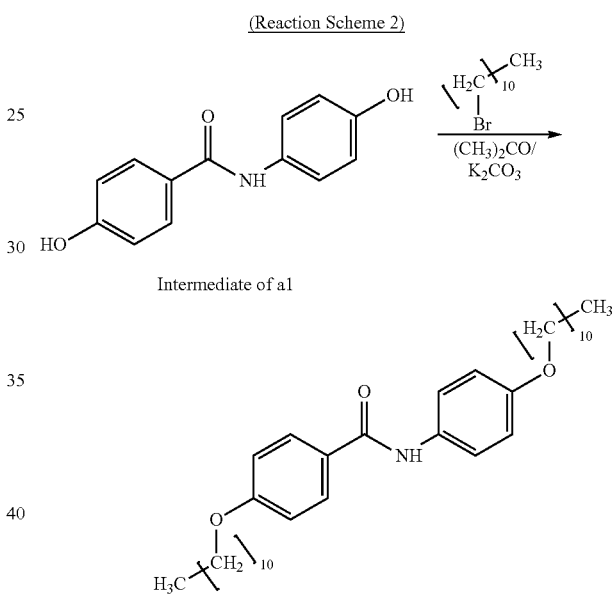

A crystalline thin film body having silvery gloss of compound a2 was obtained in the same manner as in Example 1 except that 1-bromobutane was changed to 1-bromoundecane (33.89 g) (144.1 mmol). NMR measurement was performed in the same manner as in Example 1 to identify that the compound a2 was obtained.

Example 3 (Synthesis of Compound a3)

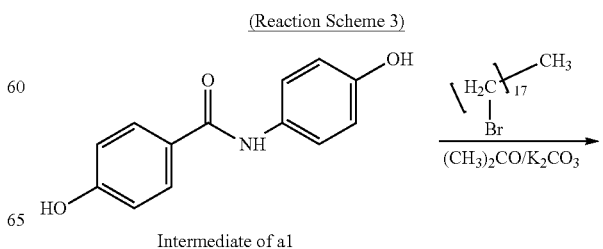

-continued

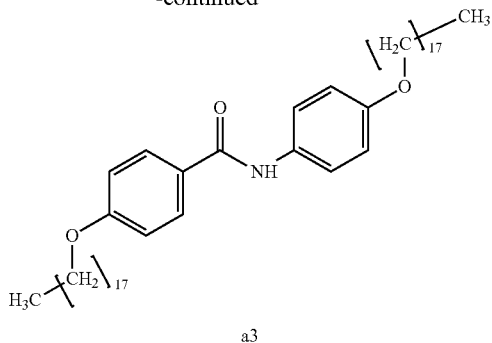

a3

A crystalline thin film body having silvery gloss of compound a3 was obtained in the same manner as in Example 1 except that 1-bromobutane was changed to 1-bromooctadecane (48.04 g) (144.1 mmol). NMR measurement was performed in the same manner as in Example 1 to identify that the compound a3 was obtained.

Example 4 (Synthesis of Compound a4)

(Reaction Scheme 4)

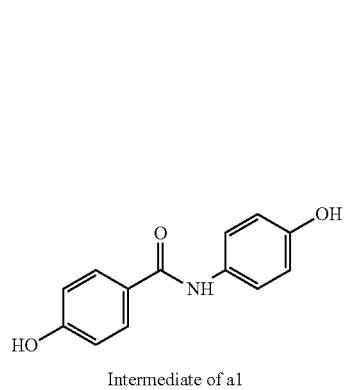
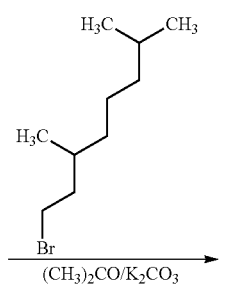
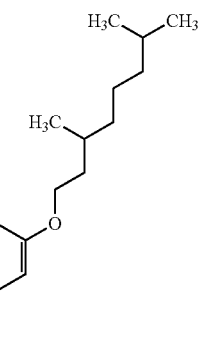

a4

A crystalline thin film body having silvery gloss of compound a4 was obtained in the same manner as in Example 1 except that 1-bromobutane was changed to 1-bromo-3,7-dimethyloctane (31.87 g) (144.1 mmol). NMR measurement was performed in the same manner as in Example 1 to identify that the compound a4 was obtained.

Example 5 (Synthesis of Compound a8)

(Reaction Scheme 5)

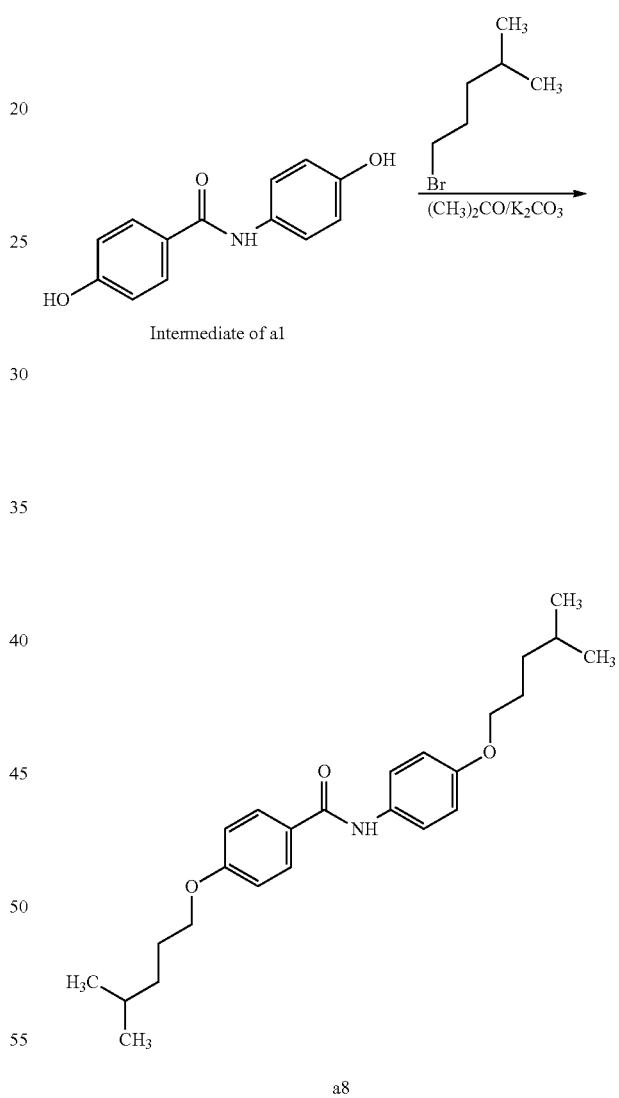

a8

A crystalline thin film body having silvery gloss of compound a8 was obtained in the same manner as in Example 1 except that 1-bromobutane was changed to 1-bromo-4-methylpentane (23.79 g) (144.1 mmol). NMR measurement was performed in the same manner as in Example 1 to identify that the compound a8 was obtained.

Example 6 (Synthesis of Compound b2)

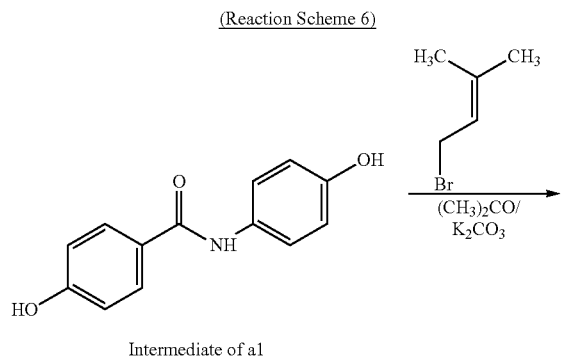

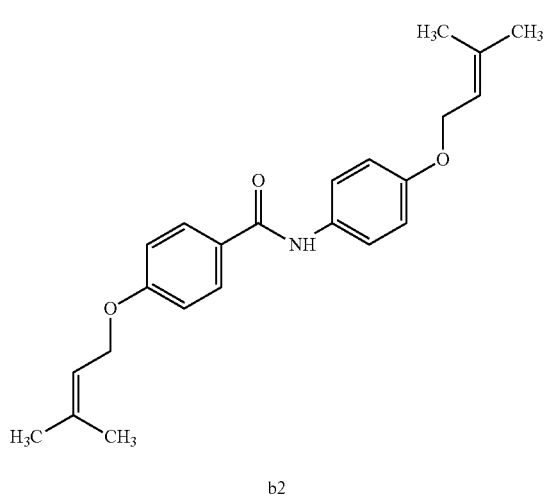

A crystalline thin film body having silvery gloss of compound b2 was obtained in the same manner as in Example 1 except that 1-bromobutane was changed to 1-bromo-3-methyl-2-butene (21.47 g) (144.1 mmol). NMR measurement was performed in the same manner as in Example 1 to identify that the compound b2 was obtained.

Example 7 (Synthesis of Compound b3)

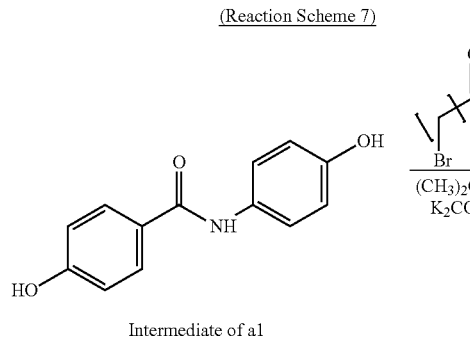

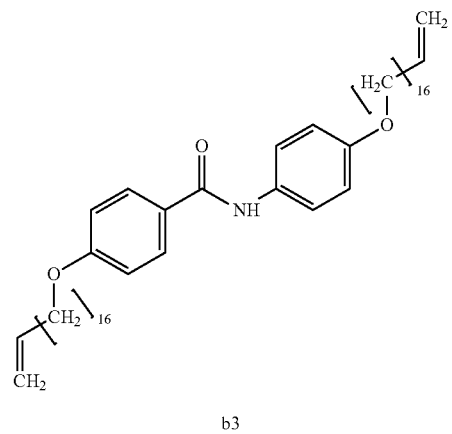

A crystalline thin film body having silvery gloss of compound b3 was obtained in the same manner as in Example 1 except that 1-bromobutane was changed to 18-bromo-1-octadecene (47.75 g) (144.1 mmol). NMR measurement was performed in the same manner as in Example 1 to identify that the compound b3 was obtained.

Example 8 (Synthesis of Compound c1)

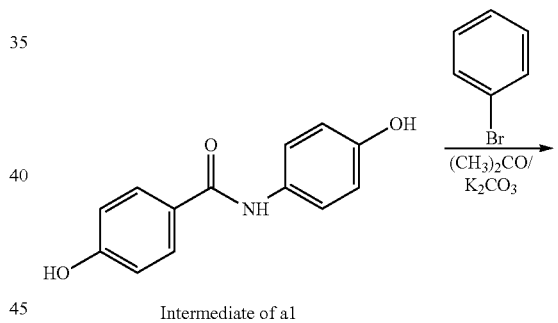

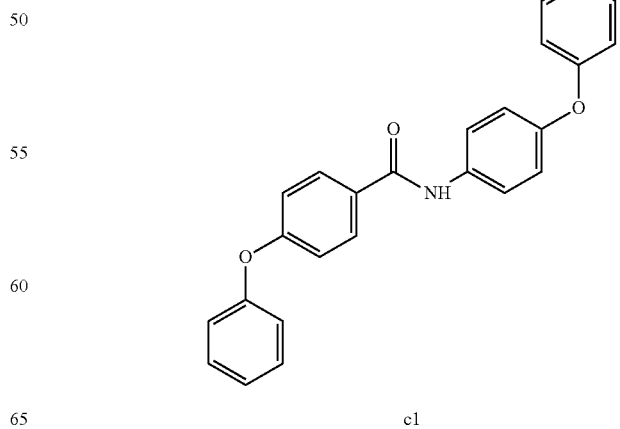

A crystalline thin film body having silvery gloss of compound c1 was obtained in the same manner as in Example 1 except that 1-bromobutane was changed to bromobenzene (22.62 g) (144.1 mmol). NMR measurement was performed in the same manner as in Example 1 to identify that the compound c1 was obtained.

Example 9 (Synthesis of Compound c3)

(Reaction Scheme 9)

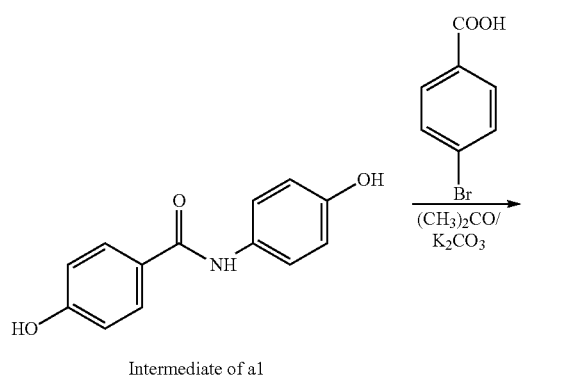

Intermediate of a1

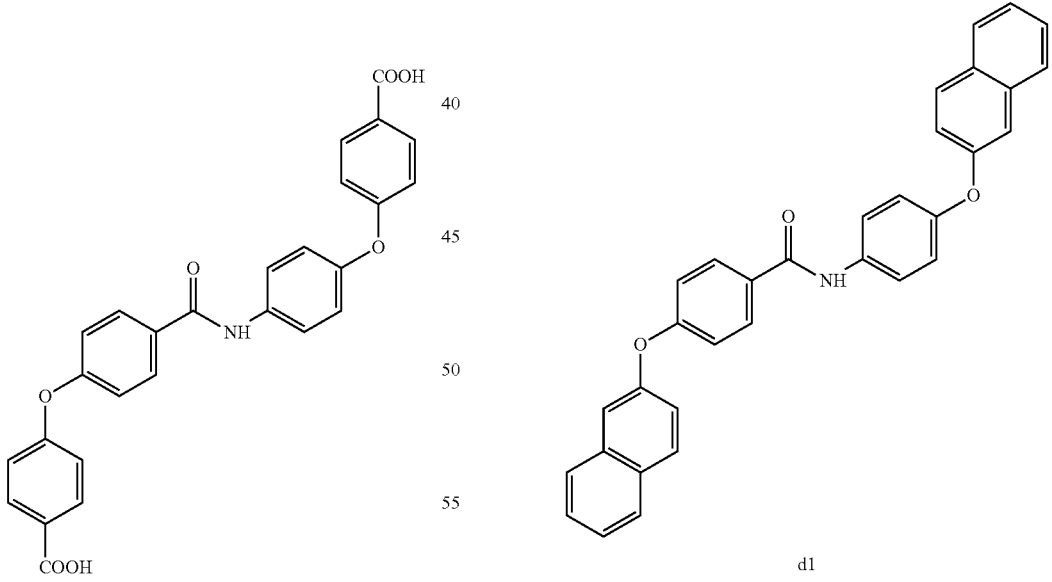

c3

A crystalline thin film body having silvery gloss of compound c3 was obtained in the same manner as in Example 1 except that 1-bromobutane was changed to 4-bromobenzoic acid (28.97 g) (144.1 mmol). NMR measurement was performed in the same manner as in Example 1 to identify that the compound c3 was obtained.

Example 10 (Synthesis of Compound d1)

(Reaction Scheme 10)

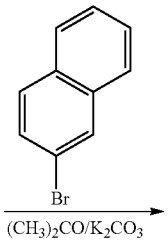

Intermediate of a1 d1

A crystalline thin film body having silvery gloss of compound (d1) was obtained in the same manner as in Example 1 except that 1-bromobutane was changed to 2-bromonaphthalene (29.84 g) (144.1 mmol). NMR measurement was performed in the same manner as in Example 1 to identify that the compound d1 was obtained.

Example 11 (Synthesis of Compound d7)

(Reaction Scheme 11)

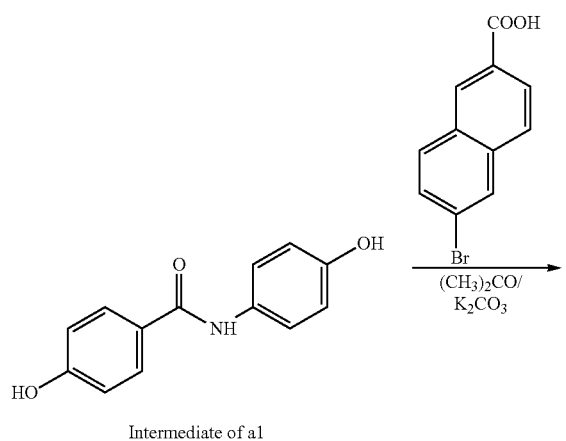

Intermediate of a1

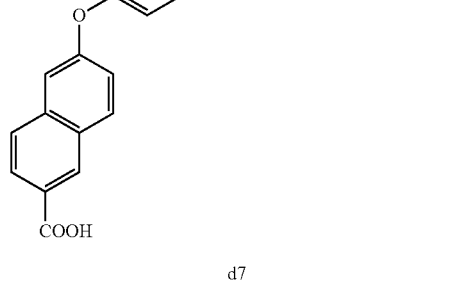

d7

A crystalline thin film body having silvery gloss of compound d7 was obtained in the same manner as in Example 1 except that 1-bromobutane was changed to 6-bromo-2-naphthoic acid (36.18 g) (144.1 mmol). NMR measurement was performed in the same manner as in Example 1 to identify that the compound d7 was obtained.

Example 12 (Synthesis of Compound e1)

(Reaction Scheme 12)

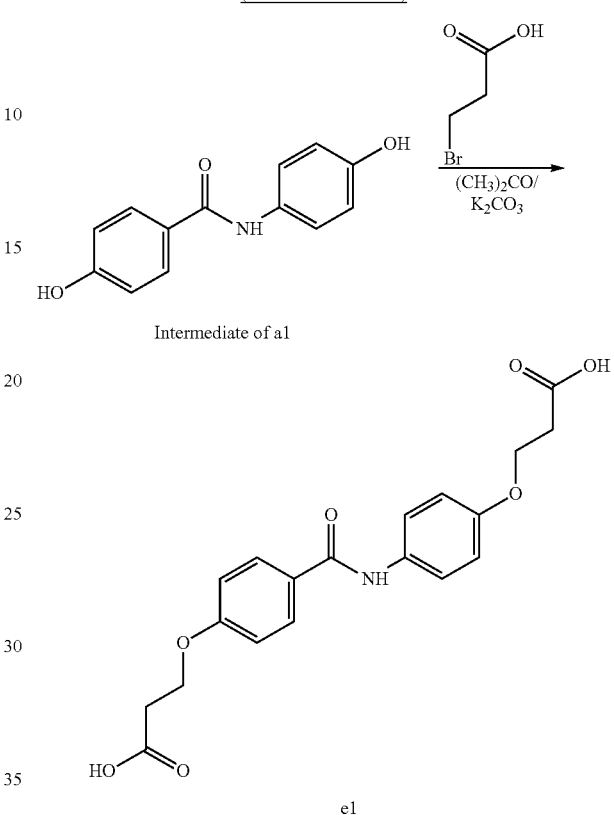

Intermediate of a1 e1

A crystalline thin film body having silvery gloss of compound e1 was obtained in the same manner as in Example 1 except that 1-bromobutane was changed to 3-bromopropionic acid (22.04 g) (144.1 mmol). NMR measurement was performed in the same manner as in Example 1 to identify that the compound e1 was obtained.

Example 13 (Synthesis of Compound e2)

(Reaction Scheme 13)

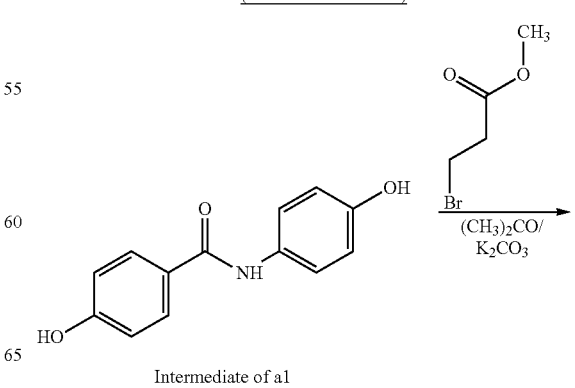

Intermediate of a1

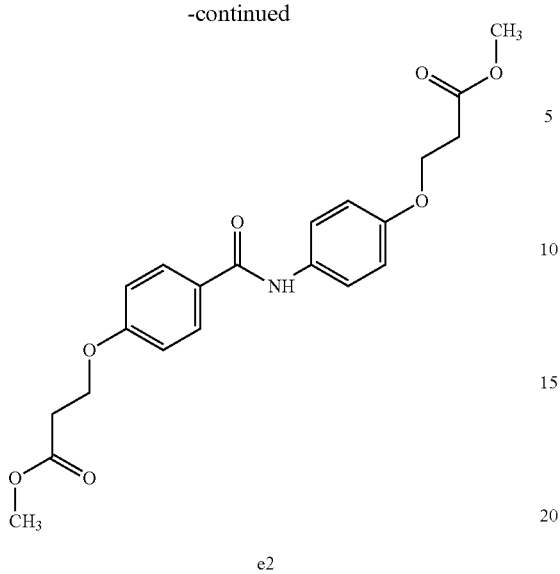

e2

A crystalline thin film body having silvery gloss of compound e2 was obtained in the same manner as in Example 1 except that 1-bromobutane was changed to methyl 3-bromopropionate (24.07 g) (144.1 mmol). NMR measurement was performed in the same manner as in Example 1 to identify that the compound e2 was obtained.

Example 14 (Synthesis of Compound e3)

(Reaction Scheme 14)

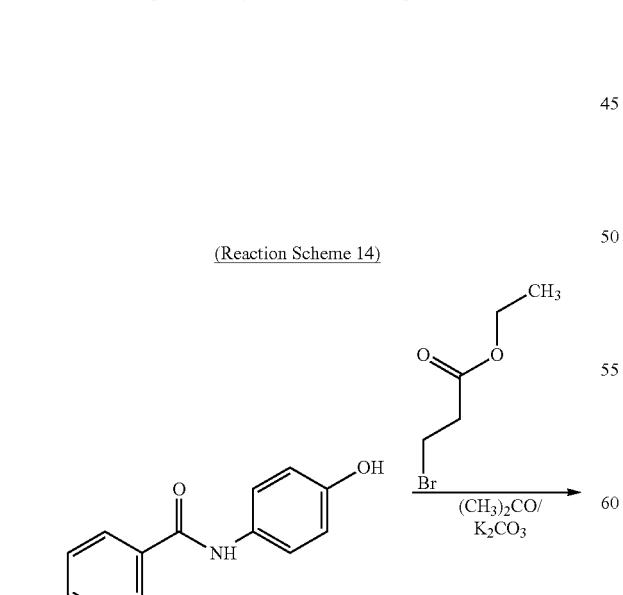

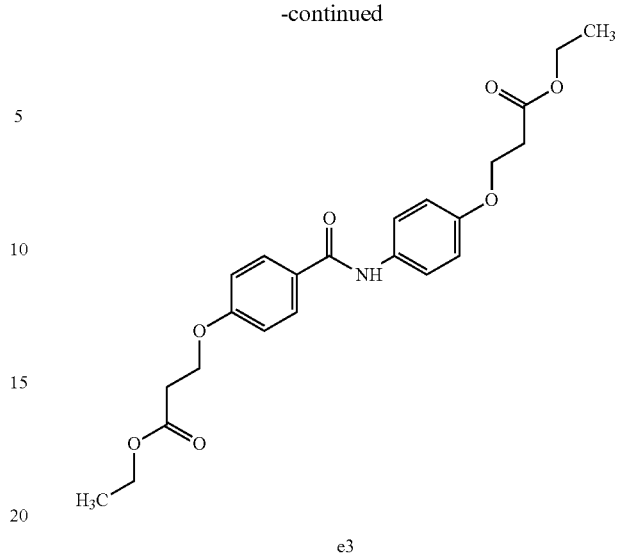

e3

A crystalline thin film body having silvery gloss of compound e3 was obtained in the same manner as in Example 1 except that 1-bromobutane was changed to ethyl 3-bromopropionate (26.08 g) (144.1 mmol). NMR measurement was performed in the same manner as in Example 1 to identify that the compound e3 was obtained.

Example 15 (Synthesis of Compound e5)

(Reaction Scheme 15)

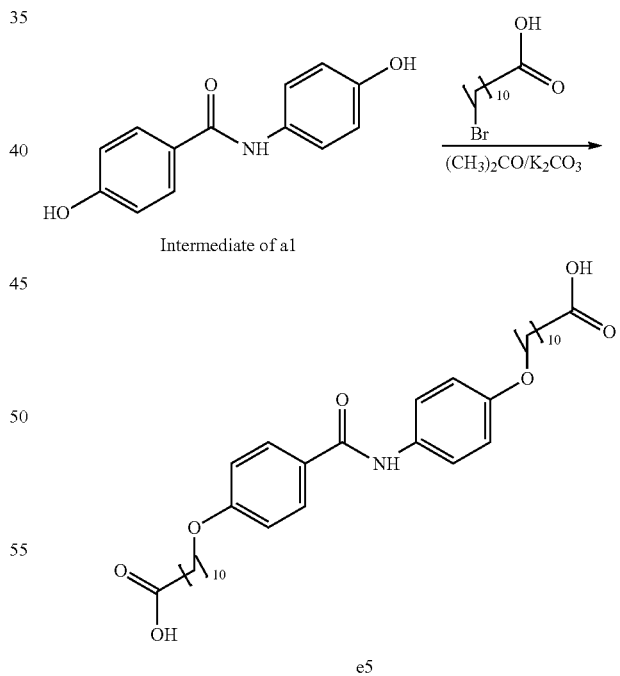

e5

A crystalline thin film body having silvery gloss of compound e5 was obtained in the same manner as in Example 1 except that 1-bromobutane was changed to 11-bromoundecanoic acid (38.21 g) (144.1 mmol). NMR measurement was performed in the same manner as in Example 1 to identify that the compound e5 was obtained.

Example 16 (Synthesis of Compound f1)

(Reaction Scheme 16)

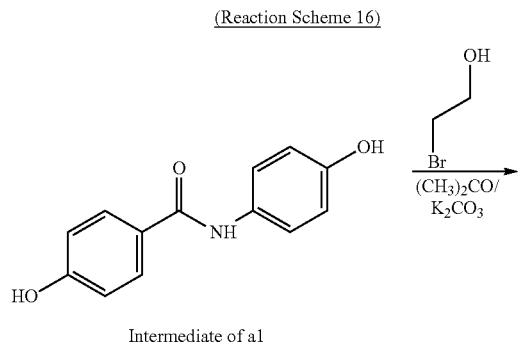

Intermediate of a1

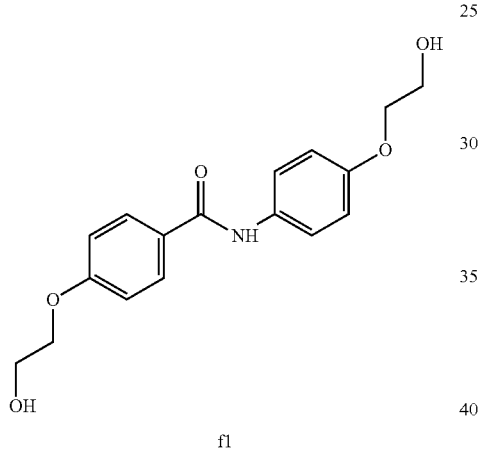

f1

A crystalline thin film body having silvery gloss of compound f1 was obtained in the same manner as in Example 1 except that 1-bromobutane was changed to 2-bromoethanol (18.01 g) (144.1 mmol). NMR measurement was performed in the same manner as in Example 1 to identify that the compound f1 was obtained.

Example 17 (Synthesis of Compound f2)

(Reaction Scheme 17)

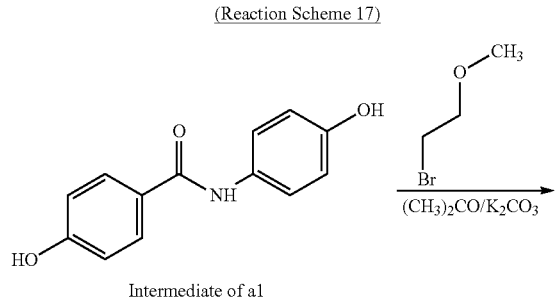

Intermediate of a1

-continued

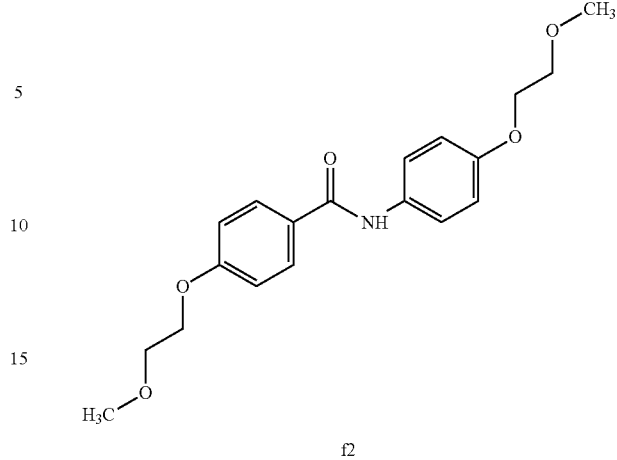

f2

A crystalline thin film body having silvery gloss of compound f2 was obtained in the same manner as in Example 1 except that 1-bromobutane was changed to 2-bromoethyl methyl ether (20.03 g) (144.1 mmol). NMR measurement was performed in the same manner as in Example 1 to identify that the compound f2 was obtained.

Example 18 (Synthesis of Compound f4)

(Reaction Scheme 18)

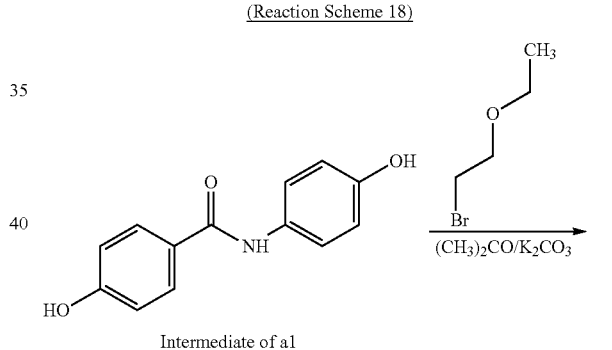

Intermediate of a1

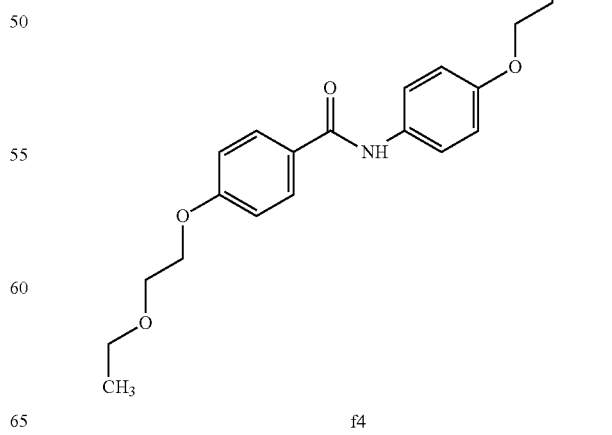

f4

A crystalline thin film body having silvery gloss of compound f4 was obtained in the same manner as in Example 1 except that 1-bromobutane was changed to 2-bromoethyl ethyl ether (22.05 g) (144.1 mmol). NMR measurement was performed in the same manner as in Example 1 to identify that the compound f4 was obtained.

Example 19 (Synthesis of Compound f5)

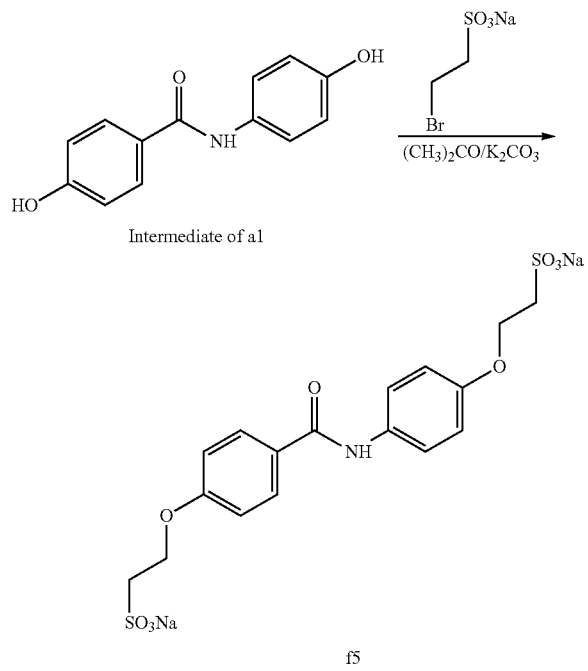

A crystalline thin film body having silvery gloss of compound f5 was obtained in the same manner as in Example 1 except that 1-bromobutane was changed to sodium 2-bromoethanesulfonate (30.41 g) (144.1 mmol). NMR measurement was performed in the same manner as in Example 1 to identify that the compound f5 was obtained.

Example 20 (Synthesis of Compound f6)

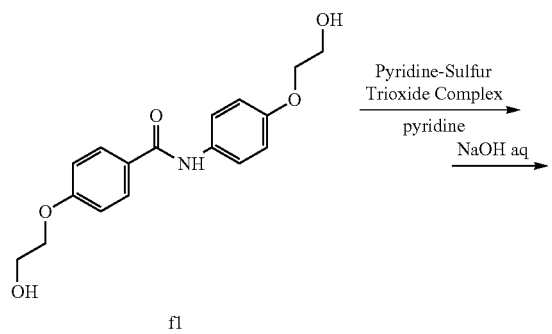

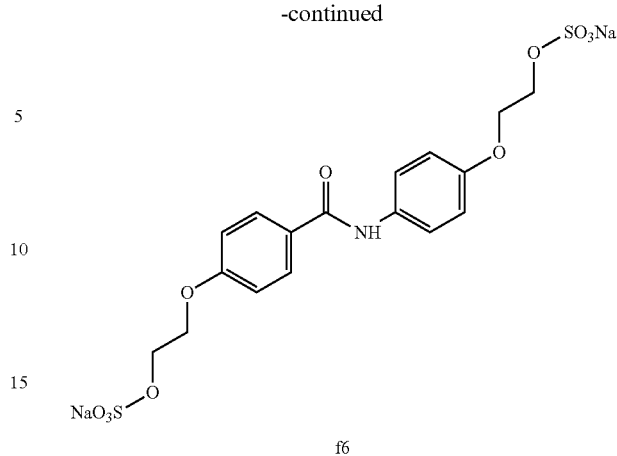

A reaction mixture of the compound f1 (2.04 g, 7 mmol), sulfur trioxide/pyridine complex (2.38 g, 15.0 mmol), and pyridine (20 mL) was stirred at 50° C. for 24 hours. Then, an aqueous solution (10 mL) containing sodium hydroxide (1.2 g, 30 mmol) was added thereto and was stirred for 10 minutes. Pyridine and water were removed under reduced pressure and methanol was added to the residue to extract a product with methanol. Next, hexane was added to methanol to precipitate a crystal of the product. The crystal was subjected to vacuum filtration and was stacked on a round filter paper (diameter of 21 mm) to obtain a crystalline thin film body having silvery gloss of compound f6. NMR measurement was performed in the same manner as in Example 1 to identify that the compound f6 was obtained.

Example 21 (Synthesis of Compound f8)

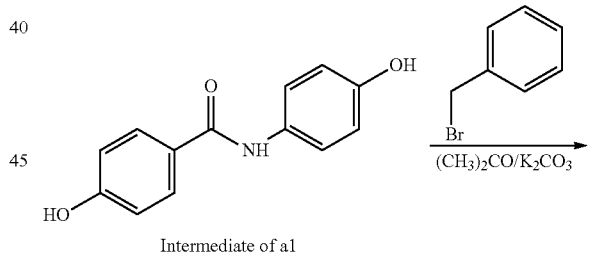

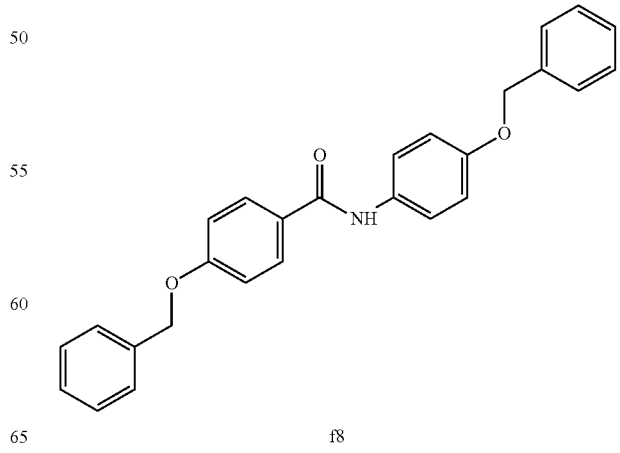

A crystalline thin film body having silvery gloss of compound f8 was obtained in the same manner as in Example 1 except that 1-bromobutane was changed to benzyl bromide (24.65 g) (144.1 mmol). NMR measurement was performed in the same manner as in Example 1 to identify that the compound f8 was obtained.

Example 22 (Synthesis of Compound f9)

(Reaction Scheme 22)

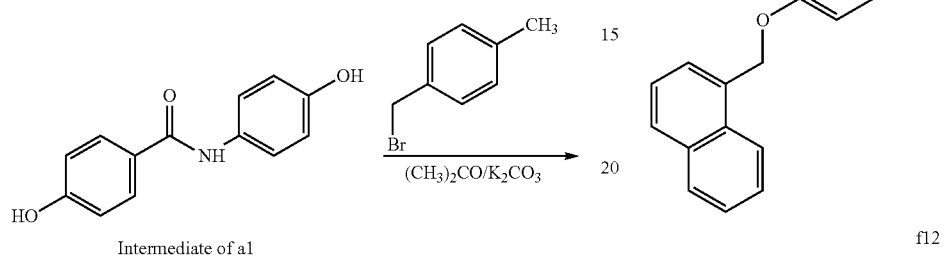

f9

A crystalline thin film body having silvery gloss of compound f9 was obtained in the same manner as in Example 1 except that 1-bromobutane was changed to 4-methylbenzyl bromide (26.67 g) (144.1 mmol). NMR measurement was performed in the same manner as in Example 1 to identify that the compound f9 was obtained.

Example 23 (Synthesis of Compound f12)

(Reaction Scheme 23)

f12

A crystalline thin film body having silvery gloss of compound f12 was obtained in the same manner as in Example 1 except that 1-bromobutane was changed to 1-(bromomethyl)naphthalene (31.86 g) (144.1 mmol). NMR measurement was performed in the same manner as in Example 1 to identify that the compound f12 was obtained.

Example 24 (Synthesis of Compound f14)

(Reaction Scheme 24)

f14

A crystalline thin film body having silvery gloss of compound f14 was obtained in the same manner as in Example 1 except that 1-bromobutane was changed to 12-bromo-1-dodecanol (38.19 g) (144.1 mmol). NMR measurement was performed in the same manner as in Example 1 to identify that the compound f14 was obtained.

Example 25 (Synthesis of Compound f15)
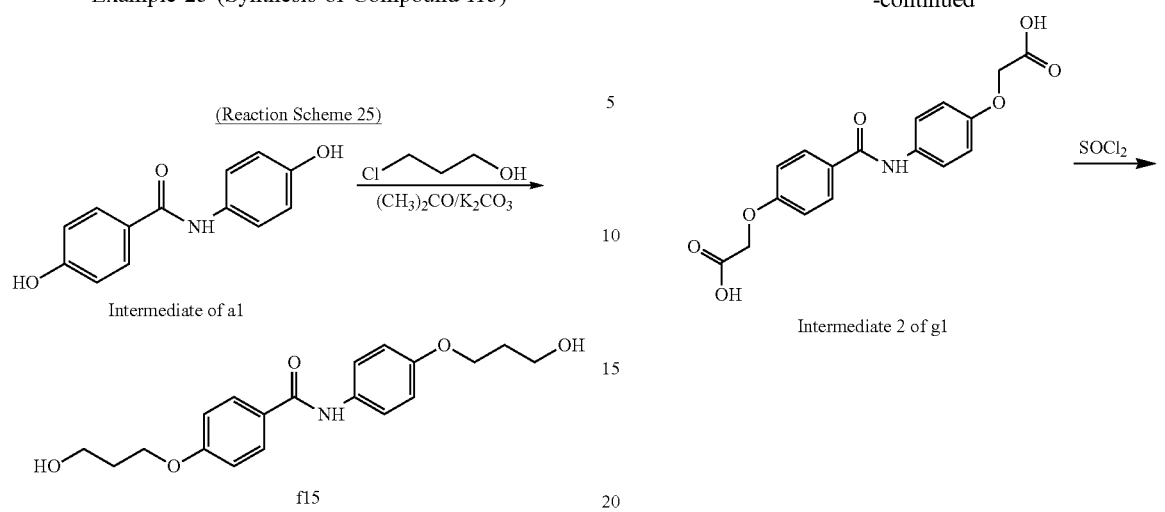
A crystalline thin film body having silvery gloss of compound f15 was obtained in the same manner as in Example 1 except that 1-bromobutane was changed to 3-bromopropanol (20.00 g) (144.1 mmol). NMR measurement was performed in the same manner as in Example 1 to identify that the compound f15 was obtained.
Example 26 (Synthesis of Compound g1)
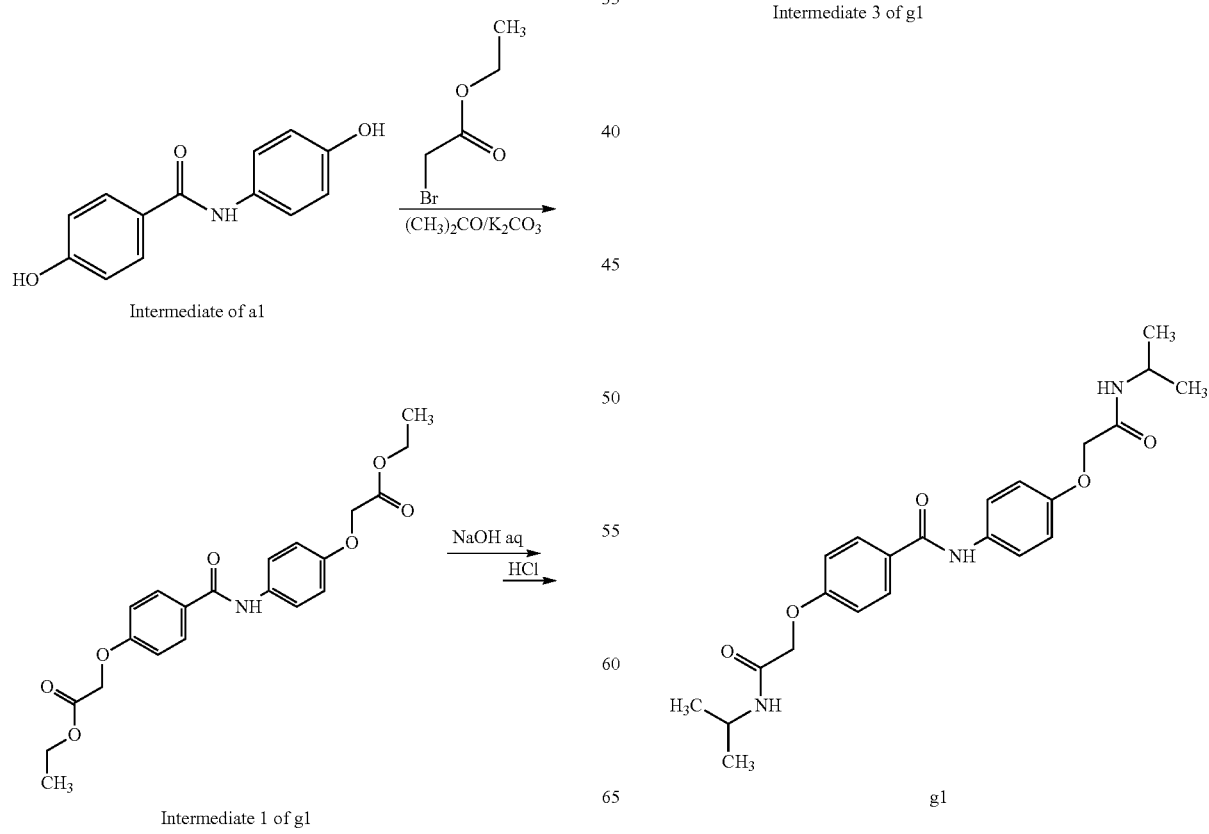

Under a nitrogen atmosphere, a two-necked, recovery flask was charged with the intermediate of compound a1 (0.233 g, 0.8 mmol) and potassium carbonate (0.17 g, 1.2 mmol). Then, acetone (10 mL) was added thereto. The obtained solution was stirred at room temperature for 30 minutes and ethyl bromoacetate (0.14 g, 0.8 mmol) was added dropwise to the solution. The reaction system was refluxed for 4 hours and was subjected to vacuum filtration to remove potassium carbonate. The solvent was removed from the filtrate under reduced pressure and the residue was washed with water. Finally, purification was performed through column chromatography to obtain a product (intermediate 1 of compound g1).

Next, the intermediate 1 of compound g1 (1.049 g, 2.60 mmol) and dehydrated THF (30 mL) were charged into a two-necked, recovery flask. At the time when the resultant started to reflux at 70° C., 0.5% by mass aqueous sodium hydroxide solution (50 mL) was added thereto. After the reaction system was refluxed for 2 hours, the solvent was removed under reduced pressure and water (100 mL) was added to the residue. Water-insoluble products were removed through vacuum filtration. Then, dilute hydrochloric acid was added dropwise until the filtrate exhibited acidity to precipitate a crude product. The crude product was washed with acetone (30 mL) to obtain intermediate 2 of compound g1.

Next, under nitrogen atmosphere, thionyl chloride (8 mL) was added to a two-necked, recovery flask into which the intermediate 2 of compound g1 (0.528 g, 1.52 mmol) had been charged. After the reaction system was refluxed at 80° C. for 5 hours, the unreacted thionyl chloride was removed under reduced pressure to obtain intermediate 3 of compound g1.

Next, chloroform (10 mL) was added to the intermediate 3 of compound g1 and was cooled to 0° C. in an ice bath. Then, isopropylamine (0.89 g, 15.1 mmol) and 2.4% by mass aqueous sodium hydroxide solution (5 mL) at 0° C. were added thereto. After the obtained solution was stirred for 90 minutes, the crystal was stacked on a round filter paper (diameter of 21 mm) through vacuum filtration. Finally, it was washed with methanol (30 mL) to obtain a crystalline thin film body having silvery gloss of compound g1. NMR measurement was performed in the same manner as in Example 1 to identify that the compound g1 was obtained.

Example 27 (Synthesis of Compound g2)

(Reaction Scheme 27)

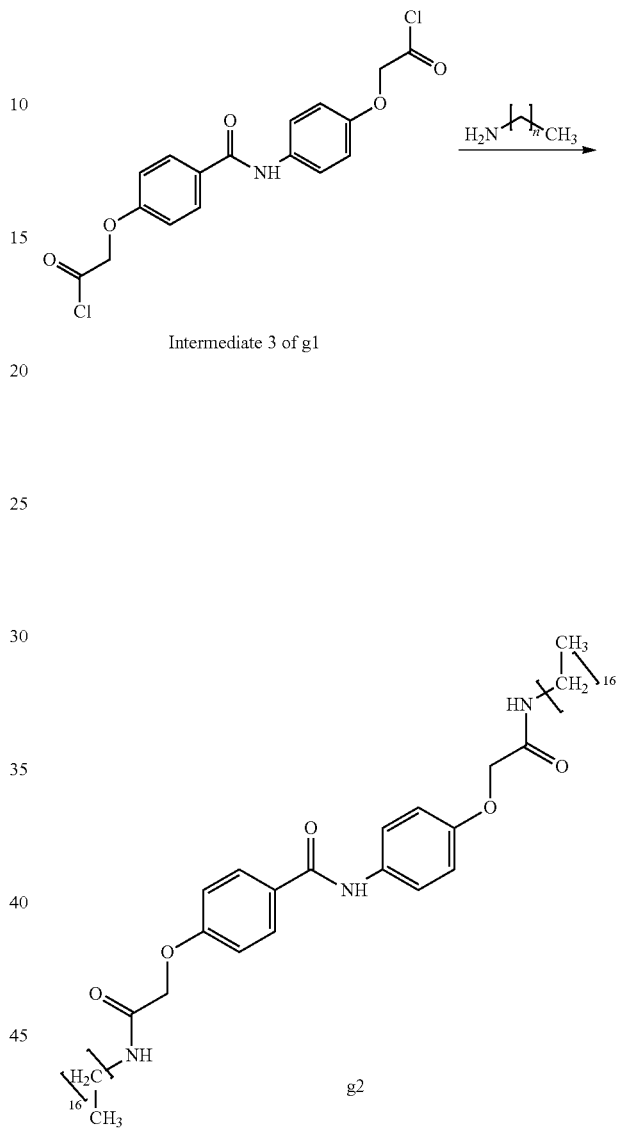

Intermediate 3 of g1 g2

Chloroform (10 mL) was added to the intermediate 3 of compound g1 (2.97 g, 7.5 mmol) obtained in Example 26 and was cooled to 0° C. in an ice bath. Then, heptadecylamine (3.83 g, 15.0 mmol) and 2.4% by mass aqueous sodium hydroxide solution (5 mL) at 0° C. were added thereto. The obtained solution was stirred for 90 minutes, the crystal was stacked on a round filter paper (diameter of 21 mm) through vacuum filtration. Finally, it was washed with methanol (30 mL) to obtain a crystalline thin film body having silvery gloss of compound g2. NMR measurement was performed in the same manner as in Example 1 to identify that the compound g2 was obtained.

Example 28 (Synthesis of Compound g3)
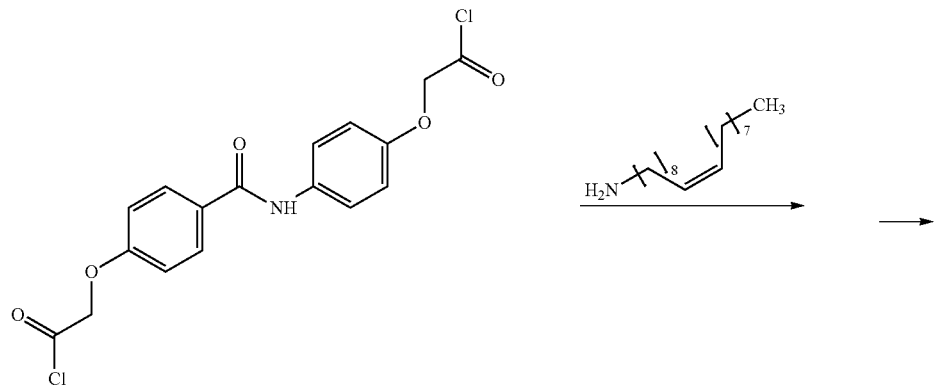
Intermediate 3 of g1
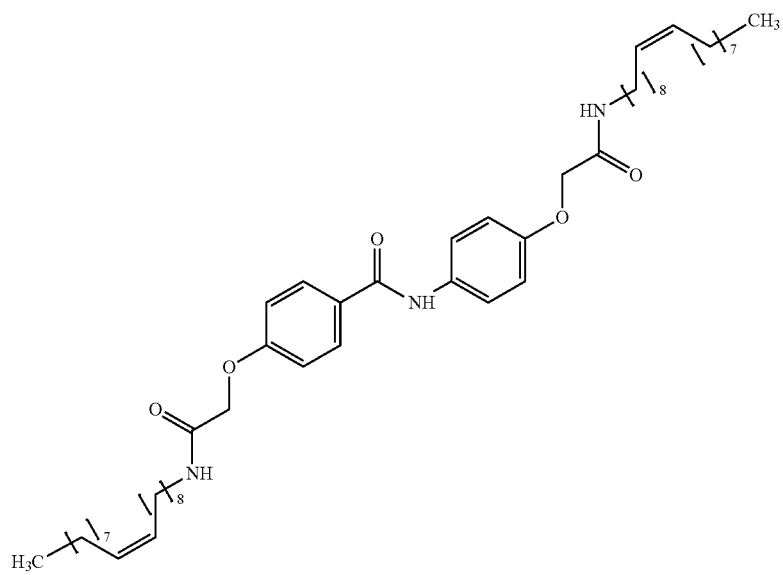
g3

Chloroform (10 mL) was added to the intermediate 3 of compound g1 (2.97 g, 7.5 mmol) obtained in Example 26 and was cooled to 0° C. in an ice bath. Then, oleylamine (4.01 g, 15.0 mmol) and 2.4% by mass aqueous sodium hydroxide solution (5 mL) at 0° C. were added thereto. The obtained solution was stirred for 90 minutes, the crystal was stacked on a round filter paper (diameter of 21 mm) through vacuum filtration. Finally, it was washed with methanol (30 mL) to obtain a crystalline thin film body having silvery gloss of compound g3. NMR measurement was performed in the same manner as in Example 1 to identify that the compound g3 was obtained.

Example 29 (Synthesis of Compound g4)

Example 30 (Synthesis of Compound g6)

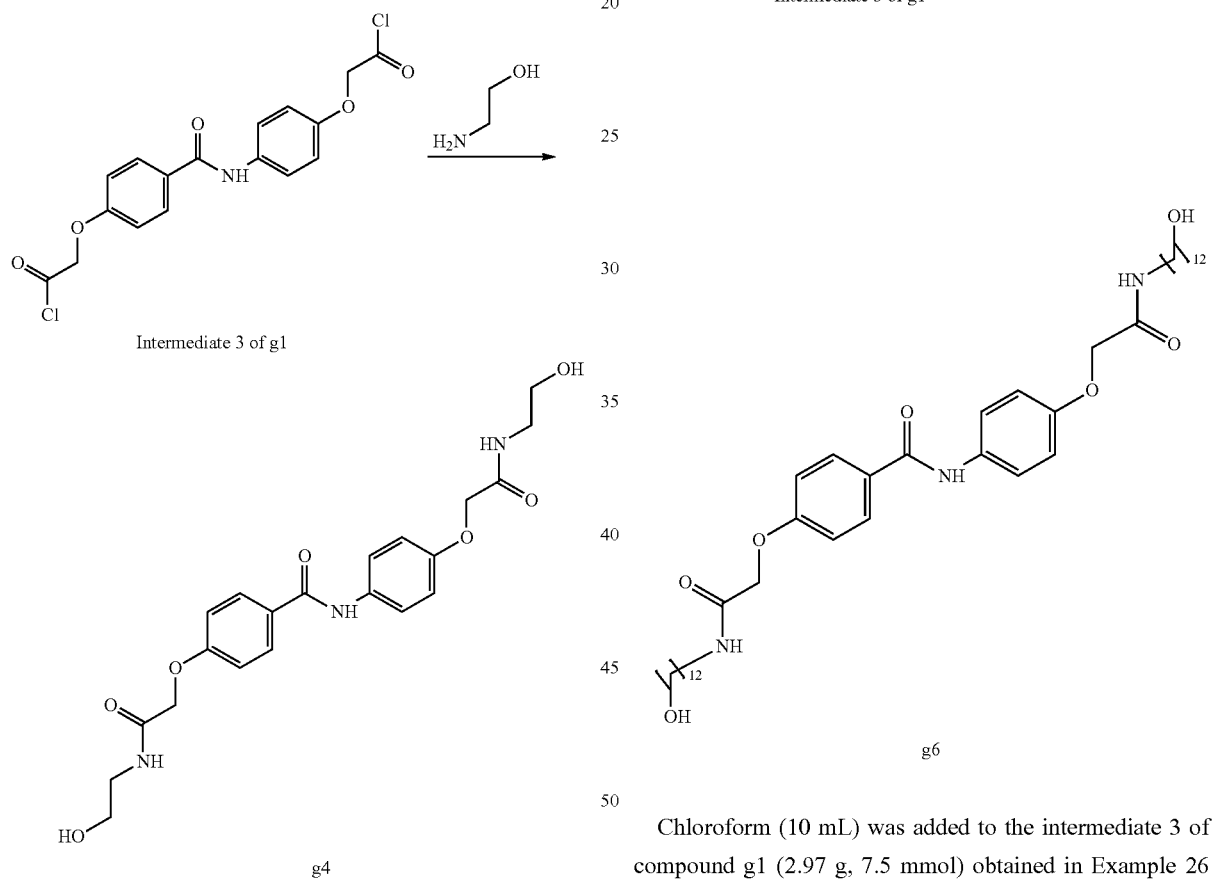

Chloroform (10 mL) was added to the intermediate 3 of compound g1 (2.97 g, 7.5 mmol) obtained in Example 26 and was cooled to 0° C. in an ice bath. Then, 2-aminoethanol (0.92 g, 15.0 mmol) and 2.4% by mass aqueous sodium hydroxide solution (5 mL) at 0° C. were added thereto. The obtained solution was stirred for 90 minutes, the crystal was stacked on a round filter paper (diameter of 21 mm) through vacuum filtration. Finally, it was washed with methanol (30 mL) to obtain a crystalline thin film body having silvery gloss of compound g4. NMR measurement was performed in the same manner as in Example 1 to identify that the compound g4 was obtained.

Chloroform (10 mL) was added to the intermediate 3 of compound g1 (2.97 g, 7.5 mmol) obtained in Example 26 and was cooled to 0° C. in an ice bath. Then, 12-amino-1-dodecanol (3.02 g, 15.0 mmol) and 2.4% by mass aqueous sodium hydroxide solution (5 mL) at 0° C. were added thereto. The obtained solution was stirred for 90 minutes, the crystal was stacked on a round filter paper (diameter of 21 mm) through vacuum filtration. Finally, it was washed with methanol (30 mL) to obtain a crystalline thin film body having silvery gloss of compound g6. NMR measurement was performed in the same manner as in Example 1 to identify that the compound g6 was obtained.

Example 31 (Synthesis of Compound g7)

Example 32 (Synthesis of Compound h2)

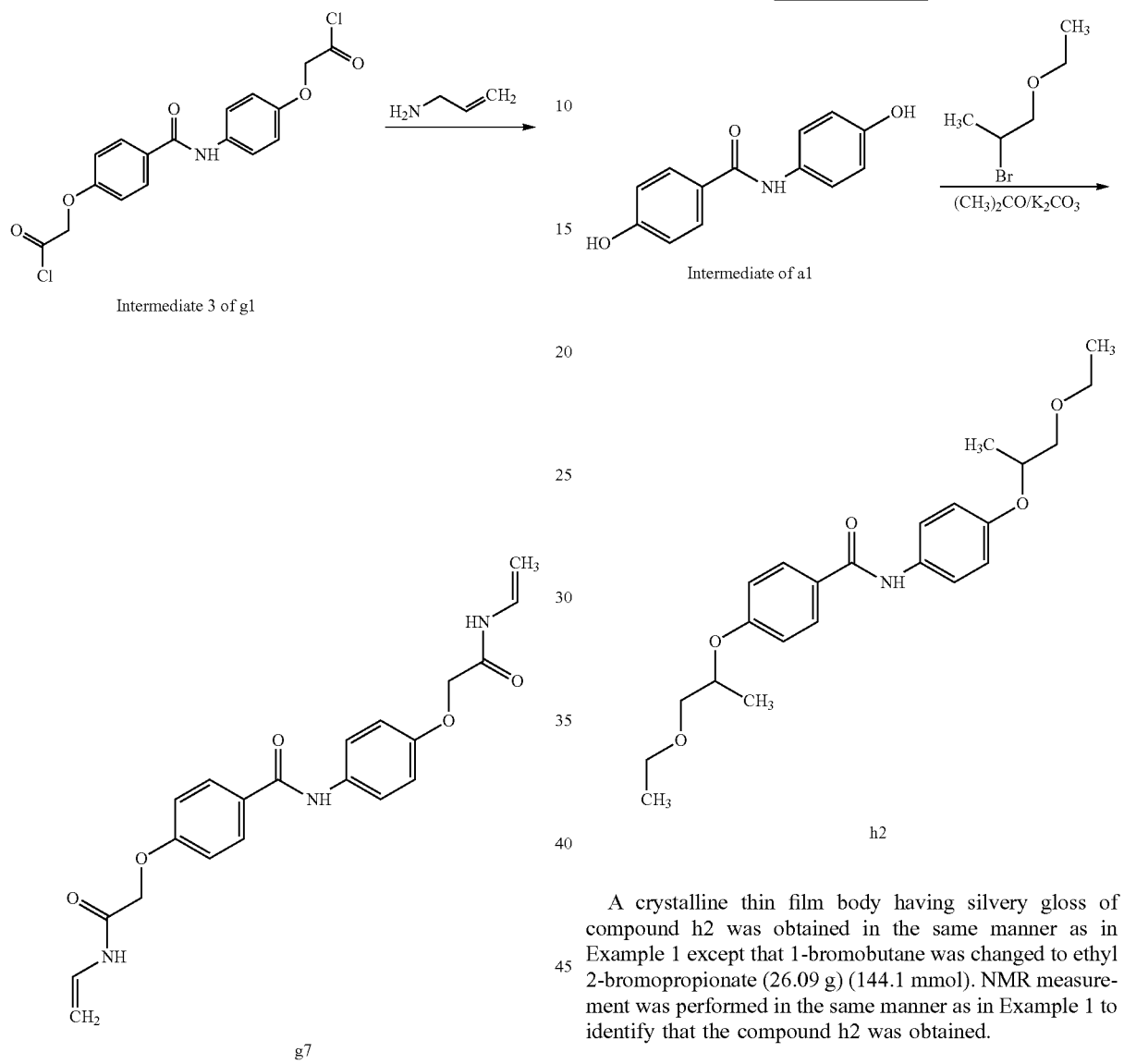

Chloroform (10 mL) was added to the intermediate 3 of compound g1 (2.97 g, 7.5 mmol) obtained in Example 26 and was cooled to 0° C. in an ice bath. Then, 3-aminopropylene (0.86 g, 15.0 mmol) and 2.4% by mass aqueous sodium hydroxide solution (5 mL) at 0° C. were added thereto. The obtained solution was stirred for 90 minutes, the crystal was stacked on a round filter paper (diameter of 21 mm) through vacuum filtration. Finally, it was washed with methanol (30 mL) to obtain a crystalline thin film body having silvery gloss of compound g7. NMR measurement was performed in the same manner as in Example 1 to identify that the compound g7 was obtained.

A crystalline thin film body having silvery gloss of compound h2 was obtained in the same manner as in Example 1 except that 1-bromobutane was changed to ethyl 2-bromopropionate (26.09 g) (144.1 mmol). NMR measurement was performed in the same manner as in Example 1 to identify that the compound h2 was obtained.

Example 33 (Synthesis of Compound i1)

(Reaction Scheme 33)

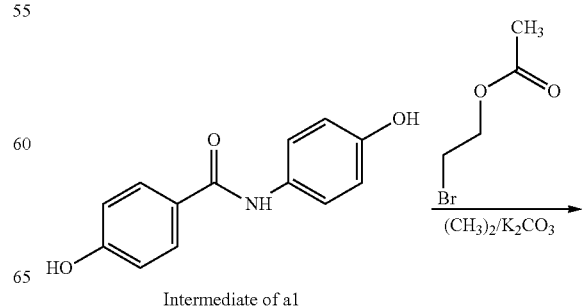

Intermediate of a1

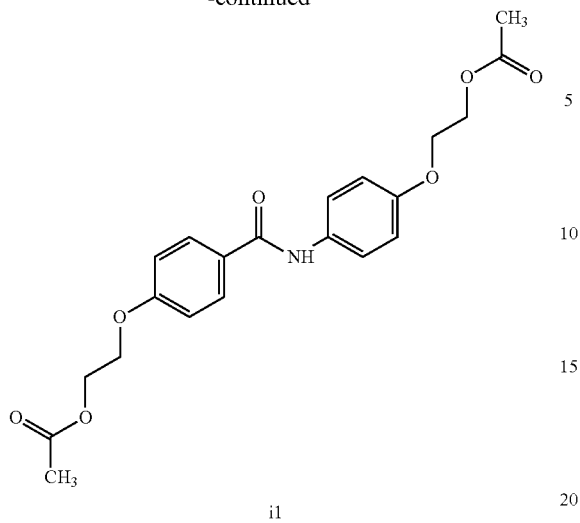

i1

A crystalline thin film body having silvery gloss of compound i1 was obtained in the same manner as in Example 1 except that 1-bromobutane was changed to 2-bromoethyl acetate (26.09 g) (144.1 mmol). NMR measurement was performed in the same manner as in Example 1 to identify that the compound i1 was obtained.

Example 34 (Synthesis of Compound j2)

(Reaction Scheme 34)

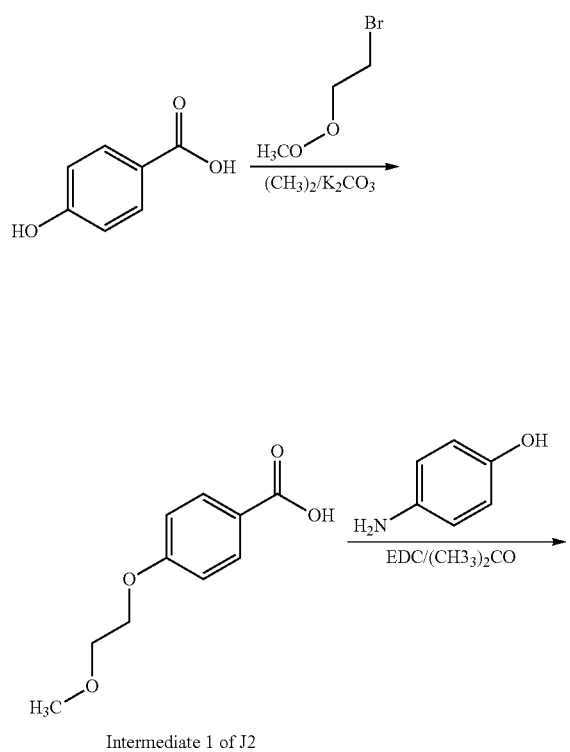

Intermediate 1 of J2

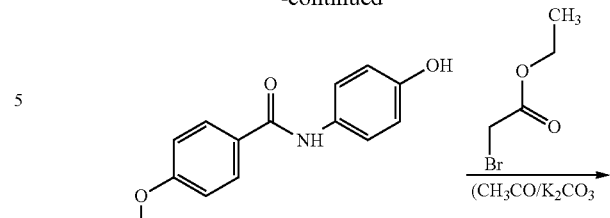

Intermediate 2 of J2

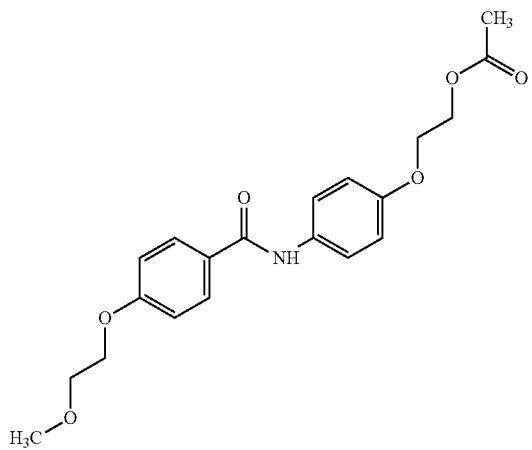

J2

Under a nitrogen atmosphere, a two-necked, recovery flask was charged with 4-hydroxybenzoic acid (3.98 g, 28.8 mmol), 2-bromoethyl methyl ether (40.06 g, 288.2 mmol), and potassium carbonate (27.9 g, 201.8 mmol). Then, acetone (300 mL) was added thereto and was heated to reflux for 72 hours. Then, the solvent was removed under reduced pressure and the residue was washed twice with hexane (100 mL) (200 mL×2 times) to obtain intermediate 1 of compound j2.

Next, under a nitrogen atmosphere, a two-necked, recovery flask was charged with p-aminophenol (2.19 g, 20.1 mmol), the intermediate 1 of compound j2 (5.82 g, 20.1 mmol), and 1-ethyl-3-(3-dimethylaminopropyl)carbodiimide hydrochloride (EDC) (3.75 g, 24.2 mmol). Then, acetone (dehydrated) (50 mL) was added thereto and was heated to reflux for 12 hours. Then, the solvent was removed under reduced pressure. The residue was washed once with ethyl acetate (40 mL) and was washed once with dilute hydrochloric acid (40 mL). The resultant was subjected to vacuum filtration to obtain intermediate 2 of compound j2.

Next, a two-necked, a recovery flask was charged with the intermediate 2 of compound j2 (2.92 g, 10.1 mmol), ethyl bromoacetate (1.69 g, 10.1 mmol), and potassium carbonate (13.9 g, 100.9 mmol). Then, acetone (300 mL) was added thereto and was heated to reflux for 72 hours. Then, the solvent was removed under reduced pressure. Then, the residue was washed twice with hexane (100 mL) (100 mL×2 times). Furthermore, the residue after the washing with hexane was recrystallized with acetone to obtain compound j2 as a target product.

Next, the compound j2 (2.0 g) and methanol (1,200 mL) were added to a 30 mL-sample bottle. The mixture liquid was heated to 80° C. to completely dissolve the solid. Then, the solution was left to stand for 24 hours under room temperature. The precipitated crystal was stacked on a round filter paper (diameter of 21 mm) through vacuum filtration to obtain a crystalline thin film body having silvery gloss of the compound j2. NMR measurement was performed in the same manner as in Example 1 to identify that the compound j2 was obtained.

Comparative Example 1 (Synthesis of Compound k1)

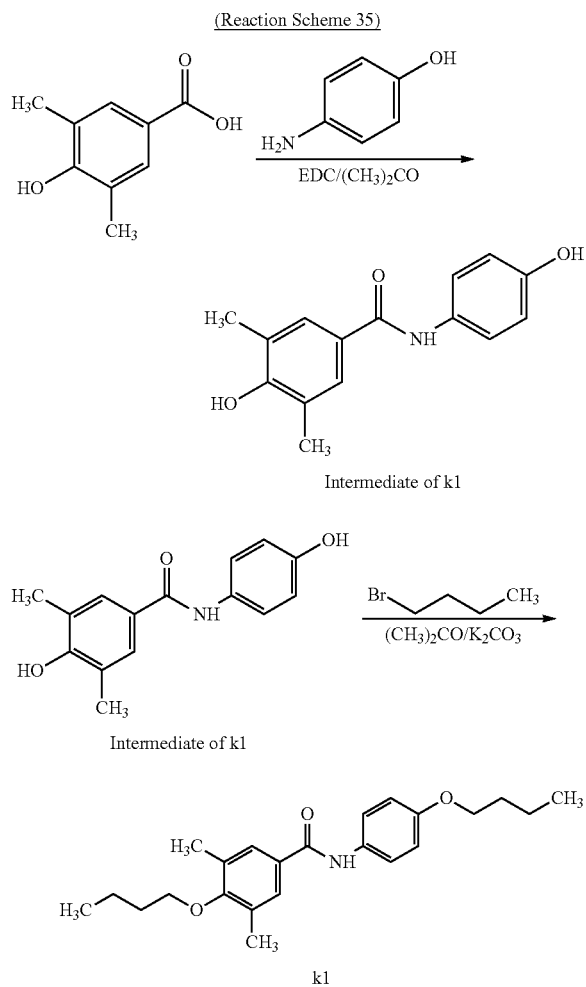

Under a nitrogen atmosphere, a two-necked, recovery flask was charged with p-aminophenol (2.19 g, 20.1 mmol), 4-hydroxy-3,5-dimethylbenzoic acid (3.34 g, 20.1 mmol), and 1-ethyl-3-(3-dimethylaminopropyl)carbodiimide hydrochloride (EDC) (3.75 g, 24.2 mmol). Then, acetone (dehydrated) (50 mL) was added thereto and was heated to reflux for 12 hours. Then, the solvent was removed under reduced pressure. The residue was washed once with ethyl acetate (40 mL) and was washed once with dilute hydrochloric acid (40 mL). The resultant was subjected to vacuum filtration to obtain an intermediate of compound k1.

Next, under a nitrogen atmosphere, a two-necked, recovery flask was charged with the synthesized intermediate of compound k1 (3.73 g, 14.4 mmol), 1-bromobutane (19.74 g, 144.1 mmol), and potassium carbonate (13.9 g, 100.9 mmol). Then, acetone (300 mL) was added thereto and was heated to reflux for 72 hours. Then, the solvent was removed under reduced pressure and the residue was washed twice with hexane (100 mL) (100 mL×2 times). Furthermore, the residue after the washing with hexane was recrystallized with acetone to obtain compound k1 as a target product.

Next, the compound k1 (2.0 g) and methanol (1,200 mL) were added to a 30 mL-sample bottle. The mixture liquid was heated to 80° C. to completely dissolve the solid. Then, the solution was left to stand for 24 hours under room temperature. The precipitated crystal was stacked on a round filter paper (diameter of 21 mm) through vacuum filtration to obtain a crystalline thin film body of the compound k1. NMR measurement was performed in the same manner as in Example 1 to identify that the compound k1 was obtained.

<Silvery Glossiness Evaluation of Compound>

Each of the synthesized compounds was measured for specular reflectance and color values, and then was evaluated for silvery glossiness.

Specifically, an ultraviolet and visible spectrophotometer (JASCO V-570 UV/VIS/NIR Spectrophotometer, available from JASCO) was equipped with a large integrating sphere device (large integrating sphere device color diagnosis program of JASCO ILN-472 model, available from JASCO). With an optical trap reflector plate being removed, a crystal of each compound that had been set in a sample holder was measured for the diffuse reflection factor. Then, the optical trap reflector plate was inserted therein and the total reflectance was measured. The specular reflectance was calculated according to the following formula: "specular reflectance= total reflectance-diffuse reflection factor". In addition, from the measurement result of the total reflectance, each color value was calculated.

Results of the specular reflectance and the color values judged from the following criteria are presented in Tables 1-1, 1-2, 2-1, 2-2, 3-1, 3-2, and 4.

Note that, when all of the specular reflectance and the color values (a* value, b* value) achieve Rank 1, Rank 2, or Rank 3, the organic colorant can be said to have a practicably usable silvery gloss.

[Specular Reflectance: Evaluation Criteria]
Rank 3: 20%≤Specular reflectance
Rank 2: 15%≤Specular reflectance<20%
Rank 1: 10%≤Specular reflectance<15%
Rank 0: Specular reflectance<0%

[Color Value (a* Value): Evaluation Criteria]
Rank 3: −1.5≤a*≤1.5
Rank 2: −2.5≤a*<−1.5, or 1.5<a*≤2.5
Rank 1: −3.5≤a*<−2.5, or 2.5<a*≤3.5

[Color Value (b* Value): Evaluation Criteria]
Rank 3: −1.5≤b*≤1.5
Rank 2: −2.5≤b*<−1.5, or 1.5<b*≤2.5
Rank 1: −3.5≤b*<−2.5, or 2.5<b*≤3.5

TABLE 1-1

| | | General Formula (1) | | Silvery glossiness | | |
| | Compound | $R_1$ | $R_2$ | Specular reflectance | Color value $a^*$ value | Color value $b^*$ value |
|---|---|---|---|---|---|---|
| Example 1 | a1 | | 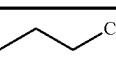 | Rank 3 | Rank 3 | Rank 3 |
| 2 | a2 | | 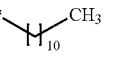 | Rank 3 | Rank 3 | Rank 3 |
| 3 | a3 | | 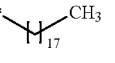 | Rank 3 | Rank 3 | Rank 3 |
| 4 | a4 | | 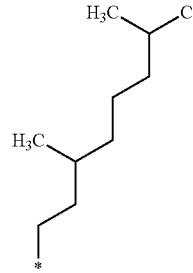 | Rank 1 | Rank 3 | Rank 3 |
| 5 | a8 | | 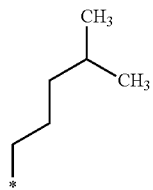 | Rank 2 | Rank 3 | Rank 3 |

TABLE 1-2

| | | General Formula (1) | | Silvery glossiness | | |
| | Compound | $R_1$ | $R_2$ | Specular reflectance | Color value $a^*$ value | Color value $b^*$ value |
|---|---|---|---|---|---|---|
| Example 6 | b2 | | 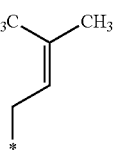 | Rank 2 | Rank 3 | Rank 3 |
| 7 | b3 | | 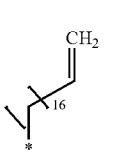 | Rank 3 | Rank 3 | Rank 3 |
| 8 | c1 | | 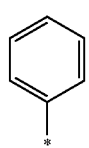 | Rank 1 | Rank 1 | Rank 1 |

TABLE 1-2-continued

| | Compound | General Formula (1) R₁ | R₂ | Silvery glossiness Specular reflectance | Color value a* value | Color value b* value |
|---|---|---|---|---|---|---|
| 9 | c3 | | COOH-C₆H₄-* | Rank 1 | Rank 1 | Rank 1 |
| 10 | d1 | | naphthyl-* | Rank 1 | Rank 1 | Rank 1 |

TABLE 2-1

| | | Compound | General Formula (1) R₁ | R₂ | Silvery glossiness Specular reflectance | Color value a* value | Color value b* value |
|---|---|---|---|---|---|---|---|
| Example | 11 | d7 | | HOOC-naphthyl-* | Rank 1 | Rank 1 | Rank 1 |
| | 12 | e1 | | *-CH₂CH₂-C(=O)-OH | Rank 3 | Rank 3 | Rank 3 |
| | 13 | e2 | | *-CH₂CH₂-C(=O)-O-CH₃ | Rank 3 | Rank 3 | Rank 3 |
| | 14 | e3 | | *-CH₂CH₂-C(=O)-O-CH₂CH₃ | Rank 3 | Rank 3 | Rank 3 |

TABLE 2-1-continued

| | Compound | General Formula (1) R₁ | R₂ | Silvery glossiness Specular reflectance | Color value a* value | Color value b* value |
|---|---|---|---|---|---|---|
| 15 | e5 | | OH, (CH₂)₁₀, C=O, * | Rank 3 | Rank 3 | Rank 3 |

TABLE 2-2

| | Compound | General Formula (1) R₁ | R₂ | Silvery glossiness Specular reflectance | Color value a* value | Color value b* value |
|---|---|---|---|---|---|---|
| Example 16 | f1 | | OH, CH₂CH₂, * | Rank 3 | Rank 3 | Rank 3 |
| 17 | f2 | | O-CH₃, CH₂CH₂, * | Rank 3 | Rank 3 | Rank 3 |
| 18 | f4 | | CH₃, CH₂, O, CH₂CH₂, * | Rank 3 | Rank 3 | Rank 3 |
| 19 | f5 | | SO₃Na, CH₂CH₂, * | Rank 3 | Rank 3 | Rank 3 |
| 20 | f6 | | SO₃Na, O, CH₂CH₂, * | Rank 3 | Rank 3 | Rank 3 |

TABLE 3-1

| | | General Formula (1) | | Silvery glossiness | | |
| | Compound | $R_1$ | $R_2$ | Specular reflectance | Color value a* value | Color value b* value |
|---|---|---|---|---|---|---|
| Example 21 | f8 | | 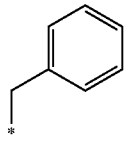 | Rank 1 | Rank 2 | Rank 2 |
| 22 | f9 | | 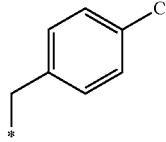 | Rank 1 | Rank 2 | Rank 2 |
| 23 | f12 | | 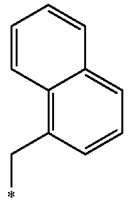 | Rank 1 | Rank 1 | Rank 1 |
| 24 | f14 | | 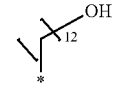 | Rank 3 | Rank 3 | Rank 3 |
| 25 | f15 | | 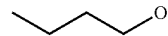 | Rank 3 | Rank 3 | Rank 3 |

TABLE 3-2

| | | General Formula (1) | | Silvery glossiness | | |
| | Compound | $R_1$ | $R_2$ | Specular reflectance | Color value a* value | Color value b* value |
|---|---|---|---|---|---|---|
| Example 26 | g1 | | 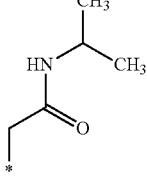 | Rank 3 | Rank 3 | Rank 3 |
| 27 | g2 | | 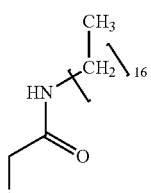 | Rank 3 | Rank 3 | Rank 3 |

TABLE 3-2-continued

| | | General Formula (1) | | Silvery glossiness | | |
| | Compound | R₁ | R₂ | Specular reflectance | Color value a* value | Color value b* value |
|---|---|---|---|---|---|---|
| 28 | g3 | | *-CH₂-C(=O)-NH-(CH₂)₈-CH=CH-(CH₂)₇-CH₃ | Rank 3 | Rank 3 | Rank 3 |
| 29 | g4 | | *-CH₂-C(=O)-NH-CH₂CH₂-OH | Rank 3 | Rank 3 | Rank 3 |
| 30 | g6 | | *-CH₂-C(=O)-NH-(CH₂)₁₂-OH | Rank 3 | Rank 3 | Rank 3 |

TABLE 4

| | | | General Formula (1) | | Silvery glossiness | | |
| | | Compound | R₁ | R₂ | Specular reflectance | Color value a* value | Color value b* value |
|---|---|---|---|---|---|---|---|
| Example | 31 | g7 | | *-CH₂-C(=O)-NH-CH=CH₂ | Rank 3 | Rank 3 | Rank 3 |
| | 32 | h2 | | *-CH(CH₃)-CH₂-O-CH₂-CH₃ | Rank 2 | Rank 3 | Rank 3 |
| | 33 | i1 | | *-CH₂-CH₂-O-C(=O)-CH₃ | Rank 3 | Rank 3 | Rank 3 |

TABLE 4-continued

| | | General Formula (1) | | Silvery glossiness | | |
| | | | | Specular | Color value | Color value |
| | Compound | $R_1$ | $R_2$ | reflectance | a* value | b* value |
|---|---|---|---|---|---|---|
| | 34 | j2 | *–CH₂CH₂–O–CH₃ | –CH₂–O–C(=O)–CH₂–* | Rank 1 | Rank 3 | Rank 3 |
| Comparative Example | 1 | k1 | *–CH₂CH₂CH₂–CH₃ | | Rank 0 | Rank 2 | Rank 2 |

Note that, the symbol * described in the Tables 1-1, 1-2, 2-1, 2-2, 3-1, 3-2, and 4 represents a position at which $R_1$ and $R_2$ are bound to each oxygen atom in the General Formula (1). Here, the compound k1 further includes two methyl groups in the General Formula (1).

From the results of Tables 1-1, 1-2, 2-1, 2-2, 3-1, 3-2, and 4, it is found that all of the compounds according to the present disclosure are organic colorants having silvery gloss that is practically used. From the results of Table 4, it is found that the compound k1 of Comparative Example 1 having a substituent at a basic skeleton of the General Formula (1) has a specular reflectance of less than 10% and does not develop silvery gloss, which is not suitable for practical use.

Example 35

—Preparation of Coloring Composition 1—

With a vial bottle, materials of the following formulation were homogeneously mixed and were irradiated (600 W) with ultrasonic wave at normal temperature for 1 hour. Then, the resultant was filtrated through a filter having an average pore diameter of 5.0 μm to obtain coloring composition 1

| | |
|---|---|
| Crystalline thin film body having silvery gloss of compound a1 | 5.0 parts by mass |
| Ion exchanged water | 5.0 parts by mass |
| Dehydrated THF | 89.8 parts by mass |
| Dispersing agent (DISPERBYK-190, available from BYK-Chemie) | 0.2 parts by mass |

Examples 36 to 68 and Comparative Example 2

—Preparation of Coloring Compositions 2 to 35—

Coloring compositions 2 to 34 of Examples 36 to 68 and coloring composition 35 of Comparative Example 2 were obtained in the same manner as in Example 35 except that the compound a1 of Example 1 was changed to each compound presented in the following Tables 5-1, 5-2, 6-1, 6-2, 7-1, 7-2, and 8.

<Silvery Glossiness Evaluation of Coloring Composition>

Each of the coloring compositions obtained 1 to 35 was coated on a glass medium and a sheet of color paper as described below. The print matter was measured and evaluated for silvery glossiness. Results are presented in Tables 5-1, 5-2, 6-1, 6-2, 7-1, 7-2, and 8. Note that, it can be judged that when all of the specular reflectance and the color values (a* value, b* value) achieve Rank 1, Rank 2, or Rank 3, the organic composition can be said to have a practicably usable silvery gloss.

<<Glass Medium>>

A print matter was obtained by coating each coloring composition on a glass substrate having a plate thickness of 1.0 mm and a size of 25 mm×75 mm using a bar coater (No. 22, available from dai-ichi-rika) so as to have an average thickness of 50 μm. Next, silvery glossiness of the print matter was evaluated in the same manner as in the <Silvery Glossiness Evaluation of Compound> in Example 1.

<<Color Paper>>

A print matter was obtained by coating each coloring composition on a sheet of color paper (COLOR PAPER A4 medium thickness, available from Nagatoya-shouten co., ltd.) using a bar coater (No. 22, available from dai-ichi-rika) so as to have an average thickness of 50 μm. Next, silvery glossiness of the print matter was evaluated in the same manner as in the <Silvery Glossiness Evaluation of Compound> in Example 1.

TABLE 5-1

| | Coloring composition | Compound | General Formula (1) R₁ | General Formula (1) R₂ | Silvery glossiness — Glass medium — Specular reflectance | Silvery glossiness — Glass medium — Color value a* value | Silvery glossiness — Glass medium — Color value b* value | Silvery glossiness — Color paper — Specular reflectance | Silvery glossiness — Color paper — Color value a* value | Silvery glossiness — Color paper — Color value b* value |
|---|---|---|---|---|---|---|---|---|---|---|
| Example 35 | 1 | Example a1 | 1 | 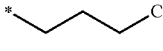 | Rank 3 | Rank 3 | Rank 3 | Rank 3 | Rank 3 | Rank 3 |
| 36 | 2 | Example a2 | 2 | 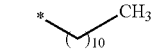 | Rank 3 | Rank 3 | Rank 3 | Rank 3 | Rank 3 | Rank 3 |
| 37 | 3 | Example a3 | 3 | 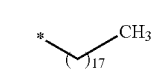 | Rank 3 | Rank 3 | Rank 3 | Rank 3 | Rank 3 | Rank 3 |
| 38 | 4 | Example a4 | 4 | 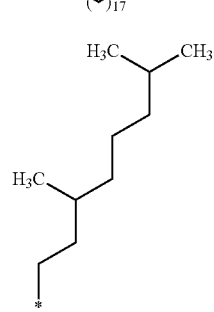 | Rank 1 | Rank 3 | Rank 3 | Rank 1 | Rank 3 | Rank 3 |
| 39 | 5 | Example a8 | 5 | 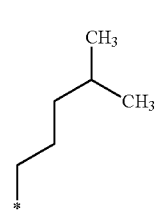 | Rank 2 | Rank 3 | Rank 3 | Rank 2 | Rank 3 | Rank 3 |

TABLE 5-2

| | Coloring composition | Compound | General Formula (1) R₁ | General Formula (1) R₂ | Silvery glossiness — Glass medium — Specular reflectance | Silvery glossiness — Glass medium — Color value a* value | Silvery glossiness — Glass medium — Color value b* value | Silvery glossiness — Color paper — Specular reflectance | Silvery glossiness — Color paper — Color value a* value | Silvery glossiness — Color paper — Color value b* value |
|---|---|---|---|---|---|---|---|---|---|---|
| Example 40 | 6 | Example 6 | b2 | 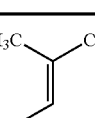 | Rank 2 | Rank 3 | Rank 3 | Rank 2 | Rank 3 | Rank 3 |
| 41 | 7 | Example 7 | b3 | 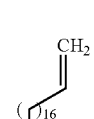 | Rank 3 | Rank 3 | Rank 3 | Rank 3 | Rank 3 | Rank 3 |

TABLE 5-2-continued

| | Coloring composition | Compound | General Formula (1) R₁ | R₂ | Silvery glossiness | | | | | |
|---|---|---|---|---|---|---|---|---|---|---|
| | | | | | Glass medium | | | Color paper | | |
| | | | | | Specular reflectance | Color value a* value | Color value b* value | Specular reflectance | Color value a* value | Color value b* value |
| 42 | 8 | Example 8 | c1 | (phenyl) | Rank 1 | Rank 1 | Rank 1 | Rank 1 | Rank 1 | Rank 1 |
| 43 | 9 | Example 9 | c3 | (4-COOH phenyl) | Rank 1 | Rank 1 | Rank 1 | Rank 1 | Rank 1 | Rank 1 |
| 44 | 10 | Example 10 | d1 | (naphthyl) | Rank 1 | Rank 1 | Rank 1 | Rank 1 | Rank 1 | Rank 1 |

TABLE 6-1

| | Coloring composition | Compound | General Formula (1) R₁ | R₂ | Silvery glossiness | | | | | |
|---|---|---|---|---|---|---|---|---|---|---|
| | | | | | Glass medium | | | Color paper | | |
| | | | | | Specular reflectance | Color value a* value | Color value b* value | Specular reflectance | Color value a* value | Color value b* value |
| Example 45 | 11 | Example 11 | d7 | (COOH-naphthyl) | Rank 1 | Rank 1 | Rank 1 | Rank 1 | Rank 1 | Rank 1 |
| 46 | 12 | Example 12 | e1 | (CH₂CH₂COOH) | Rank 3 | Rank 3 | Rank 3 | Rank 3 | Rank 3 | Rank 3 |

TABLE 6-1-continued

| | Coloring composition | Compound | General Formula (1) R₁ | R₂ | Silvery glossiness | | | | | |
|---|---|---|---|---|---|---|---|---|---|---|
| | | | | | Glass medium | | | Color paper | | |
| | | | | | Specular reflectance | Color value a* value | Color value b* value | Specular reflectance | Color value a* value | Color value b* value |
| 47 | 13 | Example 13 | e2 | 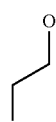 | Rank 3 | Rank 3 | Rank 3 | Rank 3 | Rank 3 | Rank 3 |
| 48 | 14 | Example 14 | e3 | 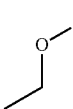 | Rank 3 | Rank 3 | Rank 3 | Rank 3 | Rank 3 | Rank 3 |
| 49 | 15 | Example 15 | e5 | 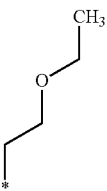 | Rank 3 | Rank 3 | Rank 3 | Rank 3 | Rank 3 | Rank 3 |

TABLE 6-2

| | Coloring composition | Compound | General Formula (1) R₁ | R₂ | Silvery glossiness | | | | | |
|---|---|---|---|---|---|---|---|---|---|---|
| | | | | | Glass medium | | | Color paper | | |
| | | | | | Specular reflectance | Color value a* value | Color value b* value | Specular reflectance | Color value a* value | Color value b* value |
| Example 50 | 16 | Example 16 | f1 | OH | Rank 3 | Rank 3 | Rank 3 | Rank 3 | Rank 3 | Rank 3 |
| 51 | 17 | Example 17 | f2 | O—CH₃ | Rank 3 | Rank 3 | Rank 3 | Rank 3 | Rank 3 | Rank 3 |
| 52 | 18 | Example 18 | f4 | CH₃—O | Rank 3 | Rank 3 | Rank 3 | Rank 3 | Rank 3 | Rank 3 |

TABLE 6-2-continued

| | Coloring composition | Compound | General Formula (1) R₁ | General Formula (1) R₂ | Silvery glossiness Glass medium Specular reflectance | Silvery glossiness Glass medium Color value a* value | Silvery glossiness Glass medium Color value b* value | Silvery glossiness Color paper Specular reflectance | Silvery glossiness Color paper Color value a* value | Silvery glossiness Color paper Color value b* value |
|---|---|---|---|---|---|---|---|---|---|---|
| 53 | 19 | Example 19 | f5 | -CH₂CH₂CH₂-SO₃Na | Rank 3 | Rank 3 | Rank 3 | Rank 3 | Rank 3 | Rank 3 |
| 54 | 20 | Example 20 | f6 | -CH₂CH₂-O-CH₂CH₂-SO₃Na | Rank 3 | Rank 3 | Rank 3 | Rank 3 | Rank 3 | Rank 3 |

TABLE 7-1

| | Coloring composition | Compound | General Formula (1) R₁ | General Formula (1) R₂ | Silvery glossiness Glass medium Specular reflectance | Silvery glossiness Glass medium Color value a* value | Silvery glossiness Glass medium Color value b* value | Silvery glossiness Color paper Specular reflectance | Silvery glossiness Color paper Color value a* value | Silvery glossiness Color paper Color value b* value |
|---|---|---|---|---|---|---|---|---|---|---|
| Example 55 | 21 | Example 21 | f8 | -CH₂-(phenyl) | Rank 1 | Rank 2 | Rank 2 | Rank 1 | Rank 2 | Rank 2 |
| 56 | 22 | Example 22 | f9 | -CH₂-(4-methylphenyl) (CH₃) | Rank 1 | Rank 2 | Rank 2 | Rank 1 | Rank 2 | Rank 2 |
| 57 | 23 | Example 23 | f12 | -CH₂-(1-naphthyl) | Rank 1 | Rank 1 | Rank 1 | Rank 1 | Rank 1 | Rank 1 |
| 58 | 24 | Example 24 | f14 | -(CH₂)₁₂-OH | Rank 3 | Rank 3 | Rank 3 | Rank 3 | Rank 3 | Rank 3 |
| 59 | 25 | Example 25 | f15 | -(CH₂)₄-OH | Rank 3 | Rank 3 | Rank 3 | Rank 3 | Rank 3 | Rank 3 |

TABLE 7-2

| | Coloring composition | Compound | General Formula (1) R₁ | R₂ | Silvery glossiness | | | | | |
|---|---|---|---|---|---|---|---|---|---|---|
| | | | | | Glass medium | | | Color paper | | |
| | | | | | Specular reflectance | Color value a* value | Color value b* value | Specular reflectance | Color value a* value | Color value b* value |
| Example 60 | 26 | Example 26 | g1 | -HN-CH(CH₃)₂ (acetamide) | Rank 3 | Rank 3 | Rank 3 | Rank 3 | Rank 3 | Rank 3 |
| 61 | 27 | Example 27 | g2 | -HN-(CH₂)₁₆-CH₃ (acetamide) | Rank 3 | Rank 3 | Rank 3 | Rank 3 | Rank 3 | Rank 3 |
| 62 | 28 | Example 28 | g3 | -HN-(CH₂)₈-CH=CH-(CH₂)₇-CH₃ (acetamide) | Rank 3 | Rank 3 | Rank 3 | Rank 3 | Rank 3 | Rank 3 |
| 63 | 29 | Example 29 | g4 | -HN-CH₂CH₂-OH (acetamide) | Rank 3 | Rank 3 | Rank 3 | Rank 3 | Rank 3 | Rank 3 |
| 64 | 30 | Example 30 | g6 | -HN-(CH₂)₁₂-OH (acetamide) | Rank 3 | Rank 3 | Rank 3 | Rank 3 | Rank 3 | Rank 3 |

TABLE 8

| | Coloring composition | Compound | General Formula (1) R₁ | R₂ | Silvery glossiness Glass medium Specular reflectance | Color value a* value | Color value b* value | Color paper Specular reflectance | Color value a* value | Color value b* value |
|---|---|---|---|---|---|---|---|---|---|---|
| Example 65 | 31 | Example 31 | g7 | (structure: HN-CH₂, C(=O)-CH₂-*) | Rank 3 | Rank 3 | Rank 3 | Rank 3 | Rank 3 | Rank 3 |
| 66 | 32 | Example 32 | h2 | (structure: H₃C-CH(-*)-CH₂-O-CH₃) | Rank 2 | Rank 3 | Rank 3 | Rank 2 | Rank 3 | Rank 3 |
| 67 | 33 | Example 33 | i1 | (structure: CH₃-C(=O)-O-CH₂-CH₂-*) | Rank 3 | Rank 3 | Rank 3 | Rank 3 | Rank 3 | Rank 3 |
| 68 | 34 | Example 34 | j2 | (structure: H₃C-O-CH₂-CH₂-O-CH₂-C(=O)-O-CH₂-CH₃, * markers) | Rank 1 | Rank 3 | Rank 3 | Rank 1 | Rank 3 | Rank 3 |
| Comparative Example 2 | 35 | Comparative Example 1 | k1 | *-CH₂-CH₂-CH₂-CH₂-CH₃ | Rank 0 | Rank 2 | Rank 2 | Rank 0 | Rank 2 | Rank 2 |

Note that, the symbol * described in the Tables 5-1, 5-2, 6-1, 6-2, 7-1, 7-2, and 8 represents a position at which $R_1$ and $R_2$ are bound to each oxygen atom in the General Formula (1). Here, the compound k1 further includes two methyl groups in the General Formula (1).

From the results of Tables 5-1, 5-2, 6-1, 6-2, 7-1, 7-2, and 8, it is found that when the coloring compositions 1 to 34 of the present disclosure are used, all of the coloring compositions can achieve a print matter having silvery gloss that is practically used. From the results of Table 8, it is found that the compound k1 of Comparative Example 2 having a substituent at a basic skeleton of the General Formula (1) has a specular reflectance of less than 10% and does not develop silvery gloss, which is not suitable for practical use.

Example 69

—Preparation of Inkjet Ink 1—

In a vial bottle (product name: SV-50A, available from NICHIDEN-RIKA GLASS CO., LTD), the following materials were homogeneously mixed to obtain a mixture. The crystalline thin film body having silvery gloss of compound a1 (6 parts by mass) was added to the mixture and the resultant was irradiated with ultrasonic wave (120 µA) at normal temperature for 1 minute using an ultrasonic homogenizer (device name: US-300T: tip diameter 7 mm, available from NIHONSEIKI KAISHA LTD.). Then, the resultant was filtrated through a filter having an average pore diameter of 5.0 µm (product name: Minisart 17594-K, available from Sartorius Stedim Japan K.K.) to prepare a dispersion.

| | |
|---|---|
| Ion exchanged water | 11.4 parts by mass |
| 3-Methyl-1,3-butanediol | 12.0 parts by mass |
| Dispersing agent (DISPERBYK-190, available from BYK-Chemie) | 0.6 parts by mass |

Meanwhile, the following raw materials presented below were mixed to prepare a vehicle.

| | |
|---|---|
| ACRIT WEM-321U (acrylic urethane water-based emulsion, available from Taisei Kako Co., Ltd.) | 12.3 parts by mass |
| Glycerin | 11.7 parts by mass |
| 1,3-Butanediol | 35.2 parts by mass |
| 2-Ethyl-1,3-hexanediol | 6.3 parts by mass |
| PolyFox PF-156A (anionic fluorosurfactant, available from OMMNOVA SOLUTIONS) | 5.2 parts by mass |
| Proxel LV (preservative and fungicide, 1,2-benzisothiazolin-3-one, available from Avecia) | 0.3 parts by mass |
| Triethanolamine | 0.2 parts by mass |
| Ion exchanged water | 28.9 parts by mass |

The dispersion and the vehicle prepared in the above procedures were mixed in equal amounts in a vial bottle to obtain inkjet ink 1.

Examples 70 to 102 and Comparative Example 3

—Preparation of Inkjet Inks 2 to 35—

Inkjet inks 2 to 34 of Examples 70 to 102 and inkjet ink 35 of Comparative Example 3 were each obtained in the same manner as in Example 69 except that the compound a1 was changed to each compound presented in the following Tables 9-1, 9-2, 10-1, 10-2, 11-1, 11-2, and 12.

<Method for Forming Print Matter>

The inkjet ink including the compound obtained was loaded into an ink cartridge. Then, an inkjet printer (device name: IPSiO GX3000, available from RICOH Company, Ltd.) was used to obtain a solid image (50 mm×50 mm). Here, the ink was loaded into all nozzles and it was confirmed that no abnormal image was formed. A discharge amount of the ink was adjusted so that a deposition amount of the ink on a print medium (product name: COLOR PAPER A4 medium thickness, available from Nagatoya-shouten co., ltd.) was 100 g/m². Then, the solid image obtained was evaluated for silvery glossiness in the same manner as in the <Silvery Glossiness Evaluation of Compound> in Example 1.

TABLE 9-1

| | | Inkjet ink | Compound | General Formula (1) $R_1$ | $R_2$ | Silvery glossiness Specular reflectance | Color value a* value | Color value b* value |
|---|---|---|---|---|---|---|---|---|
| Example | 69 | 1 | Example 1 a1 | 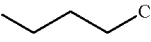 | CH₃ | Rank 3 | Rank 3 | Rank 3 |
| | 70 | 2 | Example 2 a2 | 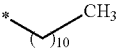 | CH₃ | Rank 3 | Rank 3 | Rank 3 |
| | 71 | 3 | Example 3 a3 | 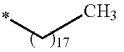 | CH₃ | Rank 3 | Rank 3 | Rank 3 |
| | 72 | 4 | Example 4 a4 | 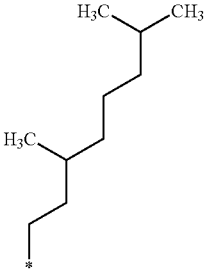 [SMILES: *CCC(C)CCCC(C)C] | | Rank 1 | Rank 3 | Rank 3 |
| | 73 | 5 | Example 5 a8 | 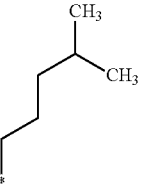 | | Rank 2 | Rank 3 | Rank 3 |

TABLE 9-2

| | | Inkjet ink | Compound | General Formula (1) R₁ | R₂ | Silvery glossiness Specular reflectance | Color value a* value | Color value b* value |
|---|---|---|---|---|---|---|---|---|
| Example | 74 | 6 | Example 6 | b2 | H₃C, CH₃ with allyl chain * | Rank 2 | Rank 3 | Rank 3 |
| | 75 | 7 | Example 7 | b3 | CH₂=CH-(CH₂)₁₆-* | Rank 3 | Rank 3 | Rank 3 |
| | 76 | 8 | Example 8 | c1 | phenyl-* | Rank 1 | Rank 1 | Rank 1 |
| | 77 | 9 | Example 9 | c3 | 4-COOH-C₆H₄-* | Rank 1 | Rank 1 | Rank 1 |
| | 78 | 10 | Example 10 | d1 | 2-naphthyl-* | Rank 1 | Rank 1 | Rank 1 |

TABLE 10-1

| | | Inkjet ink | Compound | General Formula (1) R₁ | R₂ | Silvery glossiness Specular reflectance | Color value a* value | Color value b* value |
|---|---|---|---|---|---|---|---|---|
| Example | 79 | 11 | Example 11 | d7 | 6-COOH-naphth-2-yl-* | Rank 1 | Rank 1 | Rank 1 |

TABLE 10-1-continued

| Inkjet ink | | Compound | General Formula (1) R₁ | R₂ | Silvery glossiness Specular reflectance | Color value a* value | Color value b* value |
|---|---|---|---|---|---|---|---|
| 80 | 12 | Example 12 | e1 | 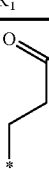 | Rank 3 | Rank 3 | Rank 3 |
| 81 | 13 | Example 13 | e2 |  | Rank 3 | Rank 3 | Rank 3 |
| 82 | 14 | Example 14 | e3 | 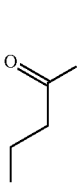 | Rank 3 | Rank 3 | Rank 3 |
| 83 | 15 | Example 15 | e5 |  | Rank 3 | Rank 3 | Rank 3 |

TABLE 10-2

| | Inkjet ink | | Compound | General Formula (1) R₁ | R₂ | Silvery glossiness Specular reflectance | Color value a* value | Color value b* value |
|---|---|---|---|---|---|---|---|---|
| Example | 84 | 16 | Example 16 | f1 | 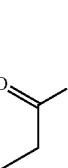 | Rank 3 | Rank 3 | Rank 3 |
| | 85 | 17 | Example 17 | f2 |  | Rank 3 | Rank 3 | Rank 3 |

TABLE 10-2-continued

| Inkjet ink | | Compound | General Formula (1) R₁ | R₂ | Silvery glossiness Specular reflectance | Color value a* value | Color value b* value |
|---|---|---|---|---|---|---|---|
| 86 | 18 | Example 18 | f4 | 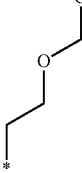 | Rank 3 | Rank 3 | Rank 3 |
| 87 | 19 | Example 19 | f5 | 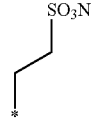 | Rank 3 | Rank 3 | Rank 3 |
| 88 | 20 | Example 20 | f6 | 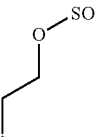 | Rank 3 | Rank 3 | Rank 3 |

TABLE 11-1

| | Inkjet ink | | Compound | General Formula (1) R₁ | R₂ | Silvery glossiness Specular reflectance | Color value a* value | Color value b* value |
|---|---|---|---|---|---|---|---|---|
| Example | 89 | 21 | Example 21 | f8 | 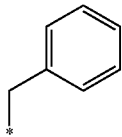 [SMILES: *Cc1ccccc1] | Rank 1 | Rank 2 | Rank 2 |
| | 90 | 22 | Example 22 | f9 | 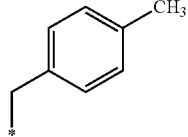 [SMILES: *Cc1ccc(C)cc1] | Rank 1 | Rank 2 | Rank 2 |
| | 91 | 23 | Example 23 | f12 | 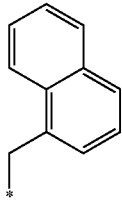 [SMILES: *Cc1cccc2ccccc12] | Rank 1 | Rank 1 | Rank 1 |
| | 92 | 24 | Example 24 | f14 | 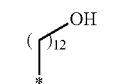 | Rank 3 | Rank 3 | Rank 3 |
| | 93 | 25 | Example 25 | f15 | 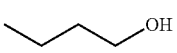 | Rank 3 | Rank 3 | Rank 3 |

TABLE 11-2

| | Inkjet ink | Compound | General Formula (1) R₁ | R₂ | Silvery glossiness Specular reflectance | Color value a* value | Color value b* value |
|---|---|---|---|---|---|---|---|
| Example 94 | 26 | Example 26 g1 | | $\underset{*}{\overset{O}{\underset{\|}{C}}}\!\!-\!CH_2\!-\!NH\!-\!CH(CH_3)_2$ | Rank 3 | Rank 3 | Rank 3 |
| 95 | 27 | Example 27 g2 | | $\underset{*}{\overset{O}{\underset{\|}{C}}}\!\!-\!CH_2\!-\!NH\!-\!(CH_2)_{16}\!CH_3$ | Rank 3 | Rank 3 | Rank 3 |
| 96 | 28 | Example 28 g3 | | $\underset{*}{\overset{O}{\underset{\|}{C}}}\!\!-\!CH_2\!-\!NH\!-\!(CH_2)_8\!-\!CH\!=\!CH\!-\!(CH_2)_7\!CH_3$ | Rank 3 | Rank 3 | Rank 3 |
| 97 | 29 | Example 29 g4 | | $\underset{*}{\overset{O}{\underset{\|}{C}}}\!\!-\!CH_2\!-\!NH\!-\!CH_2CH_2\!-\!OH$ | Rank 3 | Rank 3 | Rank 3 |
| 98 | 30 | Example 30 g6 | | $\underset{*}{\overset{O}{\underset{\|}{C}}}\!\!-\!CH_2\!-\!NH\!-\!(CH_2)_{12}\!-\!OH$ | Rank 3 | Rank 3 | Rank 3 |

TABLE 12

| | Inkjet ink | Compound | General Formula (1) R₁ | General Formula (1) R₂ | Silvery glossiness Specular reflectance | Color value a* value | Color value b* value |
|---|---|---|---|---|---|---|---|
| Example | 99 | 31 | Example 31 | g7 | (vinyl-NH-C(=O)-CH₂-*) | Rank 3 | Rank 3 | Rank 3 |
| | 100 | 32 | Example 32 | h2 | (H₃C-CH(CH₂-O-CH₃)-*) | Rank 2 | Rank 3 | Rank 3 |
| | 101 | 33 | Example 33 | i1 | (CH₃-C(=O)-O-CH₂CH₂-*) | Rank 3 | Rank 3 | Rank 3 |
| | 102 | 34 | Example 34 | j2 | (*-CH₂CH₂-O-CH₃) | (CH₃-O-CH₂-C(=O)-O-CH₂-*) | Rank 1 | Rank 3 | Rank 3 |
| Comparative Example | 3 | 35 | Comparative Example 1 | k1 | (*-CH₂CH₂CH₂-CH₃) | | Rank 0 | Rank 2 | Rank 2 |

Note that, the symbol * described in the Tables 9-1, 9-2, 10-1, 10-2, 11-1, 11-2, and 12 represents a position at which $R_1$ and $R_2$ are bound to each oxygen atom in the General Formula (1). Here, the compound k1 further includes two methyl groups in the General Formula (1).

From the results of Tables 9-1, 9-2, 10-1, 10-2, 11-1, 11-2, and 12, it is found that when the inkjet inks 1 to 34 each including the compound according to the present disclosure are used, all of the inkjet inks can achieve an image having silvery gloss that is practically used. From the results of Table 12, it is found that the compound k1 of Comparative Example 3 having a substituent at a basic skeleton of the General Formula (1) has a specular reflectance of less than 10% and does not develop silvery gloss, which is not suitable for practical use.

Aspects of the present disclosure are as follows, for example.

<1> An organic colorant represented by General Formula (1) below:

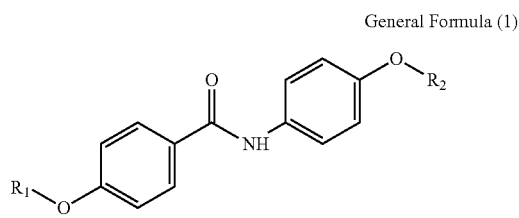

General Formula (1)

where in the General Formula (1), $R_1$ and $R_2$ each independently represent an alkyl group including from 1 to 20 carbon atoms, an alkenyl group including from 1 to 20 carbon atoms, a phenyl group, a naphthyl group, or a group represented by $-(CH_2)_n-COO-R_3$, $-(CH_2)_n-R_4$, —$(CH_2)_n$—CONH—$R_5$, —$CR_6R_7$—COO—$R_8$, or —$(CH_2)_n$—$OCOCH_3$; $R_3$ represents a hydrogen atom or an alkyl group including from 1 to 2 carbon atoms; $R_4$ represents a hydroxy group, an alkoxy group including from 1 to 2 carbon atoms, an alkenyloxy group including from 2 to 5 carbon atoms, a $SO_3Na$ group, an $OSO_3Na$ group, a phenyl group, a phenylalkyl group where an alkyl portion of the phenylalkyl group includes from 1 to 3 carbon atoms, a naphthyl group, or a naphthylalkyl group where an alkyl portion of the naphthylalkyl group includes from 1 to 3 carbon atoms; $R_5$ represents an alkyl group including from 1 to 20 carbon atoms, an alkenyl group including from 1 to 20 carbon atoms, or a hydroxyalkyl group including from 1 to 12 carbon atoms; $R_6$ represents a hydrogen atom or a methyl group; $R_7$ represents an alkyl group including from 1 to 4 carbon atoms; $R_8$ represents an alkyl group including from 1 to 5 carbon atoms; and n is an integer of from 1 to 12.

<2> The organic colorant according to <1>, wherein the phenyl group and the naphthyl group in the $R_1$ and the $R_2$ and the phenylalkyl group and the naphthylalkyl group in the $R_4$ have a substituent, and wherein the substituent is at least one selected from the group consisting of an alkyl group, an alkenyl group, a hydroxyalkyl group, a hydroxyl group, an alkoxy group, an alkenyloxy group, a cyano group, a cyanoalkyl group, a carboxy group, an alkoxycarbonyl group, and an amino group.

<3> The organic colorant according to <1>, wherein the $R_1$ and the $R_2$ each independently represent a group represented by a straight-chain alkyl group including from 1 to 20 carbon atoms or a group represented by a straight-chain alkenyl group including from 1 to 20 carbon atoms.

<4> The organic colorant according to <1>, wherein the $R_1$ and the $R_2$ are —$(CH_2)_2$—OH.

<5> The organic colorant according to any one of <1> to <4>, wherein the $R_1$ and the $R_2$ are sodium ethylsulfonate.

<6> The organic colorant according to any one of <1> to <4>, wherein the $R_1$ and the $R_2$ are sodium ethyl ether sulfonate.

<7> The organic colorant according to any one of <1> to <4>, wherein the $R_1$ and the $R_2$ are 2-methylbutane.

<8> The organic colorant according to any one of <1> to <4>, wherein the $R_1$ and the $R_2$ are propionic acid.

<9> The organic colorant according to any one of <1> to <4>, wherein the $R_1$ and the $R_2$ are methyl propionate.

<10> The organic colorant according to any one of <1> to <4>, wherein the $R_1$ and the $R_2$ are ethyl propionate.

<11> A coloring composition including the organic colorant according to any one of <1> to <10>.

<12> The coloring composition according to <11>, further including an organic solvent.

<13> The coloring composition according to <11> or <12>, further including water.

<14> The coloring composition according to any one of <11> to <13>, further including a resin.

<15> The coloring composition according to any one of <11> to <14>, further including a surfactant.

<16> The coloring composition according to any one of <11> to <15>, wherein an amount of the organic colorant is from 0.01% by mass to 50.0% by mass.

<17> An inkjet ink including the organic colorant according to any one of <1> to <10>.

<18> The inkjet ink according to <17>, further including an organic solvent.

<19> The inkjet ink according to <17> or <18>, further including water.

<20> The inkjet ink according to any one of <17> to <19>, further including a resin.

<21> The inkjet ink according to any one of <17> to <20>, further including a surfactant.

<22> The inkjet ink according to any one of <17> to <21>, wherein an amount of the organic colorant is from 0.1% by mass to 30.0% by mass.

The organic colorant according to any one of <1> to <10>, the coloring composition according to any one of <11> to <16>, and the inkjet ink according to <17> to <22> can solve the existing problems and can achieve the object of the present disclosure.

What is claimed is:
1. An organic colorant of General Formula (1) below:

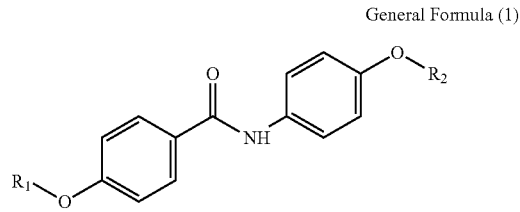

General Formula (1)

where in the General Formula (1), $R_1$ and $R_2$ each independently represent an alkenyl group including from 2 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—$OCOCH_3$; $R_3$ represents a hydrogen atom or an alkyl group including from 1 to 2 carbon atoms; $R_4$ represents a hydroxy group, an alkoxy group including from 1 to 2 carbon atoms, an alkenyloxy group including from 2 to 5 carbon atoms, a $SO_3Na$ group, an $OSO_3Na$ group, a phenyl group, a phenylalkyl group where an alkyl portion of the phenylalkyl group includes from 1 to 3 carbon atoms, a naphthyl group, or a naphthylalkyl group where an alkyl portion of the naphthylalkyl group includes from 1 to 3 carbon atoms; $R_5$ represents an alkyl group including from 1 to 20 carbon atoms, an alkenyl group including from 2 to 20 carbon atoms, or a hydroxyalkyl group including from 1 to 12 carbon atoms; $R_6$ represents a hydrogen atom or a methyl group; $R_7$ represents an alkyl group including from 1 to 4 carbon atoms; $R_8$ represents an alkyl group including from 1 to 5 carbon atoms; and n is an integer of from 1 to 12, wherein when $R_1$ or $R_2$ represent a phenyl group and said phenyl group is substituted the substituent is at least one selected from the group consisting of an alkyl group, an alkenyl group, a hydroxyalkyl group, a hydroxyl group, an alkoxy group, an alkenyloxy group, a cyanoalkyl group, a carboxy group, an alkoxycarbonyl group, and an amino group.

2. The organic colorant according to claim 1, wherein at least one of $R_1$ and $R_2$ represents a substituted phenyl group or a substituted naphthyl group,
wherein the substituent of said substituted phenyl group is at least one selected from the group consisting of an alkyl group, an alkenyl group, a hydroxyalkyl group, a hydroxyl group, an alkoxy group, an alkenyloxy group, a cyanoalkyl group, a carboxy group, an alkoxycarbonyl group, and an amino group, and wherein the substituent of said substituted naphthyl group is at least one selected from the group consisting of an alkyl group, an alkenyl group, a hydroxyalkyl group, a hydroxyl group, an alkoxy group, an alkenyloxy group, a cyano group, a cyanoalkyl group, a carboxy group, an alkoxycarbonyl group, and an amino group.

3. The organic colorant according to claim 1,
wherein the $R_1$ and the $R_2$ each independently represent a group represented by a straight-chain alkenyl group including from 2 to 20 carbon atoms.

4. The organic colorant according to claim 1,
wherein the $R_1$ and the $R_2$ are —$(CH_2)_2$—OH.

5. A coloring composition comprising
an organic solvent, and
an organic colorant of General Formula (1) below:

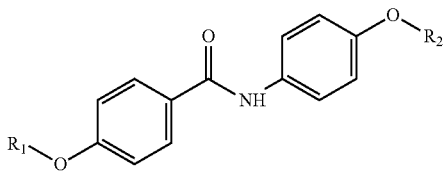

General Formula (1)

where in the General Formula (1), $R_1$ and $R_2$ each independently represent an alkenyl group including from 2 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—OCOCH$_3$; $R_3$ represents a hydrogen atom or an alkyl group including from 1 to 2 carbon atoms; $R_4$ represents a hydroxy group, an alkoxy group including from 1 to 2 carbon atoms, an alkenyloxy group including from 2 to 5 carbon atoms, a SO$_3$Na group, an OSO$_3$Na group, a phenyl group, a phenylalkyl group where an alkyl portion of the phenylalkyl group includes from 1 to 3 carbon atoms, a naphthyl group, or a naphthylalkyl group where an alkyl portion of the naphthylalkyl group includes from 1 to 3 carbon atoms; $R_5$ represents an alkyl group including from 1 to 20 carbon atoms, an alkenyl group including from 2 to 20 carbon atoms, or a hydroxyalkyl group including from 1 to 12 carbon atoms; $R_6$ represents a hydrogen atom or a methyl group; $R_7$ represents an alkyl group including from 1 to 4 carbon atoms; $R_8$ represents an alkyl group including from 1 to 5 carbon atoms; and n is an integer of from 1 to 12, wherein when $R_1$ or $R_2$ represent a phenyl group and said phenyl group is substituted the substituent is at least one selected from the group consisting of an alkyl group, an alkenyl group, a hydroxyalkyl group, a hydroxyl group, an alkoxy group, an alkenyloxy group, a cyanoalkyl group, a carboxy group, an alkoxycarbonyl group, and an amino group.

6. An ink comprising
an organic solvent, and
an organic colorant of General Formula (1) below:

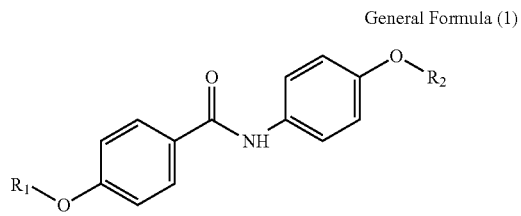

General Formula (1)

where in the General Formula (1), $R_1$ and $R_2$ each independently represent an alkenyl group including from 2 to 20 carbon atoms, a phenyl group, a naphthyl group, or a group represented by —$(CH_2)_n$—COO—$R_3$, —$(CH_2)_n$—$R_4$, —$(CH_2)_n$—CONH—$R_5$, —$CR_6R_7$—COO—$R_8$, or —$(CH_2)_n$—OCOCH$_3$; $R_3$ represents a hydrogen atom or an alkyl group including from 1 to 2 carbon atoms; $R_4$ represents a hydroxy group, an alkoxy group including from 1 to 2 carbon atoms, an alkenyloxy group including from 2 to 5 carbon atoms, a SO$_3$Na group, an OSO$_3$Na group, a phenyl group, a phenylalkyl group where an alkyl portion of the phenylalkyl group includes from 1 to 3 carbon atoms, a naphthyl group, or a naphthylalkyl group where an alkyl portion of the naphthylalkyl group includes from 1 to 3 carbon atoms; $R_5$ represents an alkyl group including from 1 to 20 carbon atoms, an alkenyl group including from 2 to 20 carbon atoms, or a hydroxyalkyl group including from 1 to 12 carbon atoms; $R_6$ represents a hydrogen atom or a methyl group; $R_7$ represents an alkyl group including from 1 to 4 carbon atoms; $R_8$ represents an alkyl group including from 1 to 5 carbon atoms; and n is an integer of from 1 to 12, wherein when $R_1$ or $R_2$ represent a phenyl group and said phenyl group is substituted the substituent is at least one selected from the group consisting of an alkyl group, an alkenyl group, a hydroxyalkyl group, a hydroxyl group, an alkoxy group, an alkenyloxy group, a cyanoalkyl group, a carboxy group, an alkoxycarbonyl group, and an amino group.

7. The organic colorant according to claim 1,
wherein $R_4$ is a substituted phenylalkyl group or substituted naphthylalkyl group, and
wherein the substituent is at least one selected from the group consisting of an alkyl group, an alkenyl group, a hydroxyalkyl group, a hydroxyl group, an alkoxy group, an alkenyloxy group, a cyano group, a cyanoalkyl group, a carboxy group, an alkoxycarbonyl group, and an amino group.

8. The organic colorant according to claim 1, wherein $R_1$ and $R_2$ independently represent a substituted phenyl group or a substituted naphthyl group,
wherein the substituent of said substituted phenyl group is at least one selected from the group consisting of an alkyl group, an alkenyl group, a hydroxyalkyl group, a hydroxyl group, an alkoxy group, an alkenyloxy group, a cyanoalkyl group, a carboxy group, an alkoxycarbonyl group, and an amino group, and
wherein the substituent of said substituted naphthyl group is at least one selected from the group consisting of an alkyl group, an alkenyl group, a hydroxyalkyl group, a hydroxyl group, an alkoxy group, an alkenyloxy group, a cyano group, a cyanoalkyl group, a carboxy group, an alkoxycarbonyl group, and an amino group.

9. The organic colorant according to claim 1, wherein $R_1$ and $R_2$ independently represent a substituted phenyl group or a substituted naphthyl group and $R_4$ is a substituted phenylalkyl group or substituted naphthylalkyl group, wherein the substituent of said substituted phenyl group is at least one selected from the group consisting of an alkyl group, an alkenyl group, a hydroxyalkyl group, a hydroxyl group, an alkoxy group, an alkenyloxy group, a cyanoalkyl group, a carboxy group, an alkoxycarbonyl group, and an amino group, and wherein the substituent of said substituted naphthyl group, said substituted phenylalkyl group, and said substituted naphthylalkyl group is at least one selected from the group consisting of an alkyl group, an alkenyl group, a hydroxyalkyl group, a hydroxyl group, an alkoxy group, an alkenyloxy group, a cyano group, a cyanoalkyl group, a carboxy group, an alkoxycarbonyl group, and an amino group.

10. The coloring composition according to claim 5, wherein the $R_1$ and the $R_2$ are $-(CH_2)_2-OH$.

11. The ink according to claim 6, wherein the $R_1$ and the $R_2$ are $-(CH_2)_2-OH$.

* * * * *